US012176689B2

(12) United States Patent
Gundel et al.

(10) Patent No.: US 12,176,689 B2
(45) Date of Patent: Dec. 24, 2024

(54) MEASUREMENT TOOL FOR CABLE-PREPARATION SYSTEM

(71) Applicants: 3M Innovative Properties Company, St. Paul, MN (US); Connected Intelligence Systems Ltd., Netanya (IL)

(72) Inventors: Douglas B. Gundel, Cedar Park, TX (US); Assaf Kaufman, Tal Shahar (IL); Uri Bar-Ziv, Zichron Yaakov (IL); Alexey Haritonov, Netanya (IL)

(73) Assignees: 3M Innovative Properties Company, St. Paul, MN (US); Connected Intelligence Systems Ltd., Netanya (IL)

( * ) Notice: Subject to any disclaimer, the term of this patent is extended or adjusted under 35 U.S.C. 154(b) by 260 days.

(21) Appl. No.: 17/757,914

(22) PCT Filed: Nov. 30, 2020

(86) PCT No.: PCT/US2020/062583
§ 371 (c)(1),
(2) Date: Jun. 23, 2022

(87) PCT Pub. No.: WO2021/133517
PCT Pub. Date: Jul. 1, 2021

(65) Prior Publication Data
US 2023/0022732 A1  Jan. 26, 2023

Related U.S. Application Data

(60) Provisional application No. 62/953,780, filed on Dec. 26, 2019.

(51) Int. Cl.
*H02G 1/12* (2006.01)
*G01B 11/06* (2006.01)
(Continued)

(52) U.S. Cl.
CPC ....... *H02G 1/1265* (2013.01); *G01B 11/0616* (2013.01); *G01B 11/08* (2013.01);
(Continued)

(58) Field of Classification Search
CPC ............... G02B 13/22; G01N 21/8806; G01N 21/8851; G01N 21/952; H01R 43/28;
(Continued)

(56) References Cited

U.S. PATENT DOCUMENTS

| 3,128,658 A | 4/1964 | Mitchell et al. |
| 4,301,399 A | 11/1981 | Miller et al. |

(Continued)

FOREIGN PATENT DOCUMENTS

| CH | 641278 A5 | 2/1984 |
| CN | 1161763 A | 10/1997 |

(Continued)

OTHER PUBLICATIONS

Communication pursuant to Article 94(3) EPC from counterpart European Application No. 20829070.0 dated Feb. 16, 2024, 5 pp.
(Continued)

*Primary Examiner* — Peter B Kim
(74) *Attorney, Agent, or Firm* — Shumaker & Sieffert, P.A.

(57) ABSTRACT

Techniques, systems and articles are described for preparing electrical cables for connections to a power grid. In one example, a cable-cross-section-measurement tool includes a housing defining a cavity, wherein the housing is configured to position an end-face of an electrical cable within the cavity; a camera disclosed within the cavity of the housing, wherein the camera is configured to capture an image of the end-face of the electrical cable; and a telecentric lens optically coupled to the camera, wherein the telecentric lens comprises a non-angular field of view configured to reduce,
(Continued)

in the image, distortion from parallax associated with at least one portion of the end-face of the electrical cable that is oriented at an oblique angle relative to an optical axis of the telecentric lens.

17 Claims, 35 Drawing Sheets

(51) Int. Cl.
| | |
|---|---|
| G01B 11/08 | (2006.01) |
| G01B 11/14 | (2006.01) |
| G01N 21/88 | (2006.01) |
| G01N 21/952 | (2006.01) |
| G02B 13/22 | (2006.01) |
| H01R 43/28 | (2006.01) |
| H04N 23/55 | (2023.01) |

(52) U.S. Cl.
CPC ......... *G01B 11/14* (2013.01); *G01N 21/8806* (2013.01); *G01N 21/8851* (2013.01); *G01N 21/952* (2013.01); *G02B 13/22* (2013.01); *H01R 43/28* (2013.01); *H02G 1/1221* (2013.01); *H02G 1/1224* (2013.01); *H02G 1/1297* (2013.01); *H04N 23/55* (2023.01)

(58) Field of Classification Search
CPC .. H02G 1/1221; H02G 1/1224; H02G 1/1265; H02G 1/1297; H04N 23/55
See application file for complete search history.

(56) References Cited

U.S. PATENT DOCUMENTS

| | | | |
|---|---|---|---|
| 4,321,643 | A | 3/1982 | Vernier |
| 4,345,362 | A | 8/1982 | de Givry |
| 4,424,480 | A | 1/1984 | Stefan |
| 4,745,828 | A | 5/1988 | Stepan |
| 4,802,512 | A | 2/1989 | Kodera |
| 5,038,457 | A | 8/1991 | Yasushi et al. |
| 5,243,882 | A | 9/1993 | Stepan |
| 5,272,941 | A | 12/1993 | English et al. |
| 5,323,117 | A | 6/1994 | Endoh et al. |
| 5,502,374 | A | 3/1996 | Cota |
| 5,617,859 | A | 4/1997 | Souza et al. |
| 5,756,972 | A | 5/1998 | Vranicar et al. |
| 5,892,430 | A | 4/1999 | Wiesman et al. |
| 5,936,725 | A | 8/1999 | Pike et al. |
| 6,286,393 | B1 | 9/2001 | Messer et al. |
| 6,617,859 | B1 | 9/2003 | Orton |
| 6,734,662 | B1 | 5/2004 | Fenske |
| 7,166,804 | B2 | 1/2007 | Yumura et al. |
| 8,643,380 | B1 | 2/2014 | Herbert |
| 9,917,434 | B2 | 3/2018 | George et al. |
| 9,961,418 | B2 | 5/2018 | Rodriguez et al. |
| 10,192,678 | B2 | 1/2019 | Koo et al. |
| 10,338,103 | B2 | 7/2019 | Gravermann et al. |
| 10,811,856 | B2 | 10/2020 | Symington et al. |
| 11,381,061 | B2 | 7/2022 | Symington et al. |
| 2005/0050713 | A1 | 3/2005 | Locher et al. |
| 2005/0099636 | A1 | 5/2005 | Schweser |
| 2007/0273874 | A1* | 11/2007 | Xu ................. G01B 11/306 |
| | | | 356/601 |
| 2010/0114392 | A1 | 5/2010 | Lancaster |
| 2010/0308797 | A1 | 12/2010 | Zimmermann |
| 2012/0047724 | A1 | 3/2012 | Yano et al. |
| 2012/0192414 | A1 | 8/2012 | Montena et al. |
| 2012/0199392 | A1 | 8/2012 | Samuelson et al. |
| 2012/0203493 | A1 | 8/2012 | Dobson et al. |
| 2012/0268106 | A1 | 10/2012 | Blake, Jr. et al. |
| 2012/0306510 | A1 | 12/2012 | White et al. |
| 2013/0054162 | A1 | 2/2013 | Smith et al. |
| 2014/0368215 | A1 | 12/2014 | Hoffman et al. |
| 2015/0062328 | A1 | 3/2015 | Lauffer et al. |
| 2015/0089815 | A1 | 4/2015 | Woodward |
| 2015/0120218 | A1 | 4/2015 | Garnacho Vecino et al. |
| 2015/0128399 | A1 | 5/2015 | Meierhans et al. |
| 2015/0253469 | A1* | 9/2015 | Le Gros ................. G02B 13/22 |
| | | | 359/619 |
| 2015/0287180 | A1 | 10/2015 | Frey |
| 2016/0054363 | A1 | 2/2016 | Rostron et al. |
| 2016/0091533 | A1 | 3/2016 | Soleillant et al. |
| 2016/0139181 | A1 | 5/2016 | Gravermann et al. |
| 2016/0225248 | A1 | 8/2016 | Rodriguez, Jr. et al. |
| 2017/0222420 | A1 | 8/2017 | Dhlamini |
| 2017/0310092 | A1 | 10/2017 | Viviroli |
| 2017/0346265 | A1 | 11/2017 | Soerensen |
| 2018/0017611 | A1 | 1/2018 | Radun et al. |
| 2018/0059162 | A1 | 3/2018 | LeBlanc et al. |
| 2018/0062370 | A1 | 3/2018 | Heidmann et al. |
| 2018/0238955 | A1 | 8/2018 | Bango et al. |
| 2018/0252760 | A1 | 9/2018 | Andle et al. |
| 2018/0328531 | A1 | 11/2018 | Weisenberg et al. |
| 2019/0128927 | A1 | 5/2019 | Shaw et al. |
| 2019/0293706 | A1 | 9/2019 | Sohn et al. |
| 2019/0369152 | A1 | 12/2019 | Fallet et al. |
| 2019/0393685 | A1 | 12/2019 | Sedlacek |

FOREIGN PATENT DOCUMENTS

| | | |
|---|---|---|
| CN | 1530965 A | 9/2004 |
| CN | 1601659 A | 3/2005 |
| CN | 101666849 A | 3/2010 |
| CN | 102116824 A | 7/2011 |
| CN | 102313861 A | 1/2012 |
| CN | 102623871 A | 8/2012 |
| CN | 202373838 U | 8/2012 |
| CN | 202978201 U | 6/2013 |
| CN | 103339813 A | 10/2013 |
| CN | 103560441 A | 2/2014 |
| CN | 104407270 A | 3/2015 |
| CN | 104518393 A | 4/2015 |
| CN | 204256093 U | 4/2015 |
| CN | 104821521 A | 8/2015 |
| CN | 104849628 A | 8/2015 |
| CN | 104979740 A | 10/2015 |
| CN | 105043457 A | 11/2015 |
| CN | 204988364 U | 1/2016 |
| CN | 205175574 U | 4/2016 |
| CN | 205263241 U | 5/2016 |
| CN | 105629136 A | 6/2016 |
| CN | 105699860 A | 6/2016 |
| CN | 205509462 U | 8/2016 |
| CN | 106124948 A | 11/2016 |
| CN | 205719288 U | 11/2016 |
| CN | 106353648 A | 1/2017 |
| CN | 106451253 A | 2/2017 |
| CN | 206038828 U | 3/2017 |
| CN | 206135313 U | 4/2017 |
| CN | 106646156 A | 5/2017 |
| CN | 106771933 A | 5/2017 |
| CN | 206147041 U | 5/2017 |
| CN | 106855443 A | 6/2017 |
| CN | 106950477 A | 7/2017 |
| CN | 106980075 A | 7/2017 |
| CN | 107306021 A | 10/2017 |
| CN | 206685810 U | 11/2017 |
| CN | 107453188 A | 12/2017 |
| CN | 108169644 A | 6/2018 |
| CN | 108376884 A | 8/2018 |
| CN | 207765893 U | 8/2018 |
| DE | 2928727 A1 | 2/1981 |
| DE | 3025819 A1 | 2/1982 |
| DE | 3702735 A1 | 8/1988 |
| DE | 20117063 U1 | 1/2002 |
| DE | 202008017358 U1 | 8/2009 |
| DE | 102011079935 A1 | 1/2013 |
| EP | 1902498 A1 | 3/2008 |
| EP | 2472688 A2 | 7/2012 |
| EP | 2579055 A1 | 4/2013 |
| EP | 2806277 A1 | 11/2014 |
| EP | 2818881 A1 | 12/2014 |
| EP | 3002594 A1 | 4/2016 |

(56) References Cited

FOREIGN PATENT DOCUMENTS

| | | |
|---|---|---|
| EP | 3109958 A1 | 12/2016 |
| EP | 3182428 A1 | 6/2017 |
| FR | 2282179 A1 | 3/1976 |
| FR | 2920922 A1 | 3/2009 |
| GB | 2288696 A | 10/1995 |
| GB | 2463689 A | 3/2010 |
| JP | S60256068 A | 12/1985 |
| JP | H03273809 A | 12/1991 |
| JP | H06160459 A | 6/1994 |
| JP | H06308191 A | 11/1994 |
| JP | H09182237 A | 7/1997 |
| JP | H10201070 A | 7/1998 |
| JP | 2004156910 A | 6/2004 |
| JP | 2015104274 A | 6/2015 |
| KR | 101317476 B1 | 10/2013 |
| KR | 101847456 B1 | 4/2018 |
| WO | 9840756 | 9/1998 |
| WO | 0042444 | 7/2000 |
| WO | 2006100590 A1 | 9/2006 |
| WO | 2007052095 A1 | 5/2007 |
| WO | 2008072226 A2 | 6/2008 |
| WO | 2012130816 A1 | 10/2012 |
| WO | 2014129817 A1 | 8/2014 |
| WO | 2015179102 A1 | 11/2015 |
| WO | 2016019666 A1 | 2/2016 |
| WO | 2016058721 A1 | 4/2016 |
| WO | 2016088174 A1 | 6/2016 |
| WO | 2016088175 A1 | 6/2016 |
| WO | 2016137424 A1 | 9/2016 |
| WO | 2016177571 A2 | 10/2016 |
| WO | 2016187090 A1 | 11/2016 |

OTHER PUBLICATIONS

International Preliminary Report on Patentability from International Application No. PCT/US2020/062583 dated Jul. 7, 2022, 9 pp.

International Search Report and Written Opinion of International Application No. PCT/US2020/062583, dated Mar. 30, 2021, 15 pp.

Van Der Wielen, "Synchronization of online PD detection and localization setups using pulse injection", Proceedings of the 7th International Conference on Properties and Applications of Dielectric Materials, vol. 01, IEEE, Jun. 2003, pp. 327-330.

Wang et al., "Calibration of capacitive couplers for online PD detection in HV cables", IEEE Electrical Insulation Magazine, vol. 11, No. 03, IEEE, May 2005, pp. 28-39.

Response to Communication pursuant to Article 94(3) EPC dated Feb. 16, 2024, from counterpart European Application No. 20829070.0 filed Jun. 14, 2024, 112 pp.

\* cited by examiner

"DIAMETER" POSITION

"ANGLE" POSITION

"NEUTRAL" POSITION

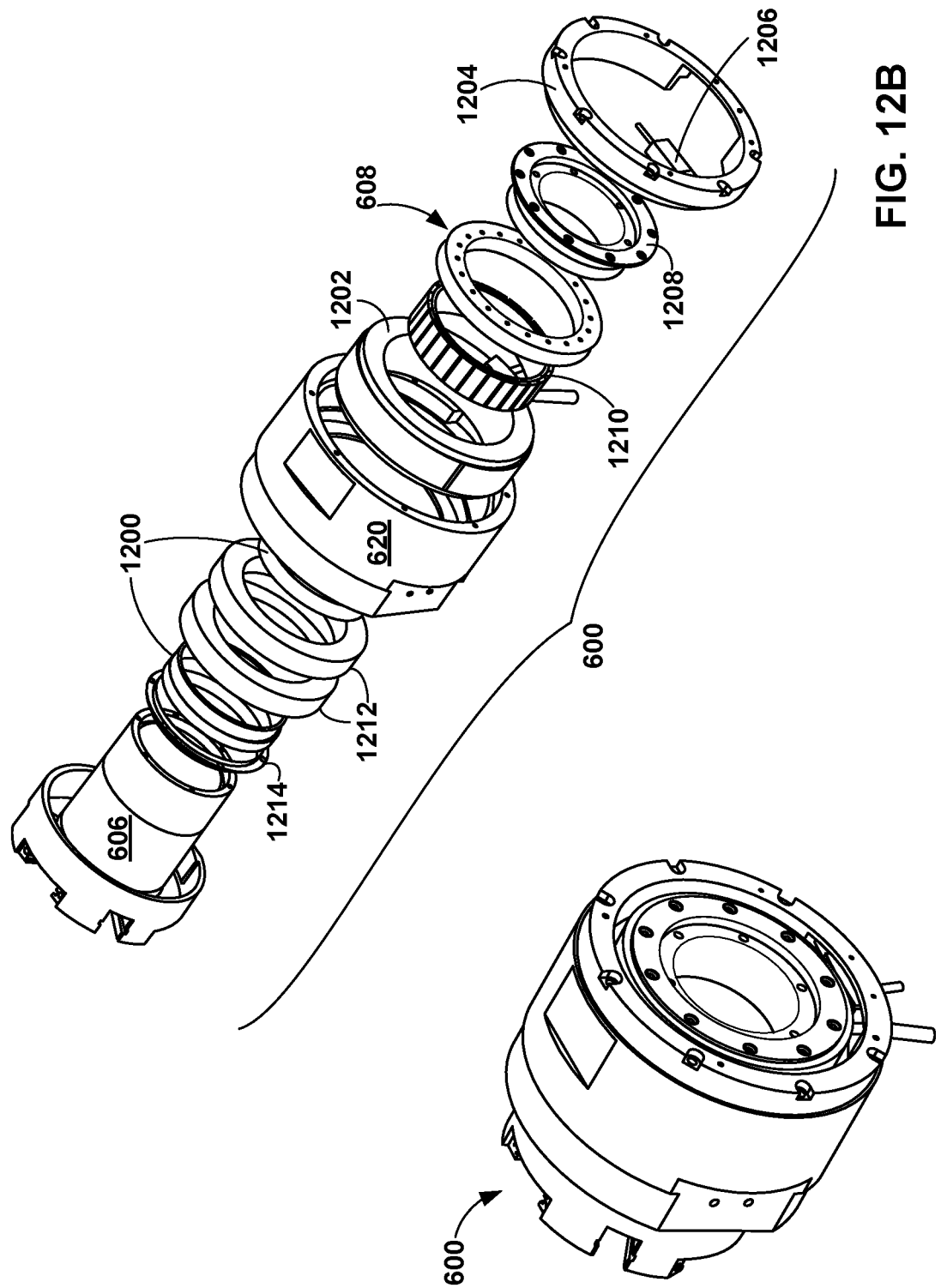

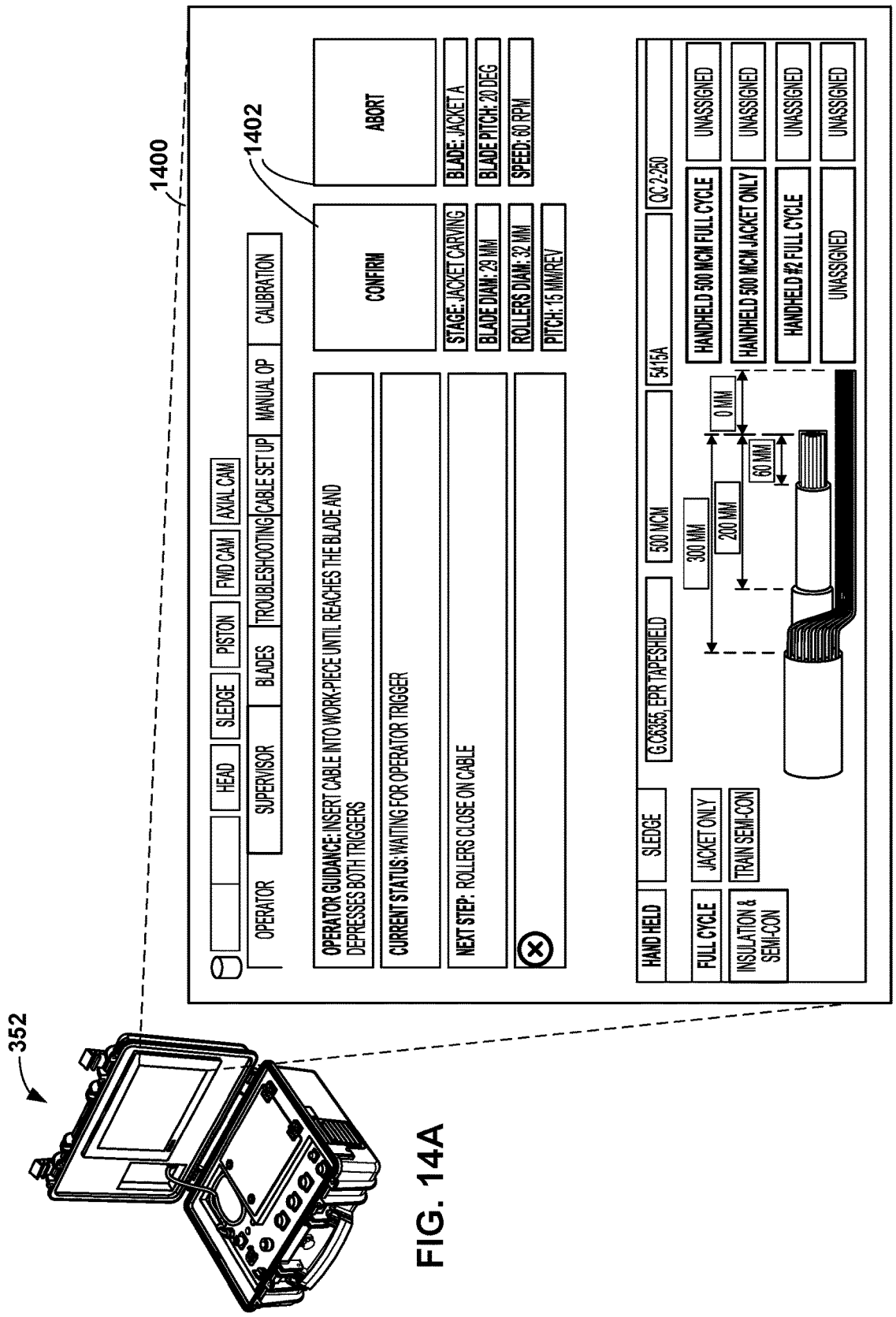

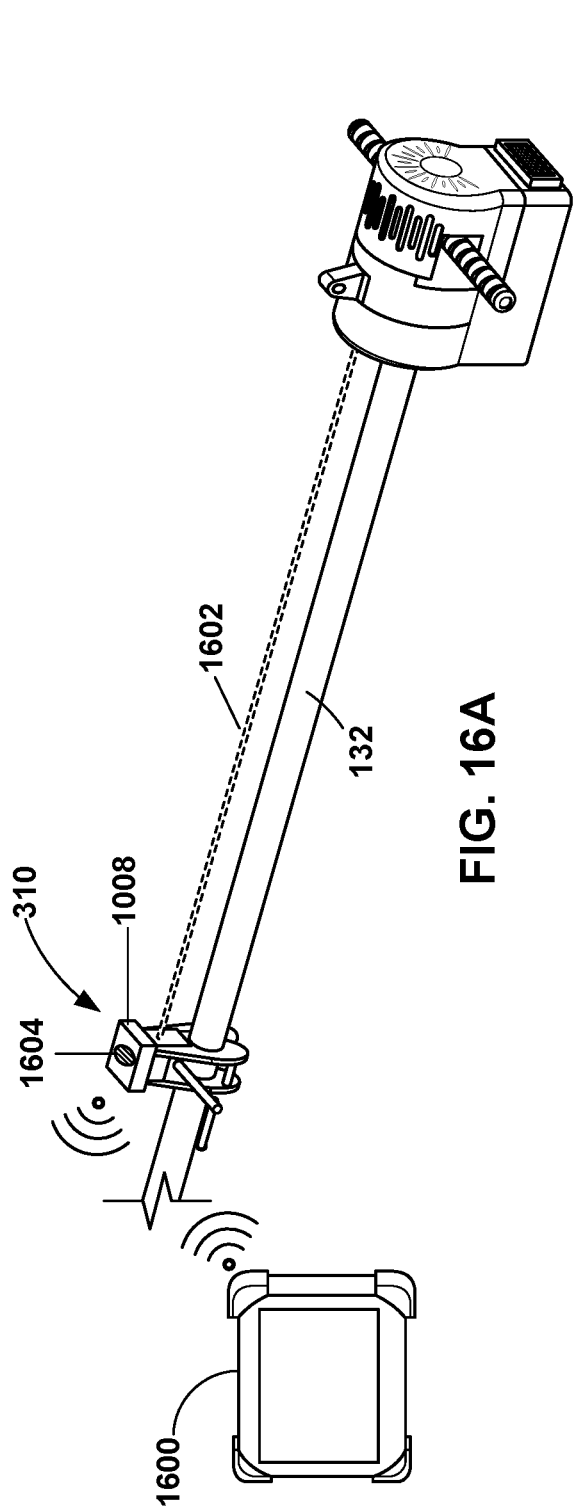
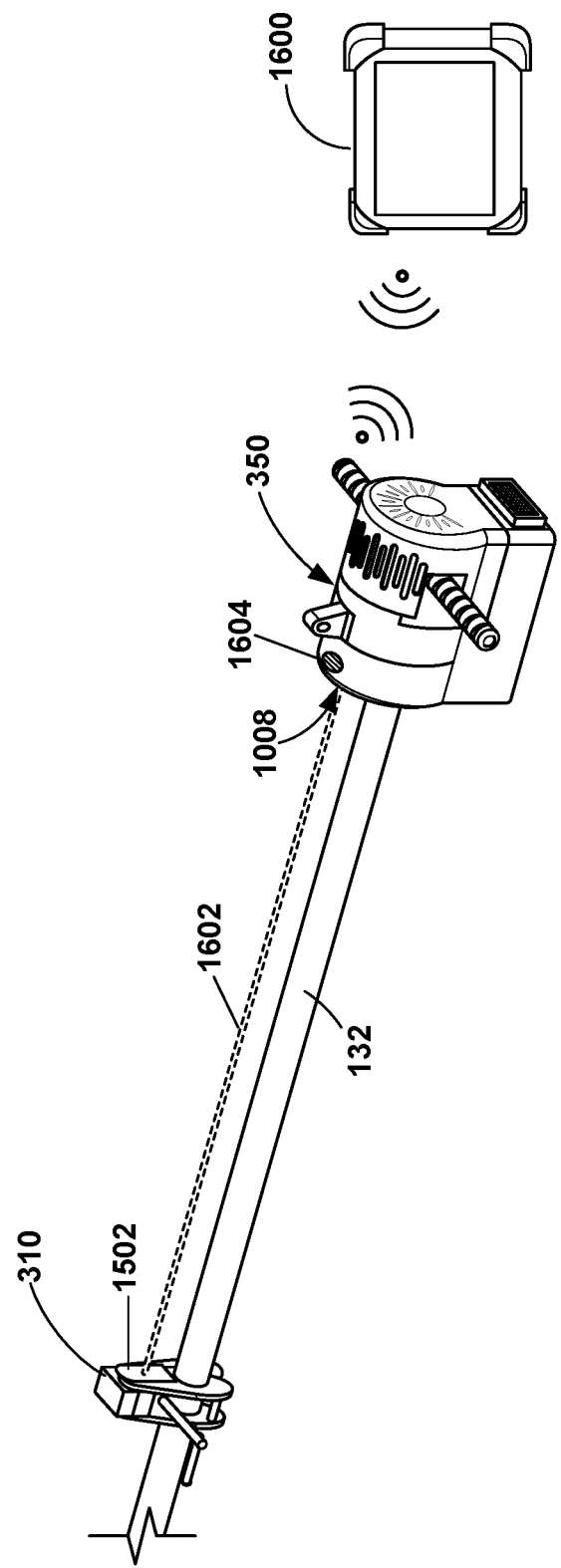

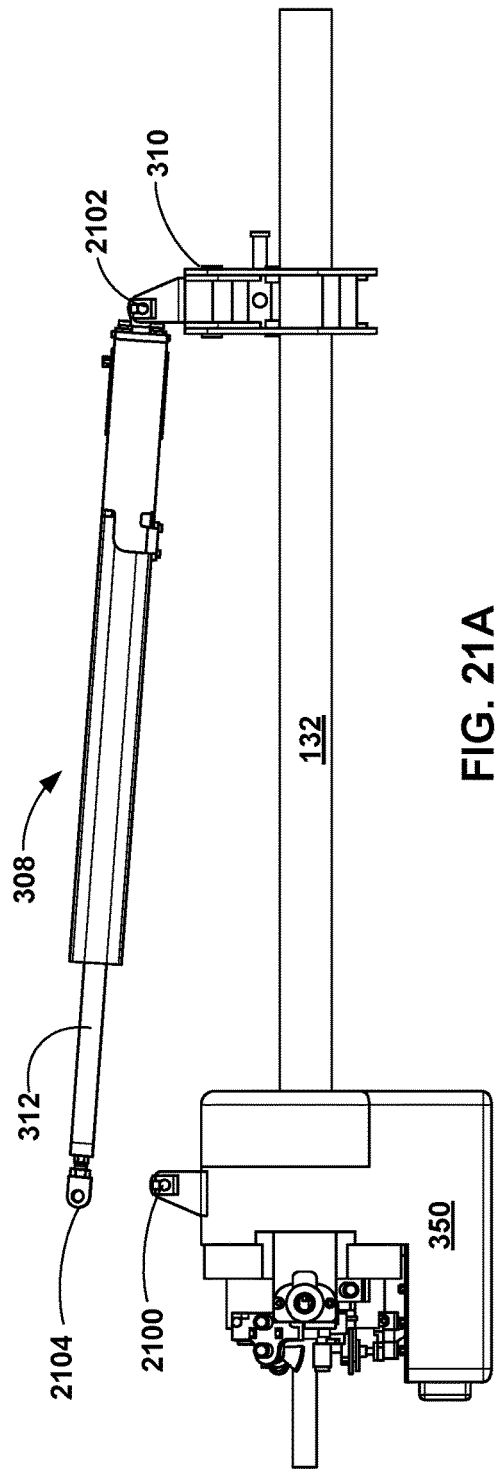
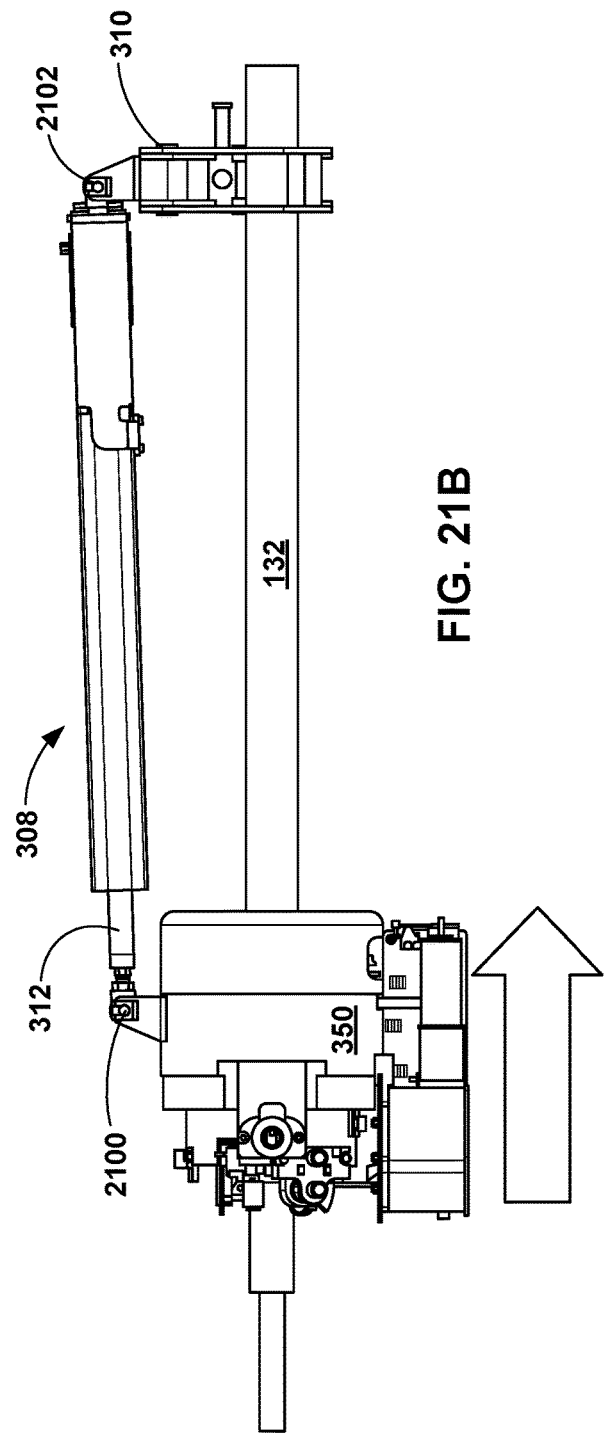
FIG. 21A
FIG. 21B

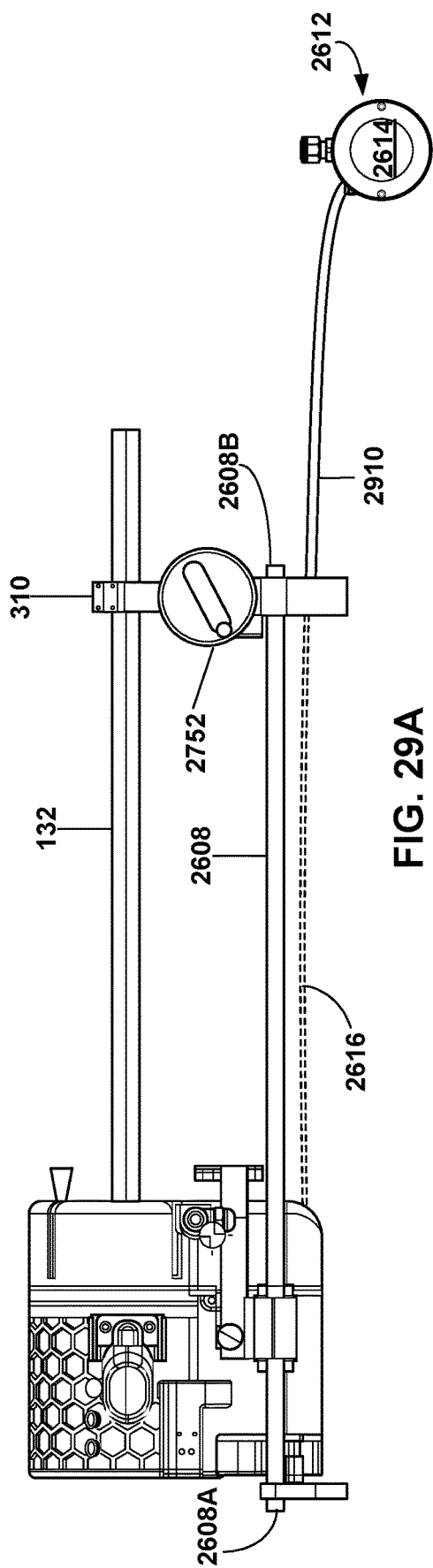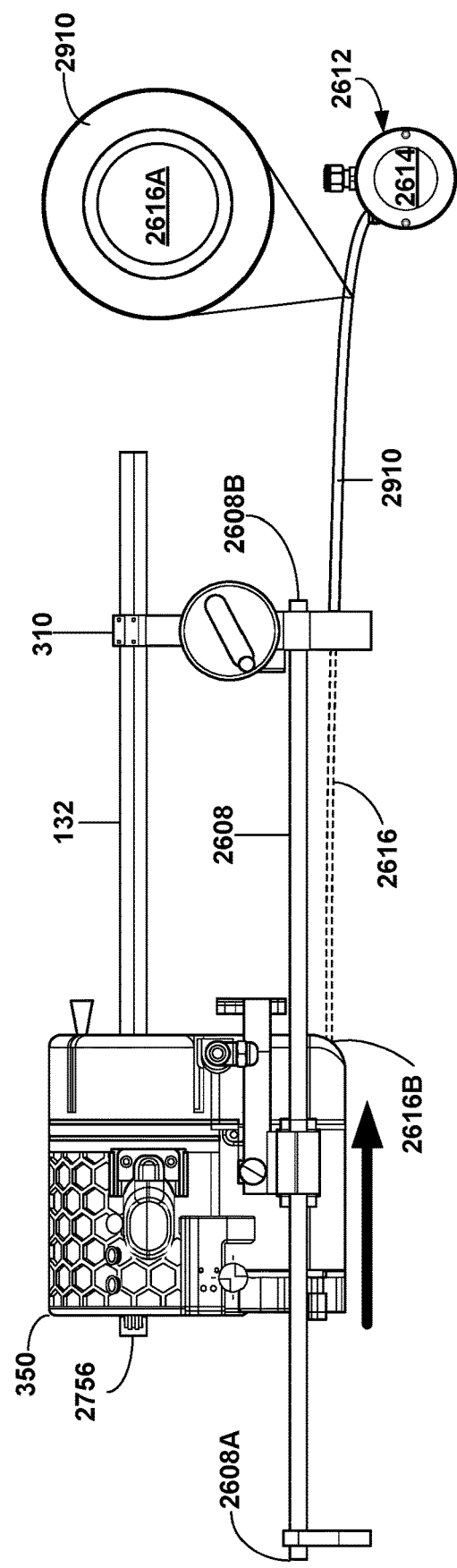
FIG. 29A
FIG. 29B

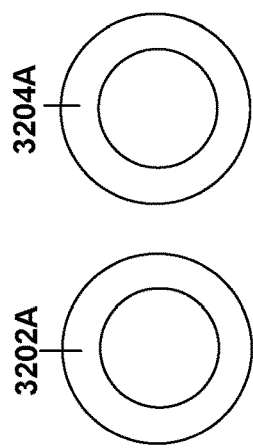
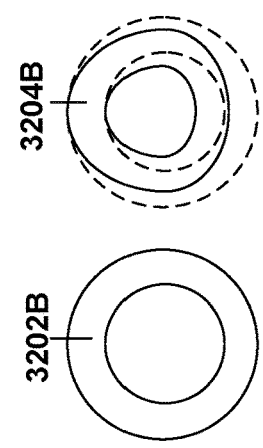
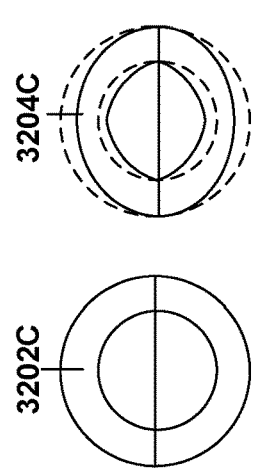
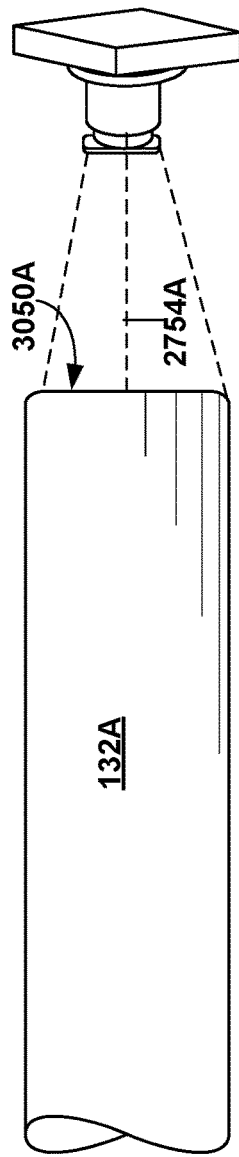
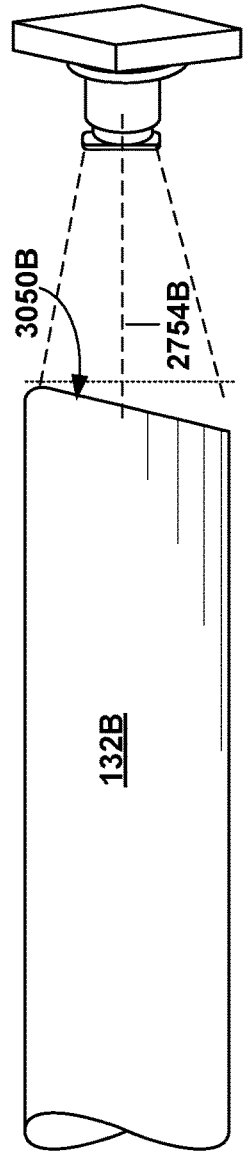
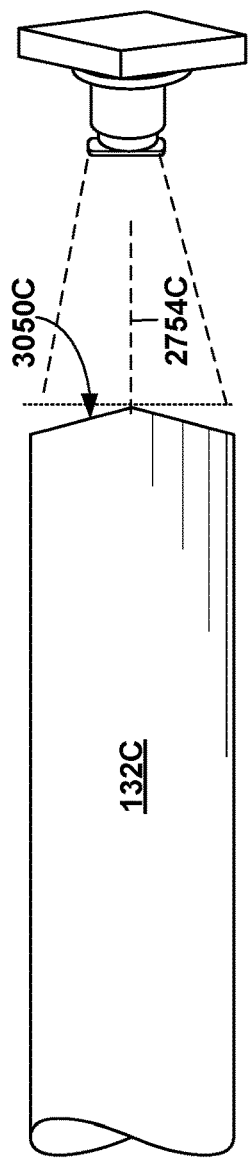
FIG. 32A  FIG. 32B  FIG. 32C

MEASUREMENT TOOL FOR CABLE-PREPARATION SYSTEM

This application claims the benefit of U.S. Provisional Patent Application No. 62/953,780, entitled "AUTOMATED CABLE PREPARATION WITH MODULAR SYSTEM," and filed on Dec. 26, 2019, the entire content of which is incorporated herein by reference.

TECHNICAL FIELD

The present disclosure relates to the field of electrical equipment for power utilities, including power cables and accessories thereof.

BACKGROUND

Electrical power grids include numerous components for operating in diverse locations and conditions, such as aboveground, underground, cold-weather climates, hot-weather climates, etc. A power grid may include thousands of discrete components, such as transformers, electrical cables, cable accessories (e.g., cable splices, terminations), etc., and a failure in the power grid may be caused by a failure in any single component or a subset of the components. Installation of electrical cables is a manual process prone to errors, which may cause failure in the electrical cable or a cable accessory.

SUMMARY

The present disclosure provides techniques for preparing electrical cables to connect to cable accessories for use in a power grid. According to examples of this disclosure, an electrical-cable-preparation system, including various interconnected modular components, is configured to remove one or more layers of the electrical cable for coupling the electrical cable to a cable accessory (e.g., a cable splice body or a termination).

In some examples, the electrical cable-preparation system includes a plurality of interconnectable modular components. According to various examples, the modular components may include one or more of; an imaging device having a telecentric lens configured to accurately image and measure a cross-section of an electrical cable; a handheld, rotatable tool head with a plurality of rollers and at least one rotatable cutting tool configured to cut or score one or more layers of the electrical cable; and a gripper module having driving means configured to drive the rotatable tool head axially along the electrical cable as the cutting tool rotates around the circumference of the cable, wherein the cable-preparation system is configured to coordinate the axial speed of the tool head with the rotational speed of the cutting tool to produce a desired cut, such as a spiral-cut.

Another technique provides for an electrical-cable-imaging device including a housing defining a cavity, wherein the housing is configured to position an end-face of an electrical cable within the cavity; a camera disclosed within the cavity of the housing, wherein the camera is configured to capture an image of the end-face of the electrical cable; and a telecentric lens optically coupled to the camera, wherein the telecentric lens comprises a non-angular field of view configured to reduce, in the image, distortion from parallax associated with at least one portion of the end-face of the electrical cable that is oriented at an oblique angle relative to an optical axis of the telecentric lens.

In another example, an electrical-cable-preparation system includes a cross-section sensing module comprising: a housing defining a cavity, wherein the housing is configured to position an end-face of an electrical cable within the cavity; a camera disclosed within the cavity of the housing, wherein the camera is configured to capture an image of the end-face of the electrical cable; and a telecentric lens optically coupled to the camera, wherein the telecentric lens comprises a non-angular field of view configured to reduce, in the image, distortion from parallax associated with at least one portion of the end-face of the electrical cable that is oriented at an oblique angle relative to an optical axis of the telecentric lens; and a computing device configured to receive the image from the camera.

In another example, a method includes capturing, by a camera communicatively coupled to a processor, an image of an end-face of an electrical cable, wherein a telecentric lens positioned in front of the camera removes, from the image, distortion from parallax, wherein the parallax is associated with at least one portion of the end-face of the electrical cable that is oriented at an oblique angle relative to an optical axis of the telecentric lens; and determining, by the processor, a diameter or a thickness of at least one layer of the electrical cable based on the image.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 12A and 12B show a profile view and an exploded view, respectively, of an example direct-drive mechanism of the cable-preparation device of FIG. 3, in accordance with various techniques of this disclosure.

FIG. 14A is a diagram of an example interface-and-control module (ICM) of a cable-preparation system, in accordance with various techniques of this disclosure.

FIG. 14B is a diagram of an example screen display of the ICM of FIG. 14A, in accordance with various techniques of this disclosure.

FIGS. 16A and 16B are diagrams of an example of the cable-preparation system of FIG. 3, including a cable-preparation device and a cable clamp with a retroreflector mounted on a cable, in accordance with various techniques of this disclosure.

FIGS. 21A and 21B are diagrams of an example of the cable-preparation system of FIG. 3, including a piston module coupled to an example cable-preparation device, in accordance with various techniques of this disclosure.

FIGS. 29A and 29B are diagrams depicting another example process for cable preparation using another example of the gripper module of FIGS. 26A and 26B, in accordance with various techniques of this disclosure.

FIGS. 32A-32C are conceptual diagrams illustrating example methods for using the cable-imaging-and-measurement device of FIGS. 30A and 30B.

It is to be understood that the embodiments may be utilized, and structural changes may be made without departing from the scope of the invention. The figures are not necessarily to scale. Like numbers used in the figures refer to like components. However, it will be understood that the use of a number to refer to a component in each figure is not intended to limit the component in another figure labeled with the same number.

DETAILED DESCRIPTION

Installation of cable accessories requires preparation of a cable end by removing layers at a correct length and depth to manage electrical stresses. The cable end becomes an integral part of the completed cable termination, splice, or separable connector. The cable-preparation step can be very time consuming, often lasting for more than half of the duration of the entire installation process for splices, and must be done correctly and precisely to avoid defects otherwise potentially leading to failure (e.g., arcing and permanent fault) of the cable system at the accessory.

Common defects include stray knife cuts into the insulation, incorrect cutbacks for the particular cable and accessory, remaining insulation screen (e.g., semi-conductive polymer) on the cable insulation, spurs, or nicks at the transition from the cable insulation to the insulation screen (e.g., semi-conductive layer), contamination on the insulation surface, and the like. In some cases, these insulation defects can be nullified by using grease or compound to fill the defects and displace air. However, installers may neglect or forget this step. Other concerns that increase the risk of defects and the time required for installation might include less-experienced installers and complicated, general-purpose instructions instead of specific instructions directed to the particular accessory, connector, and/or cable at hand.

Accordingly, there is a need for a device to automatically and quickly prepare cable ends, rather than a manual process, and thereby, to reduce defects or otherwise make the resulting termination, splice, or separable connection more resistant to failure. The device should be able to carry out many critical functions of cable preparation with little intervention, including seamless operator input or automated determination of cutback lengths and depths, real-time defect detection and correction, and the ability to deploy and operate in various field environments, such as the tight constraints of small cabinets.

Figure 1B:
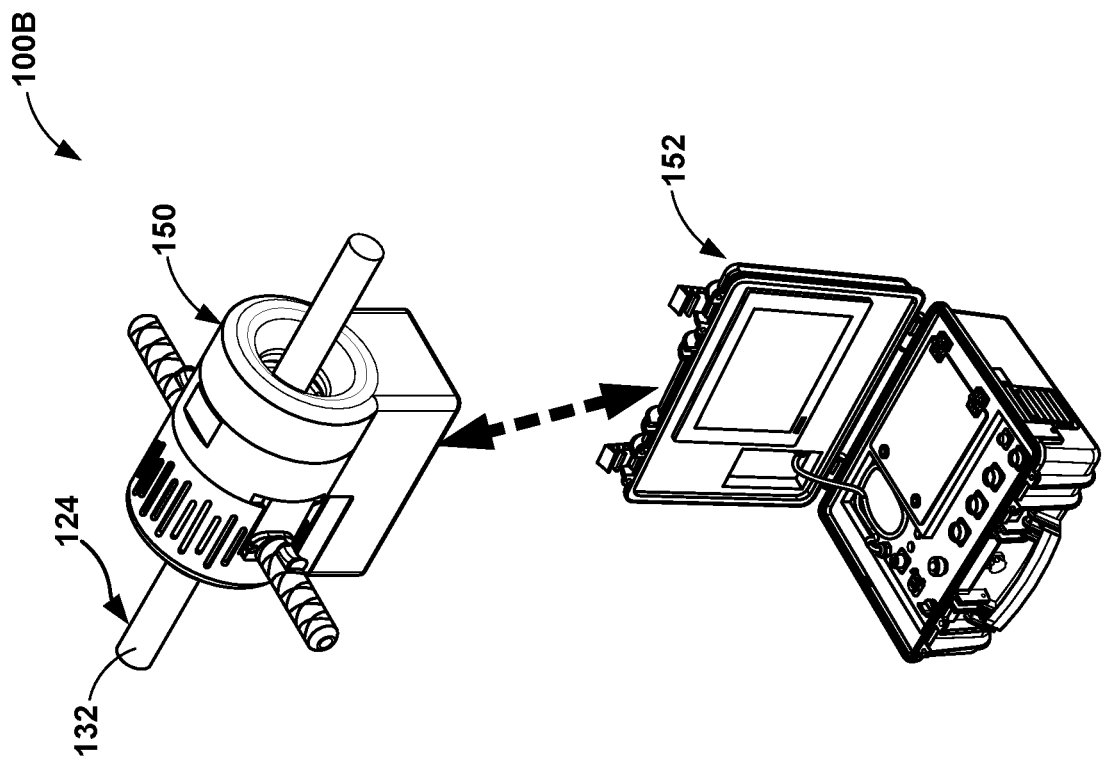
FIG. 1B is a diagram depicting an example system for preparing electrical cables for use within an electrical power system, in accordance with various techniques of this disclosure.
Figure 1A:
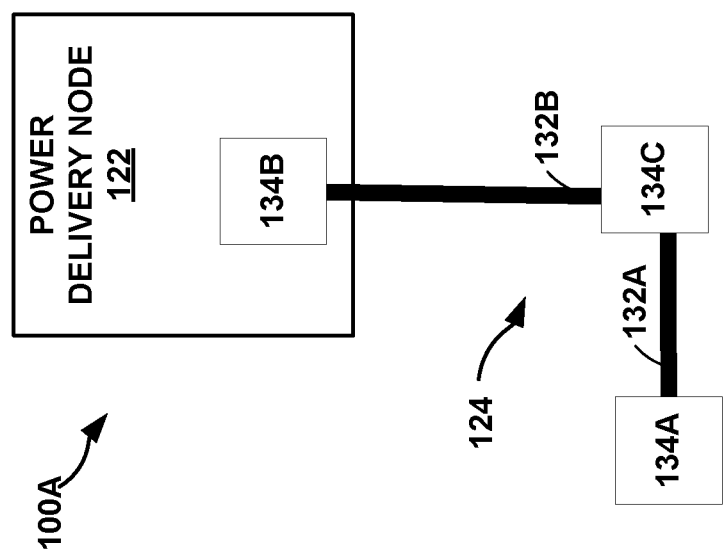
FIG. 1A is a block diagram illustrating various example components of an electrical power system, such as an electrical power grid, including electrical cables and cable accessories, in accordance with various techniques of this disclosure.

FIG. 1A is a block diagram illustrating various example components of an electrical power system 100A, such as an electrical power grid. As shown in the example of FIG. 1A, system 100A represents a physical environment in which one or more electrical power lines 124 provide power from a power source (e.g., a power plant) to one or more consumers (e.g., businesses, homes, government facilities, etc.). In the example of FIG. 1A, system 100A includes a plurality of articles of electrical equipment, such as one or more power-delivery nodes 122, one or more power lines 124 (including one or more individual electrical cables 132A and 132B (collectively, "electrical cables 132")), and one or more cable accessories 134A-134C (collectively, "cable accessories 134").

Power-delivery nodes 122 may include one or more input lines to receive electrical power (e.g., directly from a power source or indirectly via another power-delivery node 122) and one or more output lines to directly or indirectly (e.g., via another power-delivery node 122) distribute power to consumers (e.g., homes, businesses, etc.). Power-delivery nodes 122 may include a transformer to step voltages up or step voltages down. In some examples, power-delivery node 122 may be a relatively small node, such as an electrical cabinet, pole-mount transformer, or pad-mount transformer, to distribute power to homes in a neighborhood. As another example, power-delivery node 122 may be a relatively large node (e.g., a transmission substation) distributing power to other power-delivery nodes 122 (e.g., distribution substations), so the other power delivery-nodes further distribute power to consumers (e.g., homes, businesses, etc.).

Power lines 124 may transmit electrical power from a power source (e.g., a power plant) to a power consumer, such as a business or home. Power lines 124 may be underground, underwater, or suspended overhead (e.g., from wooden poles, metal structures, etc.). Power lines 124 may be used for electrical-power transmission at relatively high voltages (e.g., compared to electrical cables typically utilized within a home, which may transmit electrical power between approximately 12 volts and approximately 240 volts depending on application and geographic region). For example, power lines 124 may transmit electrical power above approximately 600 volts (e.g., between approximately 600 volts and approximately 1,000 volts). However, power lines 124 may transmit electrical power over any voltage and/or frequency range. For example, lines 124 may transmit electrical power within different voltage ranges. In some examples, a first type of lines 124 may transmit voltages of more than approximately 1,000 volts, such as for distributing power between a residence or small commercial customer and a power source (e.g., a power utility). As another example, a second type of lines 124 may transmit voltages between approximately 1 kV and approximately 69 kV, such as for distributing power to urban and rural communities. A third type of lines 124 may transmit voltages greater than approximately 69 kV, such as for sub-transmission and transmission of bulk quantities of electric power and connection to very large consumers.

In the example of FIG. 1A, power lines 124 include one or more electrical cables 132 and one or more electrical cable accessories 134A-134C. Electrical cables 132 may also be referred to as "electrical-power cables," "power cables," or simply "cables" throughout this disclosure. Electrical cables 132 include a conductor which may be radially surrounded by one or more layers of insulation. In some examples, electrical cable 132 include a plurality of stranded conductors (e.g., a three-phase or multi-conductor cable). Example cable accessories 134 may include splices, separable connectors, terminations, and connectors, among others. In some examples, cable accessories 134 may include cable splices configured to couple (e.g., electrically and physically) two or more electrical cables 132. For example, as shown in FIG. 1A, cable accessory 134C is configured to electrically and physically couple cable 132A to cable 132B. In some examples, terminations may be configured to couple (e.g., electrically and physically) a cable 132 to additional electrical equipment, such as a transformer, switch gear, power substation, business, home, or other structure. For example, as shown in FIG. 1A, cable accessory 134B electrically and physically couples cable 132B to power delivery node 122 (e.g., to a transformer of the power delivery node 122).

FIG. 1B is a diagram depicting an example system 100B for preparing electrical cables for use within electrical power system 100A of FIG. 1A, in accordance with various techniques of this disclosure. As shown in FIG. 1B, cable-preparation system 100B includes at least a cable-preparation device 150 and a computing device 152.

Cable-preparation device 150 is configured to automatically cut one or more layers of electrical cable 132 (e.g., one of electrical cables 132 of FIG. 1A) to prepare electrical cable 132 for coupling to a cable accessory (e.g., cable accessory 134A of FIG. 1A). Cable-preparation device 150 may be configured to automatically remove various layers (e.g., a jacket layer, a shield layer, an insulation layer, an insulation screen layer, a conductor screen layer, or other layers) of electrical cable 132 as the device cuts the layers. For example, as described in further detail below, cable-preparation device 150 may include one or more cutting tools (e.g., knife blades, saws, etc.) configured to cut the various layers of electrical cable 132.

Cable-preparation device 150 may more-efficiently and more-accurately prepare electrical cable 132 for installation within power line 124 of power system 100A as compared to existing techniques. In some examples, cable-preparation device 150 includes a rotatable tool head. In some examples, the rotatable tool head includes one or more individual cutting tools which may each be configured (e.g., shaped, positioned, and/or oriented) to perform a different "type" of cut (e.g., a scoring cut, a shaving cut, and/or a through cut) into various layers of electrical cable 132 in a selected direction (e.g., longitudinally, radially, and/or circumferentially), and in some examples, remove various layers of electrical cable 132. In one example, the tool head includes a plurality of rollers configured to support electrical cable 132 while one or more cutting tools of the tool head cut the various layers.

System 100B includes a computing device 152 communicatively coupled to cable-preparation device 150, and configured to control operation of cable-preparation device 150. In some examples, computing device 152 controls cable-preparation device 150 to adjust various components of cable-preparation device 150 to cut the various layers of electrical cable 132. In one example, computing device 152 outputs a command causing cable-preparation device 150 to adjust a depth of the plurality of rollers, which may enable the tool head to support electrical cable 132 as the cutting tools cut the various layers of electrical cable 132.

In some examples, computing device 152 outputs various commands to control the starting position of the cutting tools and a cutting distance (e.g., a cutting depth or cutback length) of the cutting tools. In one example, computing device 152 causes the tool head to start cutting at one end of electrical cable 132. In another example, computing device 152 causes the tool head to start cutting a pre-determined distance from the end of the electrical cable 132 to create a retention band of one or more layers of electrical cable 132. The retention band may prevent one or more layers of electrical cable 132 from moving or becoming loose while the tool head cuts the layers of electrical cable 132.

In some scenarios, computing device 152 outputs commands to remove one or more layers of electrical cable 132. In one example, a command causes a cutting tool to penetrate to a selected depth of electrical cable 132 to create a tab within at least one layer of cable 132. Another command causes the cutting tool to partially retract the cutting tool (e.g., to a shallower cutting depth) so the cutting tool may remove one or more exterior layers of electrical cable 132 without cutting one or more interior layers of electrical cable 132.

In this way, computing device 152 may enable cable-preparation device 150 to prepare an electrical cable faster, and control the cutting depth and cutback length of cuts to one or more layers of an electrical cable more accurately, than other techniques. More-accurately cutting the layers of electrical cable 132 may reduce defects in the electrical cable (e.g., in a cable splice). For example, more-accurately cutting the layers may reduce air voids, and hence decrease the probability and/or quantity of partial-discharge events. Reducing the probability and/or quantity of partial-discharge events may decrease the probability of failure events of electrical cable 132 and increase the useful-life expectancy of the electrical cable 132 and/or cable accessories 134. Reducing the probability of failure events may increase the reliability of power grid 100A of FIG. 1A. Further, increasing life expectancy of electrical cable 132 may decrease costs of constructing, operating, and maintaining power grid 100A.

The examples described above and herein have been and will be discussed with respect to computing device 152 for purposes of example only. It is to be understood that the functions described may be implemented by any suitable computing device. Moreover, the term "computing device" is used to refer to any computing platform having one or more processors providing an execution environment for programmable instructions. For example, a computing device may include one or more computers (e.g., servers, desktops, laptops, tablets, smart phones, blade computers, virtual machines, or the like) coupled to, or otherwise in communication with, cable-preparation device 150. As other examples, a computing device may include one or more processors embedded within cable-preparation device 150.

Figure 2:
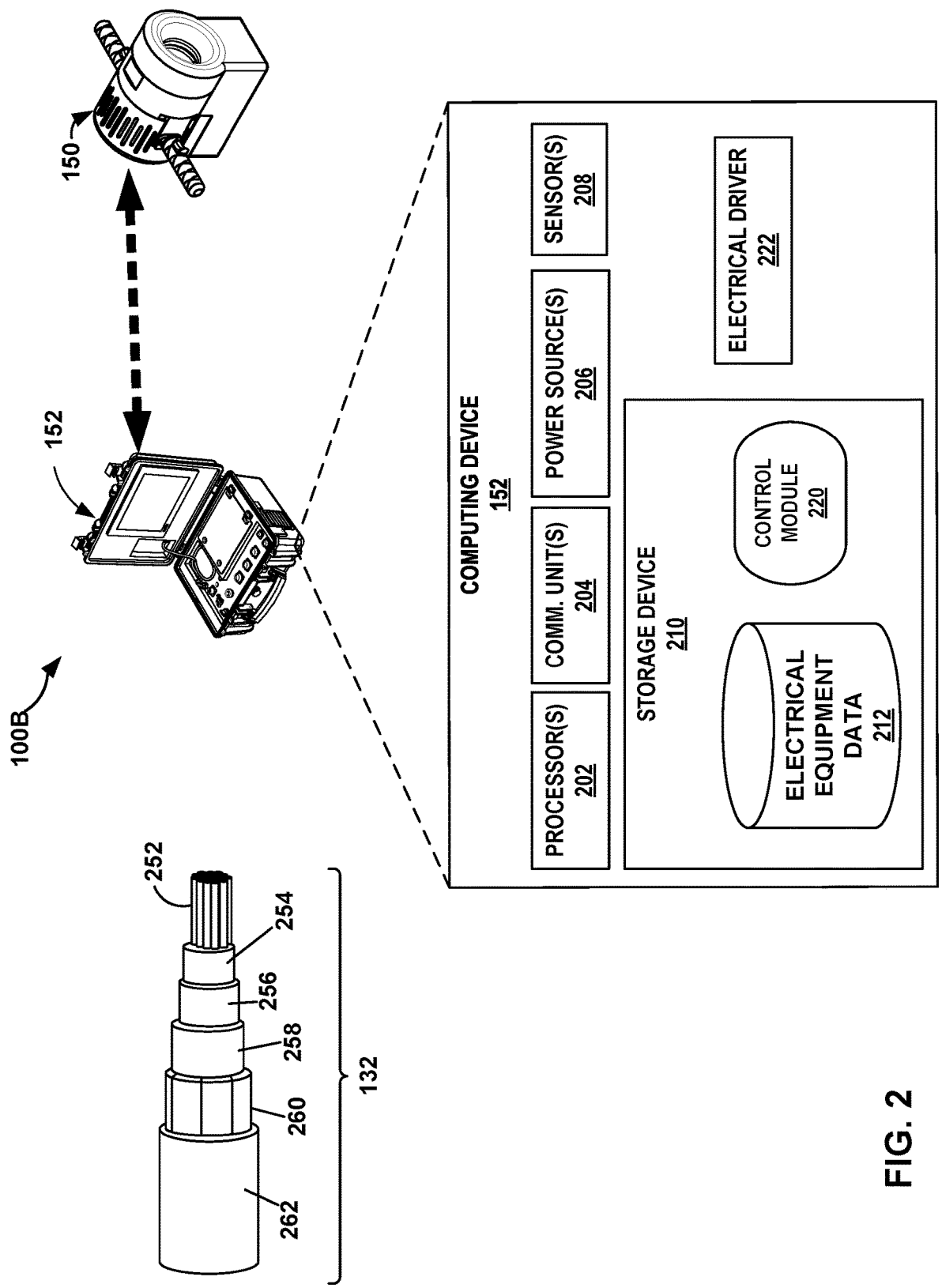
FIG. 2 is a diagram of an example of the cable-preparation system of FIG. 1B, in accordance with various techniques of this disclosure.

FIG. 2 is an illustrative diagram of an some example components of cable-preparation system 100B of FIG. 1B. In the example of FIG. 2, electrical cable 132 includes a plurality of concentric (e.g., cylindrical) layers, such as central conductor 252, conductor screen 254, insulation 256, insulation screen 258, shield 260 (also referred to as "sheath 260"), and jacket 262. However, in some examples, electrical cable 132 may include more or fewer layers. The layers of cable 132 are not necessarily drawn to scale. Electrical cable 132 may be configured for AC and/or DC power transmission.

Electrical cable 132 may transmit voltages of 11 kV, 33 kV, 66 kV, 360 kV, as a few non-limiting example voltages. In some instances, electrical cable 132 transmits electrical power between a power source and a substation by transmitting voltages of 360 kV or more, which may be considered "transmission level" voltages. In some examples, electrical cable 132 is configured to transmit voltages between 33 kV and 360 kV, such as 66 kV or 33 kV, which may be considered "sub-transmission-level" voltages, and may provide electrical power from a power source to an end-operator or customer (e.g., customers utilizing a relatively large amount of power). As another example, electrical cable 132 transmitting electrical power between a distribution substation and a distribution transformer may transmit voltages less than 33 kV, which may be considered "distribution level" voltages. Electrical cable 132 may also transmit electrical power between a distribution substation or distribution transformer (e.g., a pad-mount transformer or pole-mount transformer) and end-operators or consumers (e.g., homes and businesses) and may transmit voltages between 360 volts and 240 volts. At such voltages, electrical cable(s) 132 may be referred to as "secondary distribution lines."

Central conductor 252 includes a conductive material, such as copper or aluminum. In some examples, central conductor 252 includes a single solid conductor or a plurality of stranded conductors. A diameter or thickness of the central conductor 252 is based on the electrical current that electrical cable 132 is designed to transmit or conduct. In other words, the cross-sectional area of central conductor 252 is based on the electrical current that electrical cable 132 is designed to transmit. For example, central conductor 252 may be configured to transmit electrical currents of 1,000 amperes or more.

Conductor screen 254 may include a semi-conductive polymer, such as a carbon-black-loaded polymer. The semi-conductive polymer may have a bulk resistivity ranging from approximately 5 ohm-cm to approximately 100 ohm-cm. Conductor screen 254 may be physically and electrically coupled to central conductor 252. In the example of FIG. 2, conductor screen 254 is disposed between central conductor 252 and insulation 256. Conductor screen 254 may provide a continuous conductive surface around the exterior of central conductor 252, which may reduce or eliminate sparking otherwise created by central conductor 252.

In some examples, insulation 256 includes polyethylene, such as a cross-linked polyethylene (which may be abbreviated as PEX, XPE, or XLPE) or an ethylene-propylene rubber (which may be abbreviated as EPR). A diameter or thickness of the insulation 256 is based on the voltage electrical cable 132 is designed to transmit or conduct.

Insulation screen 258 may include a semi-conductive polymer-like conductor screen. In the example of FIG. 2, insulation screen 258 is disposed between insulation 256 and shield 260. Insulation screen 258 may be coupled to insulation 256. In some examples, insulation screen 258 is electrically coupled to shield 260.

Shield 260 may include a conductive material, such as a metal foil or film or wires. In some examples, shield 260 may be referred to as an "earth ground conductor."

As illustrated in FIG. 2, jacket 262, also referred to as an "over sheath," is an outer layer of electrical cable 132. Jacket 262 may be a plastic or rubber polymer, such as polyvinyl chloride (PVC), polyethylene (PE), or ethylene propylene diene monomer (EPDM).

Electrical cable 132 may include additional layers, such as a swellable material or a water-blocking material placed within the conductor strands (e.g., a strand fill) or between various layers within electrical cable 132.

Computing device 152 includes one or more power sources 206 to provide power to components shown in computing device 152. In some examples, power sources 206 include a primary power source to provide electrical power, and a secondary, backup power source to provide electrical power if the primary power source is unavailable (e.g., fails or is otherwise not providing power). In some examples, power source 206 includes a battery, such as a lithium-ion battery.

One or more processors 202 may implement functionality and/or execute instructions within computing device 152. For example, processors 202 may receive and execute instructions stored by storage device 210. These instructions executed by processors 202 may cause computing device 152 to store and/or modify information within storage devices 210 during program execution. Processors 202 may execute instructions of components to cause control module 220 to perform one or more operations in accordance with techniques of this disclosure. That is, control module 220 may be operable by processor 202 to perform various functions described herein.

One or more communication units 204 of computing device 152 may communicate with external devices by transmitting and/or receiving data. For example, computing device 152 may use communication units 204 to transmit and/or receive radio signals on a radio network such as a cellular radio network. Examples of communication units 204 include a network interface card (e.g. such as an Ethernet card), an optical transceiver, a radio frequency transceiver, or any other type of device sending and/or receiving information. Other examples of communication units 204 may include Bluetooth®, cellular (e.g., 3G, 4G), LPWAN, and Wi-Fi® radios. As another example, communications unit 204 may communicate with external devices by transmitting and/or receiving data via wired communication.

Figure 23C:
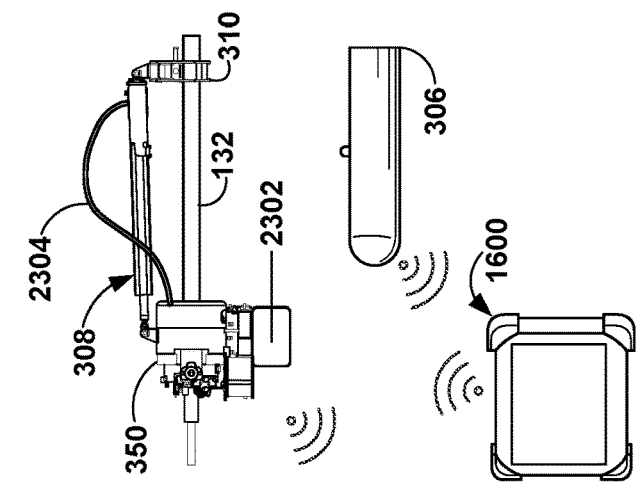
FIGS. 23A-23C are diagrams of an example of the cable-preparation system of FIG. 3, including a piston module (PM) coupled to an example cable-preparation device, an example ICM, and an example cross-sectional-sensing module (CSSM), in accordance with various techniques of this disclosure.
Figure 23B:
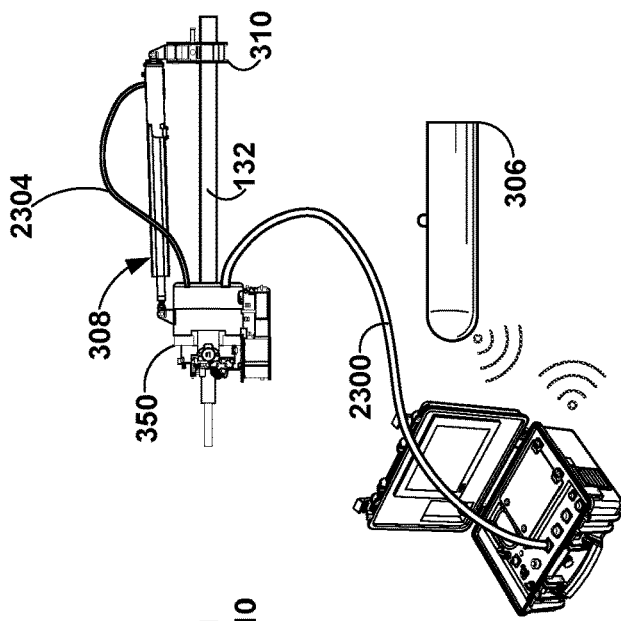
Figure 23A:
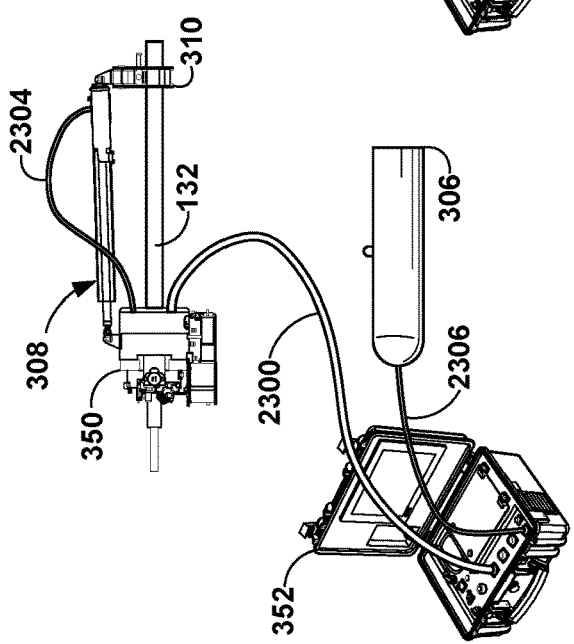

Computing device 152 may include one or more sensors 208. In one example, sensors 208 include one or more position sensors to detect the position of various components of cable preparation-device 150 (e.g., the position of a tool head, rollers, or cutting tools, among others). In another example, sensors 208 may include one or more velocity sensors configured to measure the velocity of various components of cable-preparation device 150. In another example, cable-preparation device 150 can include sensors (e.g., position, velocity, distance, torque, force, etc.) and can communicate sensor readings to computing device 152. In another example, all sensors 208 are located on other modular devices of system 100B, such as those described further below with respect to FIG. 3. Computing device 152 can be connected to sensors 208 through data cables (as shown in FIG. 23A) or wirelessly (as shown in FIGS. 23B and 23C) and computing device 152 interprets the sensor signals. Sensors 208 can be in the modules and feed a local processor controlling motors based on the sensor readings. In other words, encoders can be built into the motor or torque/power feedback from the motors, as discussed in greater detail below. Further any or all of the modular components of the system can have cameras as sensors 208.

Sensors 208 may include one or more imaging devices, such as a camera or barcode scanner. For example, any or all of cable-preparation device 150, computing device 152, or any of the additional modular components of FIG. 3 may include one or more cameras configured to take images of electrical cable 132 before, during, and/or after the layers of electrical cable 132 are cut.

One or more storage devices 210 may store information for processing by processors 202. In some examples, storage device 210 is a temporary memory, meaning that long-term storage is not a primary purpose of storage device 210. Storage device 210 may be configured for short-term storage of information as volatile memory, and therefore, may not retain stored contents if deactivated. Examples of volatile memories include random-access memories (RAM), dynamic random-access memories (DRAM), static random-access memories (SRAM), and other forms of volatile memories known in the art.

Storage device 210 may, in some examples, also include one or more computer-readable storage media. Storage device 210 may be configured to store larger amounts of information than volatile memory. Storage device 210 may further be configured for long-term storage of information as non-volatile memory, e.g., retaining information after or across activated/off cycles. Examples of non-volatile memories include solid-state drives (SSDs), magnetic-storage hard-disk drives (HDDs), flash memories, or forms of electrically programmable memories (EPROM) or electrically erasable and programmable (EEPROM) memories. Storage device 210 may store program instructions and/or data associated with other components, such as control module 220.

In the example of FIG. 2, storage devices 210 include electrical-equipment-data repository 212. Data repository 212 may include relational databases, multi-dimensional databases, maps, hash tables, or any other data structure storing data. In some examples, electrical-equipment-data repository 212 includes device or equipment data, manufacturing data, installation data, consumer data, and/or power-distribution data, among others. For example, electrical-equipment-data repository 212 may include, for each of cable accessories 134 (FIG. 1A), data identifying a date of manufacture, a date of installation, a location (e.g., GPS coordinates, street address, etc.), an entity that installed the cable accessory, a unique identifier (e.g., a serial number), a type of cable accessory, or the like. As another example, electrical equipment data repository 212 may include data indicating cutting dimensions for various types of electrical cables and/or cable accessories.

According to aspects of this disclosure, control module 220 may be operable by one or more processors 202 to functionality of computing device 152 as described herein. For example, control module 220 may output commands to control operation of the cable-preparation device 150. In some examples, control module 220 may also respond to combinations of readings from sensors and stored data, according to programmed logic, by modifying the position or the velocity of physical components in the cable-preparation device, such as cutting tools. In some examples, control module 220 controls cable-preparation device 150 to adjust various components of cable-preparation device 150 to cut the various layers of electrical cable 250. In one example, control module 220 outputs a command causing cable-preparation device 150 to adjust a radial depth of the plurality of rollers, which may enable the tool head to support electrical cable 132 as the cutting tools cut the various layers of electrical cable 132.

In some examples, control module 220 outputs various commands to control the starting position of the cutting tools and a cutting distance (e.g., a cutting depth or cutback length) of the cutting tools. For example, control module 220 may cause the tool head to start cutting at one end of electrical cable 132. In another example, control module 220 may cause the tool head to start cutting a pre-determined distance from the end of electrical cable 132 to create a retention band of one or more layers of electrical cable 132. The retention band may prevent one or more layers of electrical cable 132 from moving or becoming loose while the tool head cuts the layers of electrical cable 132.

In some scenarios, control module 220 outputs commands to remove one or more layers of electrical cable 132. In one example, a command causes a cutting tool to penetrate to a depth of electrical cable 132. Another command partially retracts the cutting tool (e.g., to a shallower cutting depth) so the cutting tool may remove one or more exterior layers of electrical cable 132 without cutting one or more interior layers of electrical cable 132.

Electrical driver 222 may control characteristics of electrical power supplied to various components of cable-preparation device 150. Example components of cable-preparation device 150 include motors and/or actuators driving a tool head or tool-positioning driver, among others. Example characteristics of the electrical power include voltage, current, and/or frequency. In one example, electrical driver 222 outputs a command to a power converter to control the characteristics of the electrical power. In another example, electrical driver 222 includes a power converter to control the characteristics of the electrical power.

Figure 3:
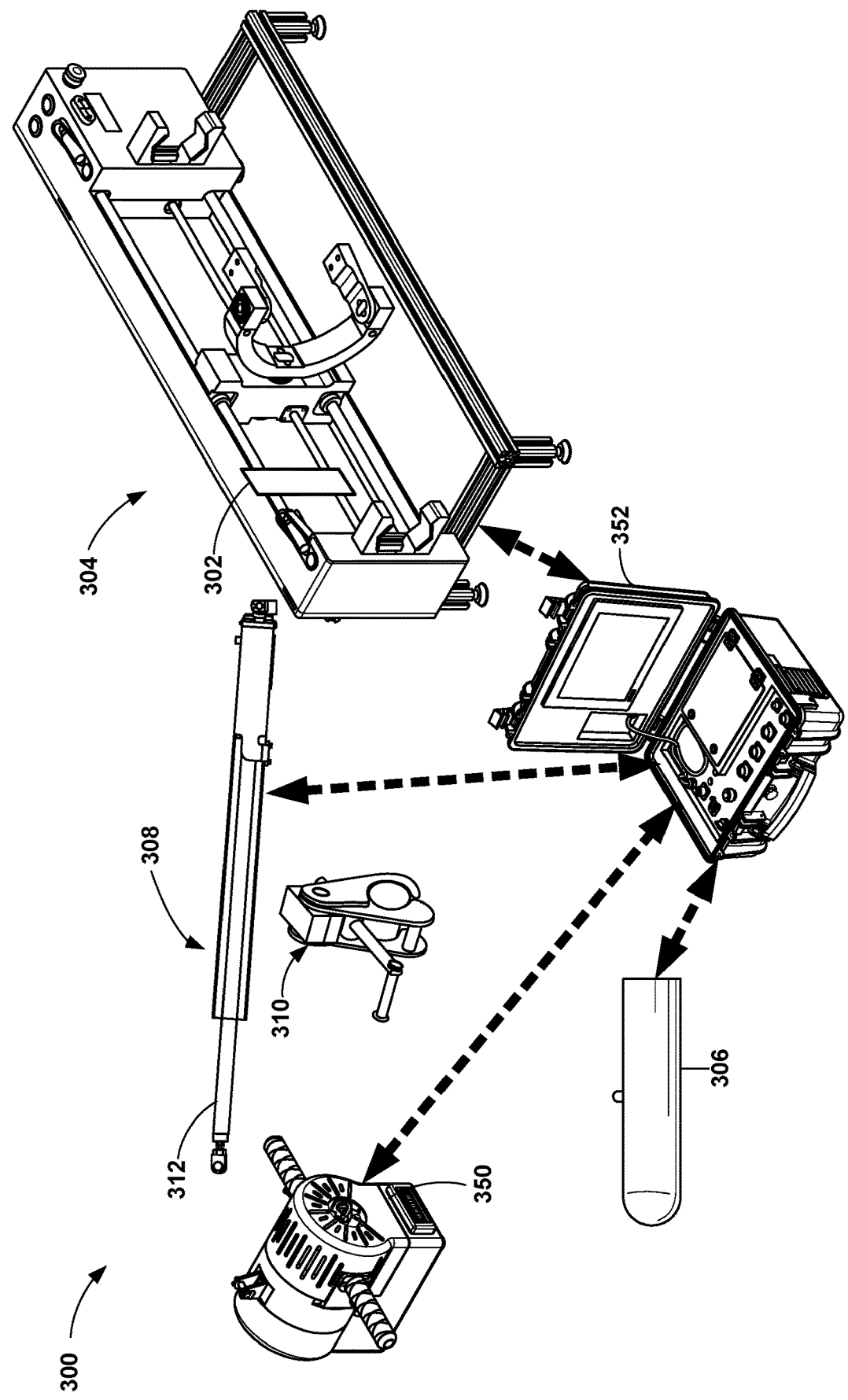
FIG. 3 is a diagram of another example of the cable-preparation system of FIG. 1B, including a cable-preparation device, in accordance with various techniques of this disclosure.

FIG. 3 is an illustrative diagram of a modular cable-preparation system 300 to prepare electrical cables, such as for installation to electrical-power grid 100A of FIG. 1A. Cable-preparation system 300 is an example of cable-preparation system 100B of FIG. 1B, with one or more additional "modular" components, such as discrete or distinct components that may be physically or communicatively coupled to one another. Cable-preparation system 300 includes at least a modular cable-preparation device 350 that can be used by itself in a "handheld" mode and/or can be used while mounted on a base 304 (also referred to herein as "sledge 304"). Several modules make up the entire cable-preparation system 300, but not all modules may need to be used for any particular cable-preparation process or procedure, with the choice of the use of sledge 304 (in lieu of the "handheld" mode of device 350) depending on the specific parameters of the particular electrical-cable-preparation application, and/or depending on user preference.

As shown in FIG. 3, cable-preparation system 300 is constructed of several separate but interconnectable modules, including cable-preparation device 350 (also referred to herein as "main work module 350" or "MWM 350"), computing device 352 (also referred to herein as "interface and control module 352" or "ICM 352"), sledge module 304, cross-section-sensing module ("CSSM") 306, and piston module 308. In one example, the modules of system 300 may further include an axial-sensing module 302 for post-preparation quality-validation and documentation. Axial-sensing module 302 may include cameras mounted to SM 304 to examine the prepared cable 132 along the longitudinal axis of the cable 132. Axial-sensing module 302 can be a separate module similar to CSSM 306 or can be camera-mounted within sledge 304. In some examples, axial-sensing module 302 may be used to capture imagery depicting the end of cable 132 (FIG. 2) and/or the longitudinal length of cable 132 in at least one rotational position, for example, to identify defects in the prepared cable 132 and/or validate and confirm the quality of preparation meets certain requirements. In some examples, axial-sensing module 302 and/or CSSM 306 may include a telecentric lens (e.g., a lens having a non-angular field-of-view). The telecentric lens may be configured to reduce or eliminate the effect of parallax within the imagery of the end of cable 132. Parallax error may distort portions of the imagery associated with corresponding "anomalous" portions of the end-face of electrical cable 132 that are oriented at oblique angles relative to an optical axis of the telecentric lens, or otherwise depart from a common transverse planar surface of the end-face of cable 132.

System 300 includes MWM 350, which is an example of cable-preparation device 150 of FIGS. 1B and 2, except for any differences noted herein. MWM 350 is a relatively small, lightweight, handheld unit that may be used, for example, in environments in which available space is a constraint. In other examples, MWM 350 may be coupled to sledge 304 to provide stability and functionality, such as when operating in environments in which available space is not a constraint. In some examples, such as the examples shown in FIGS. 23A and 23B below, system 300 includes various connecting cables to carry power, sensor feedback, and control data. The various connecting cables may be used to interconnect the various modules as needed. In some examples, such as the example shown in FIG. 23C below, system 300 may include wireless communication capabilities to send data from one module to another. Some components within the modules can be removed and integrated with other modules. Further, there can be multiple different combinations of all of modules 350, 352, 304, 306 and 308.

ICM 352 is an example of computing device 152 of FIGS. 1B and 2, except for the differences noted herein. ICM 352 can provide a main operator interface, a power supply, processing, battery, motor power supplies and a display and user interface.

CSSM 306 can have a camera, sensors, indicators, and lighting for visual measurement of cable layer diameter and thickness. Piston module 308 is configured to provide support for MWM 350 during handheld operations, and further includes driving means configured to provide an axial motion in order to drive MWM 350 axially forward along electrical cable 132. Piston module 308 can have a clamp 310 and a linear drive 312, as discussed in greater detail below. For example, in accordance with the techniques of this disclosure, system 300 is configured to coordinate the axial motion of MWM 350 generated by a driving module, along with a circumferential (e.g., rotational) motion of one or more rotatable tools within MWM 350, in order to generate a desired type of cut, such as a spiral cut, in order to remove one or more layers of cable 132.

Sledge module 304 is configured to provide support for MWM 350 during sledge-mounted operations, and further configured to drive MWM 350 axially forward along electrical cable 132. Sledge 304 can have a mounting gimbal, linear drive, stand, cable-clamp controls (e.g., jog, start, stop) and can support floor-mounting, wall-mounting, bucket-mounting, and other mounting options for sledge 304.

Figure 4B:
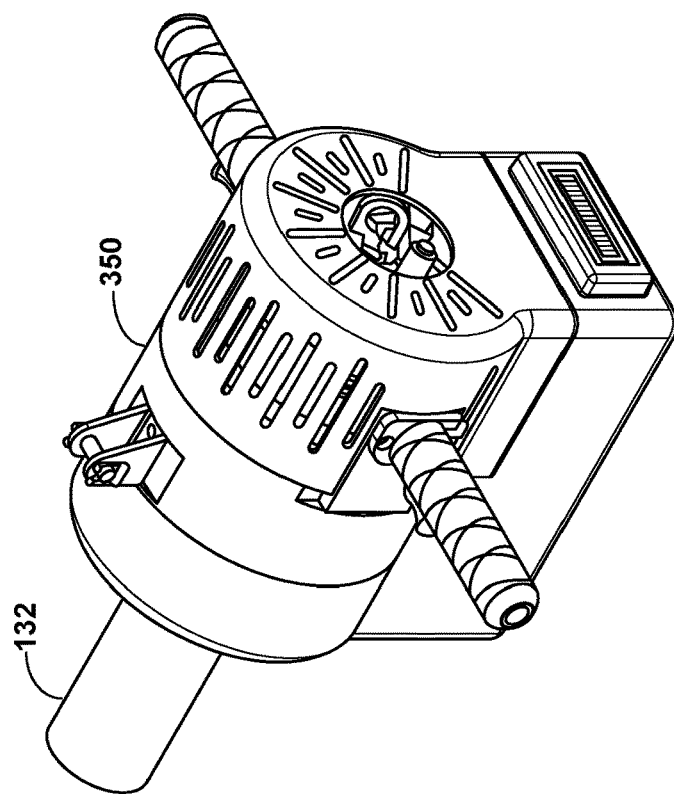
FIGS. 4A and 4B are perspective views of an example of the handheld cable-preparation device of the cable-preparation system of FIG. 3, in accordance with various techniques of this disclosure.
Figure 4A:
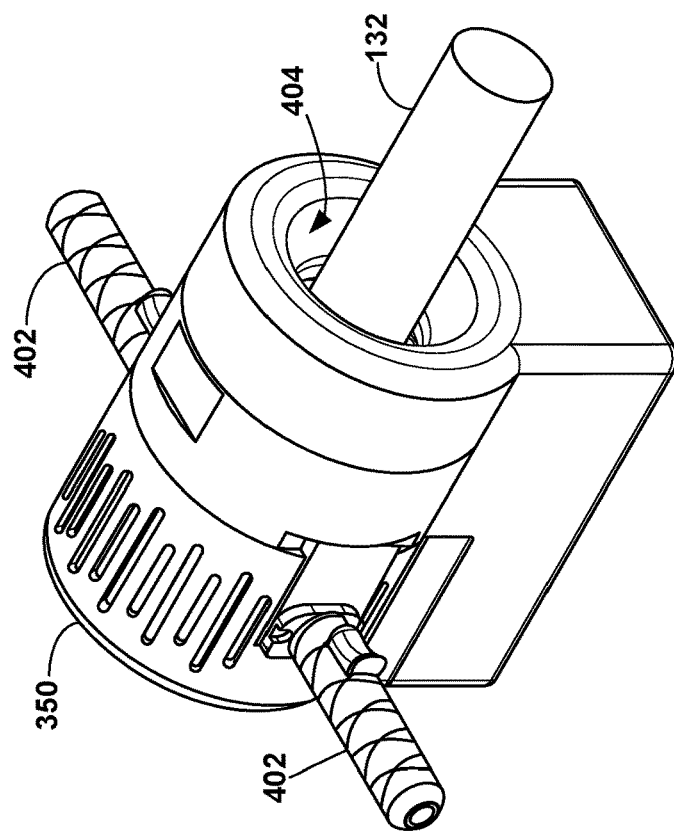
Figure 25:
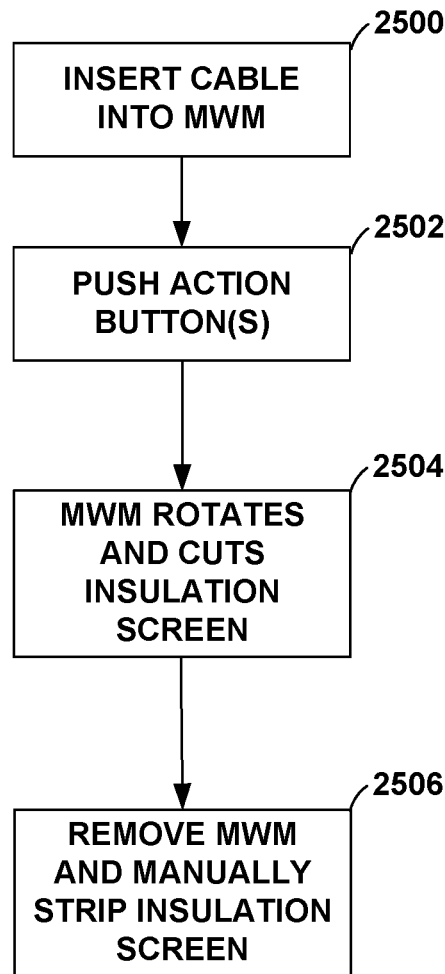
FIG. 25 is a flow diagram of an example process utilizing the example cable-preparation system of FIG. 3, including a cable-preparation device and a piston module, in accordance with various techniques of this disclosure.

FIGS. 4A and 4B are perspective views of an example of MWM 350 of FIG. 3. MWM 350 removes a cable's layers by adjusting and rotating blades (as discussed in greater detail below) around cable 132 while providing sensor feedback to a control system, such as ICM 352 of FIG. 3. MWM 350 is modular and can be used in a handheld mode (via handles 402) or can be used mounted on sledge 304 (FIG. 3). Sledge 304 may provide axial motion along cable 132 while MWM 350 is mounted on sledge 304. In handheld use, axial motion of MWM 350 along cable 132 may be achieved by controlling the pitch of the blade removing the cable jacket 262 and insulation 256 (FIG. 2). Piston module 308 (FIG. 3) is utilized for the removal of conductor screen 254 (FIG. 25). MWM 350 controls a plurality of blades, such as, for example, three blades for each of cable jacket 262, insulation 256, and insulation screen 258. MWM 350 can adapt to a plurality of cable size ranges, such as two or more cable size ranges, by changing out blade holders (e.g., as performed by an operator of MWM 350). MWM 350 includes a roller mechanism configured to close radially inward onto cable 132, thereby securing cable 132 in place during cable preparation. Cable 132 can be accepted within MWM 350 through cable opening 404.

Figure 5B:
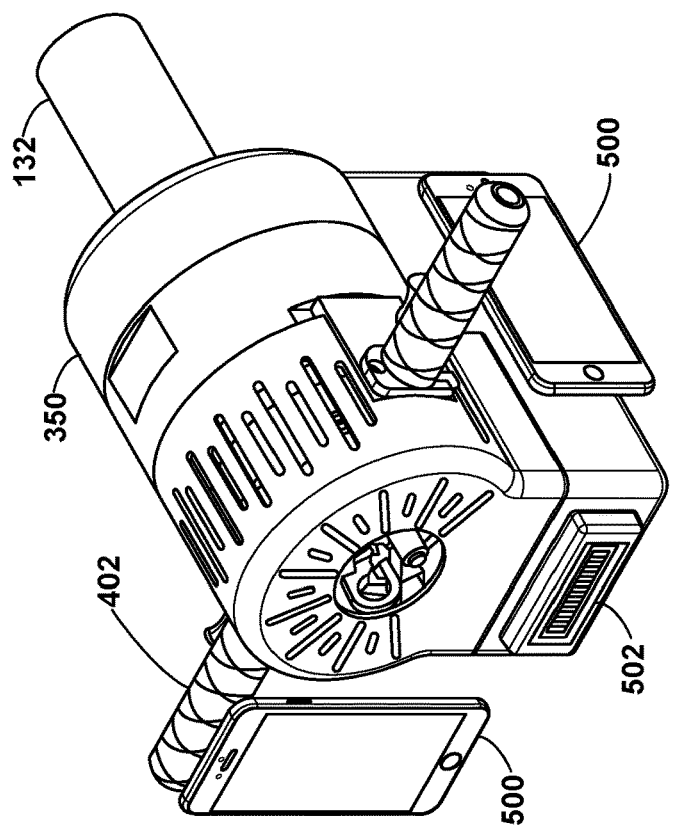
FIGS. 5A and 5B are upper and side profile views, respectively, of another example of the main work module ("MWM") of FIG. 3, in accordance with various techniques of this disclosure.
Figure 5A:
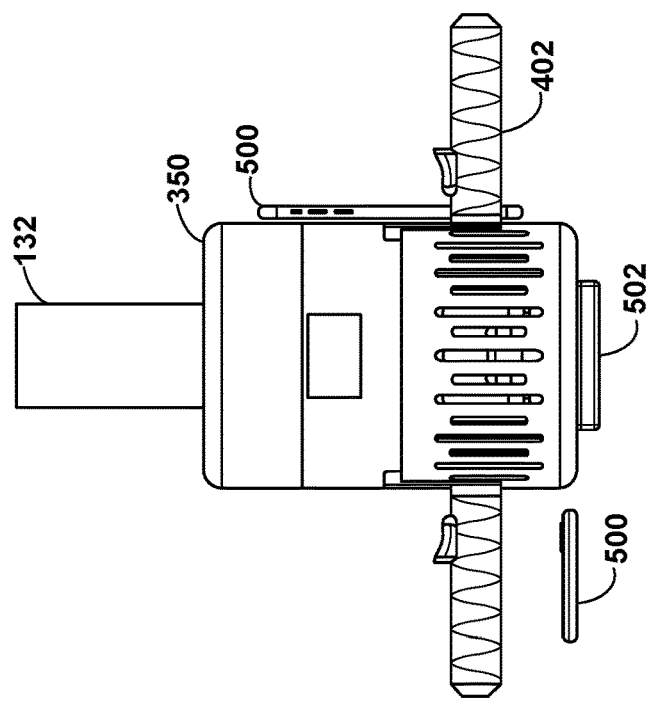

FIGS. 5A and 5B show upper and side profile views, respectively, of MWM 350 of FIG. 3, in accordance with various techniques of this disclosure. The weight and size of MWM 350 may be reduced by separating the power, the controls, display 502, and other components from the working components. MWM 350 is relatively small and can operate in tight spaces, and in virtually any suitable orientation. MWM 350 is shown next to a mobile phone 500 to provide a reference perspective for an example size (e.g., dimensions) of MWM 350. MWM 350 may be relatively easy to carry and operate by virtually any operator, as may be configured to weigh about 6.8 kg (e.g., about 15 lbs.) to about 9.5 kg (e.g., about 21 lbs.). In another example, MWM 350 weighs less than about 7 kg (e.g., less than about 15 lbs.).

Example dimensions of MWM 350 may be within a range from about 400 mm to about 500 mm (e.g., about 15.7 inches to about 19.7 inches) in width (e.g., with handles 402 attached); within a range of about 100 mm to about 200 mm (e.g., about 3.9 inches to about 7.9 inches) wide (e.g., without handles 402); within a range of about 200 mm to about 300 mm (e.g., about 7.9 inches to about 11.8 inches) in height; and within a range of about 150 mm to about 300 mm (e.g., about 7.9 inches to about 11.8 inches) in length, depending on whether display 502 is attached. In some such examples, MWM 350 is capable of fitting into many types of relatively tight, confined, or constrained spaces, such as through manholes, along utility tunnels, or the like. As another example, MWM 350 may be able to fit into virtually any cabinet-based or cabinet-like environment (e.g., a datacenter) or trench-like environment. MWM 350 may be as small as about 15 cm (e.g., about 6 inches) per side. MWM 350 could be capable of fitting between three-core cable-leg connectors.

Figure 6:
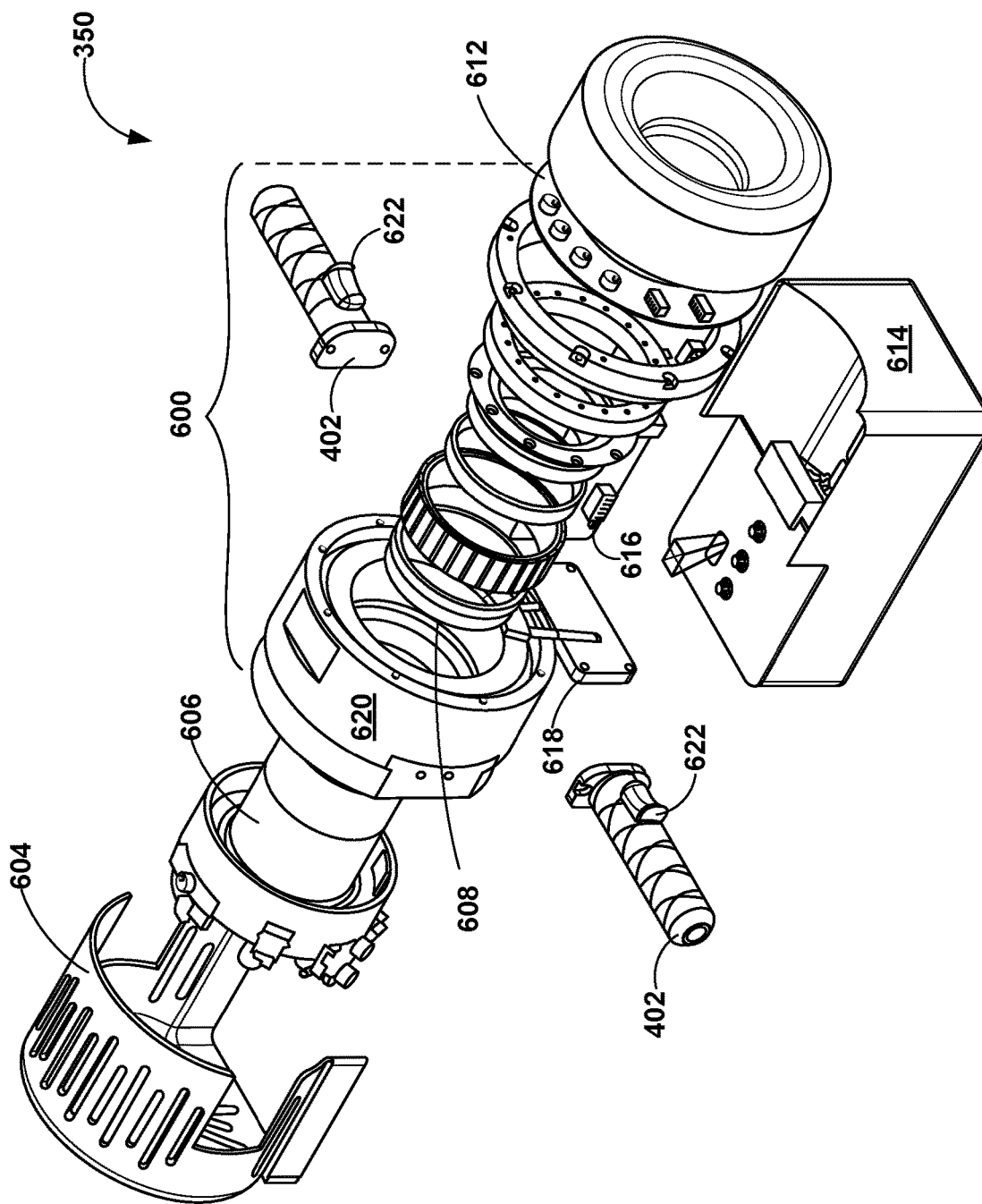
FIG. 6 is an exploded view of another example of the handheld cable-preparation device of FIG. 3, in accordance with various techniques of this disclosure.

FIG. 6 is an exploded view of an example of cable-preparation device 350 of FIG. 3, in accordance with various techniques of this disclosure. As shown in FIG. 6, MWM 350 includes a motor 600, an external casing or housing 604, a rotating head assembly 606, an encoder ring 608, handles 402, push buttons 622, a drive printed circuit board ("drive PCB") 612, a screwdriver assembly 614, an input/output printed circuit board ("I/O PCB") 616, a liquid crystal display ("LCD") 618 (e.g., display 502 of FIG. 5), and a chassis 620. The integration of motor 600 within rotating head assembly 606 can provide enough speed and torque for both the (high torque, low speed) removal of insulation 256 and the (high speed, low torque) shaving of insulation screen 258.

Figure 7:
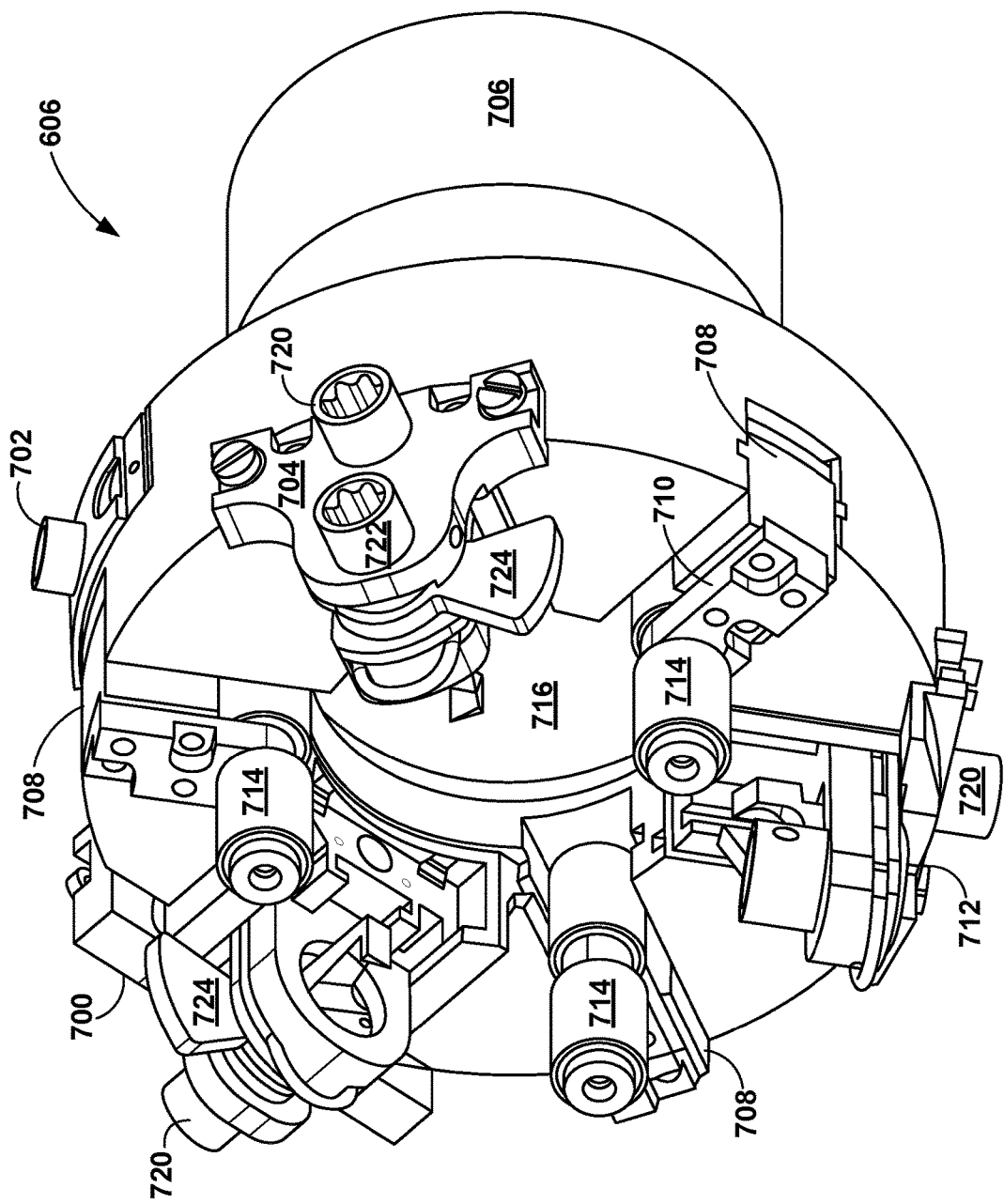
FIG. 7 is a diagram of an example rotating-head assembly of the cable-preparation device of FIG. 3, in accordance with various techniques of this disclosure.

FIG. 7 is a perspective view of an example of rotating head assembly 606 of FIG. 6, in accordance with various techniques of this disclosure. As shown in the example of FIG. 7, rotating head assembly 606 includes an insulation-blade-assembly holder 700, a rollers key 702, a jacket-blade-assembly holder 704, a head body 706, roller-bearing assemblies 708 (also referred to herein as "roller chucks 708"), roller holders 710, an insulation-screen-blade holder 712, rollers 714, and a cable channel 716.

In the example of FIG. 7, rotating head assembly 606 includes three roller-bearing assemblies 708, as well as three blade assemblies 700, 704, and 712. Each of blade assemblies 700, 704, and 712 includes a corresponding radial-depth-adjustment mechanism 720 which, when turned in a clockwise or counterclockwise direction, raises or lowers the respective blade assembly toward or away from cable channel 716. At least one blade assembly (e.g., as shown in FIG. 7 with respect to jacket-blade-assembly holder 704) includes a pitch-adjustment mechanism 722, which can control the pitch of the respective blade. Further, all blade assemblies 700, 704, and 712 include a corresponding reflection target 724 to enable distance measurement for closed-loop positional adjustment. Such distance measurements may include light-based measurements, such as laser measurements, as one non-limiting example.

Figure 8A:
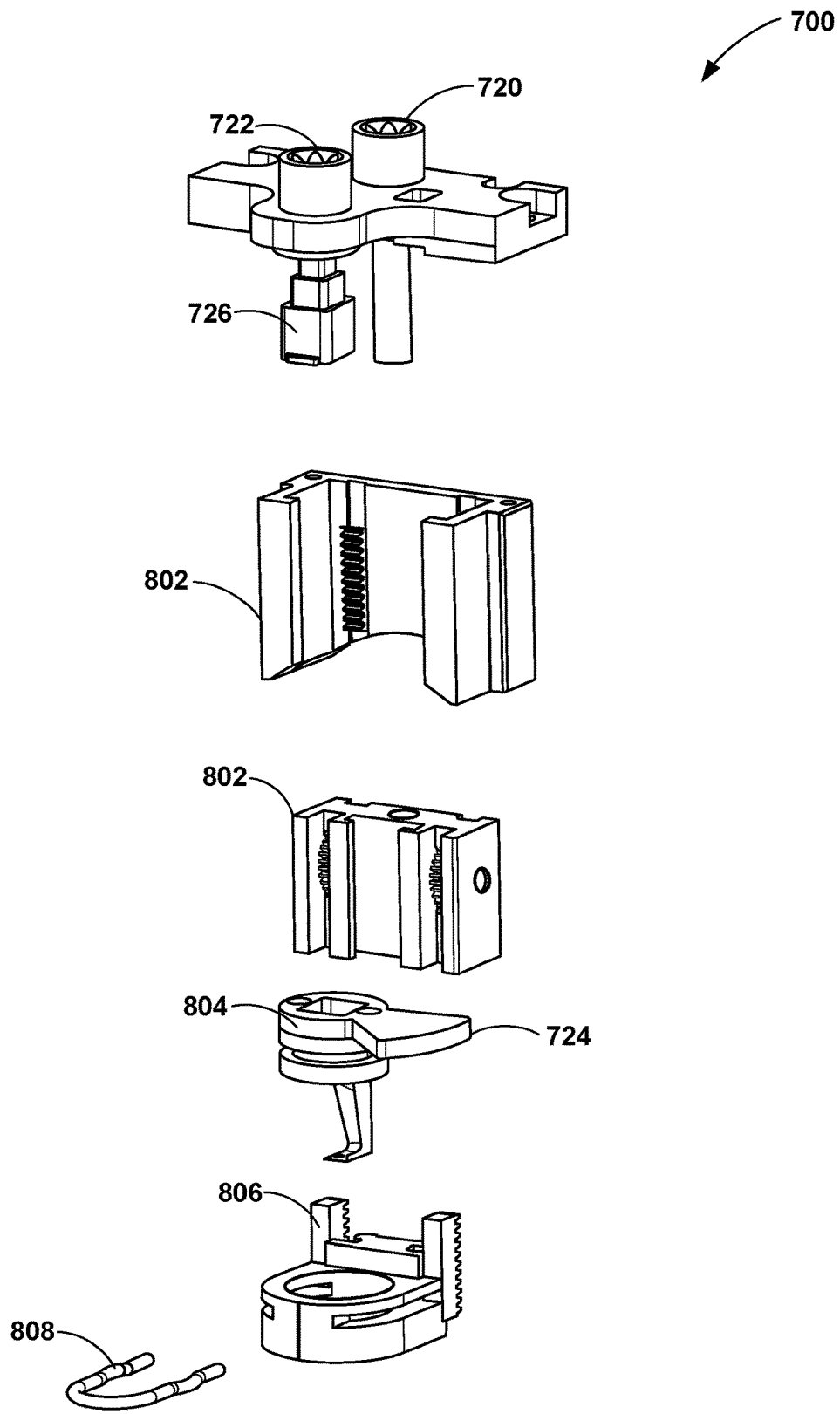
FIG. 8A is a diagram of an example insulation-blade-holder mechanism of the cable-preparation device of FIG. 3, in accordance with various techniques of this disclosure.

FIG. 8A is an exploded view of an example of insulation-blade-assembly holder 700 of FIG. 7, in accordance with various techniques of this disclosure. Insulation-blade-assembly holder 700 includes pitch-adjustment mechanism 722, a blade-holder mechanism 802, a blade 804 (which may be an example of an insulation blade or a jacket blade), a blade house 806, and a mounting spring 808. In some examples, assembly 700 includes a telescoping mechanism 720 in order to extend the radial range-of-motion of blade 804. Telescoping mechanism 720 can move blade 804 in a direction upward or downward along blade-holder mechanism 802. Pitch-adjustment mechanism 722 can rotate blade 804 and change the pitch with which blade 804 contacts cable 132 (FIG. 1B).

Telescoping mechanism 720 is configured to, when rotated, control the radial depth of blade 804. In some examples, a jacket blade may not need to be telescopic, while an insulation blade may need to be telescopic, such as when the insulation blade needs to move radially inward from an "open" position toward a radial position located at the exterior surface of a small conductor cable 132). Pitch-adjustment mechanism 722 is configured to, when rotated, control the pitch of blade 804. Pitch-adjustment mechanism may be used to support axial motion of MWM 350 when MWM 350 is operated in the handheld configuration, but not while MWM 350 is mounted to sledge 304. During operation, blade 804 first contacts jacket 262 or insulation 256 (FIG. 2) and begins to peel jacket 262 off of cable 132. Blade 804 may be extended to the correct radial depth before the insertion of cable 132 into MWM 350, peeling jacket 262 from the cut end of cable 132.

Figure 8B:
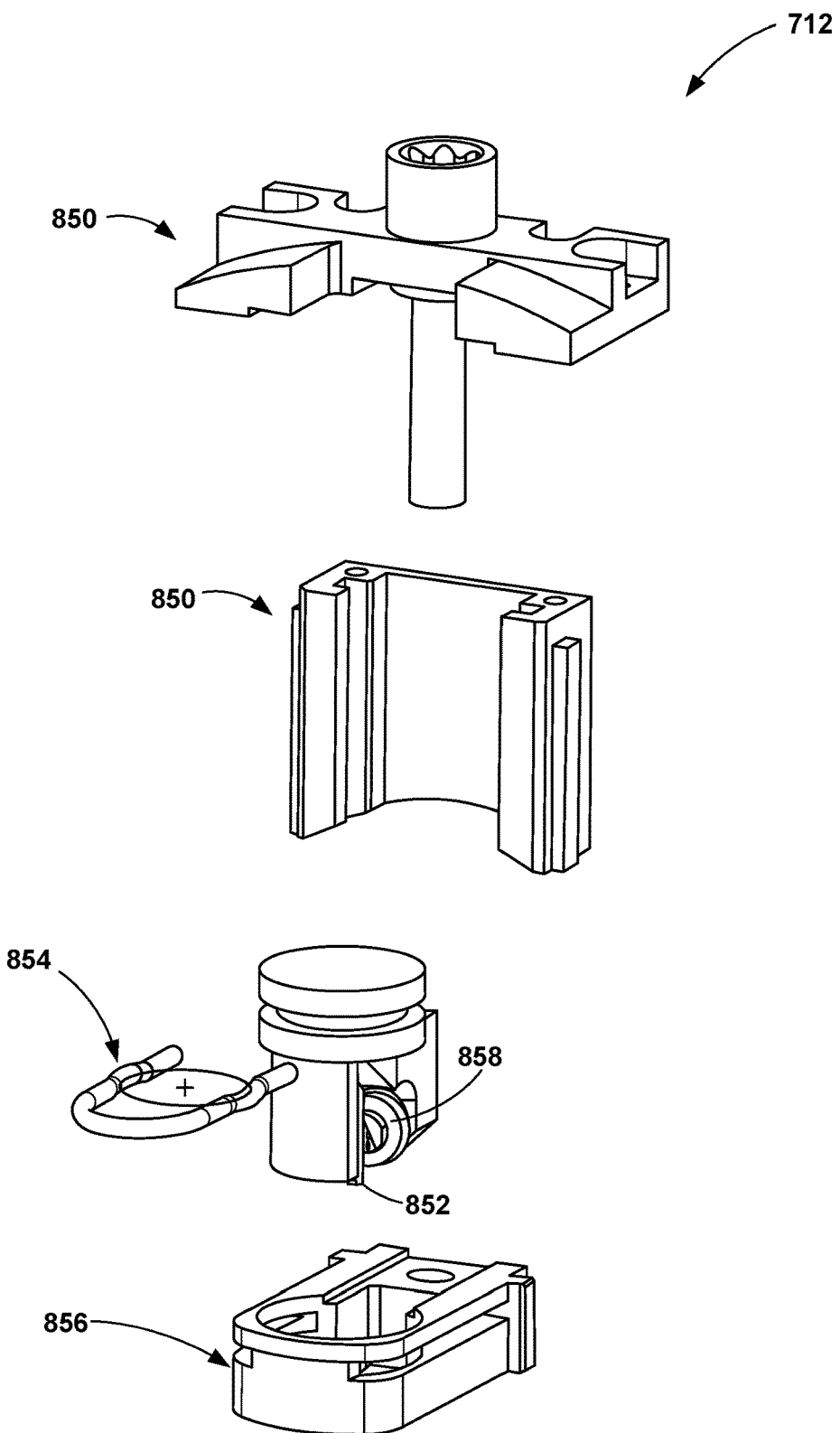
FIG. 8B is a diagram of an example insulation-screen-blade-holder mechanism of the cable-preparation device of FIG. 3, in accordance with various techniques of this disclosure.

FIG. 8B is an exploded view of an example of insulation-screen-blade holder 712 of FIG. 7, in accordance with various techniques of this disclosure. In the example of FIG. 8B, insulation-screen-blade holder 712 includes a blade-holder mechanism 850, an insulation-screen knife 852 having a mounting-height limiter 858, a mounting spring 854, and a blade house 856. Insulation-screen knife 852 extends past mounting-height limiter 858 to a pre-determined distance. Mounting-height limiter 858 rides on the surface of insulation screen 258 during the scoring operation. The score has a predetermined radial depth (as measured from the outer surface of cable 132). In one example, insulation-screen-blade holder 712 may include a domed support rather than a roller, as shown in FIG. 8B. Blade 804 (FIG. 8A) can extend from the tip of the dome, and the dome then rides on conductor screen 254 (FIG. 2). In some examples, blade-holder mechanism 850 may include one or more set screws or other mechanical fasteners, rather than a mounting spring 854, in order to retain a blade (e.g., insulation-screen blade 852) within blade-holder mechanism 850.

Figure 9A:
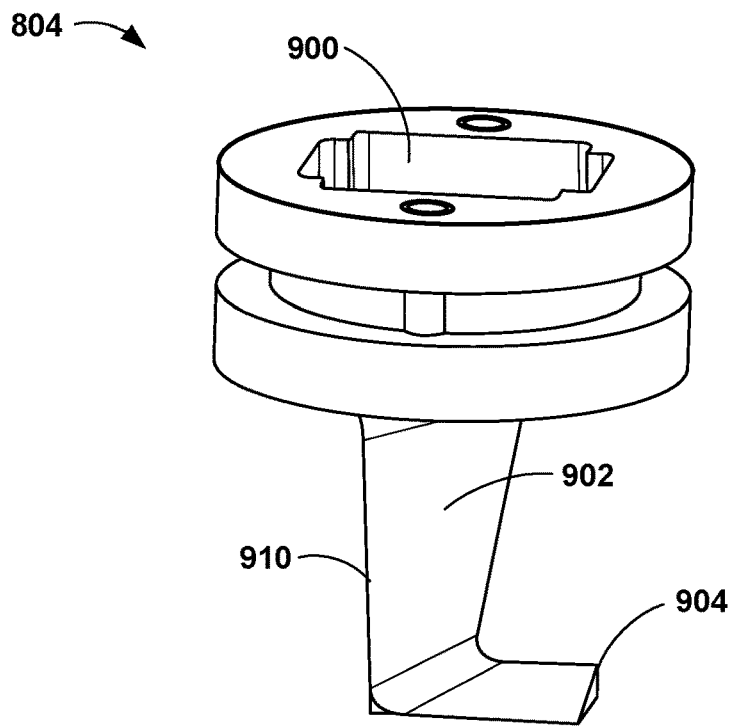
FIG. 9A is a diagram of an example jacket-and-insulation blade of the cable-preparation device of FIG. 3, in accordance with various techniques of this disclosure.
Figure 9B:
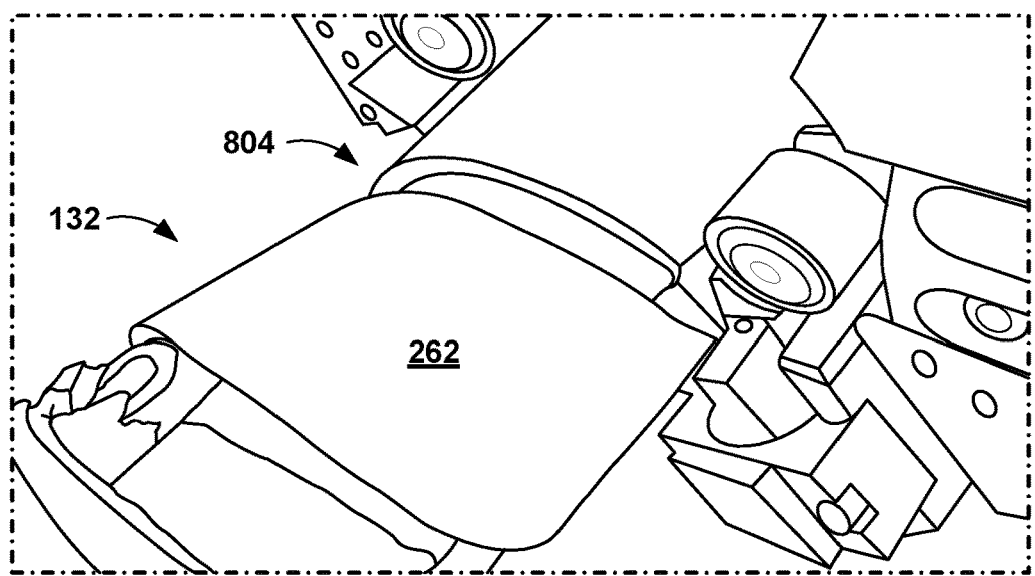
FIG. 9B is a diagram depicting an example jacket-and-insulation blade of the cable-preparation device of FIG. 3 as used for removing an electrical-cable jacket layer, in accordance with various techniques of this disclosure.

FIG. 9A depicts an example of blade 804 of FIG. 8A, in accordance with various techniques of this disclosure. Blade 804 can be utilized with either of insulation-blade-assembly holder 700 and/or jacket-blade-assembly holder 704 of FIG. 7. Blade 804 includes an interface 900 that is configured to couple with bit 726 (FIG. 8A), located at a distal end of pitch-adjustment mechanism 722. A cutting blade 902 is located just underneath interface 900 along with a positioning-and-lifting blade 904. As shown in FIG. 9B, blade 804 can remove jacket 262 (and/or insulation 256) from cable 132 by cutting jacket 262 (and/or insulation 256) with cutting blade 902 and then lifting jacket 262 (and/or insulation 256) from cable 132 with positioning-and-lifting blade 904. Pitch-adjustment mechanism 722 is configured to rotate to change the pitch of blade 804, and in particular, cutting blade 902. Blade 804 may be formed from virtually any suitable material such as metal, a hard plastic, wood, etc.

Figure 10:
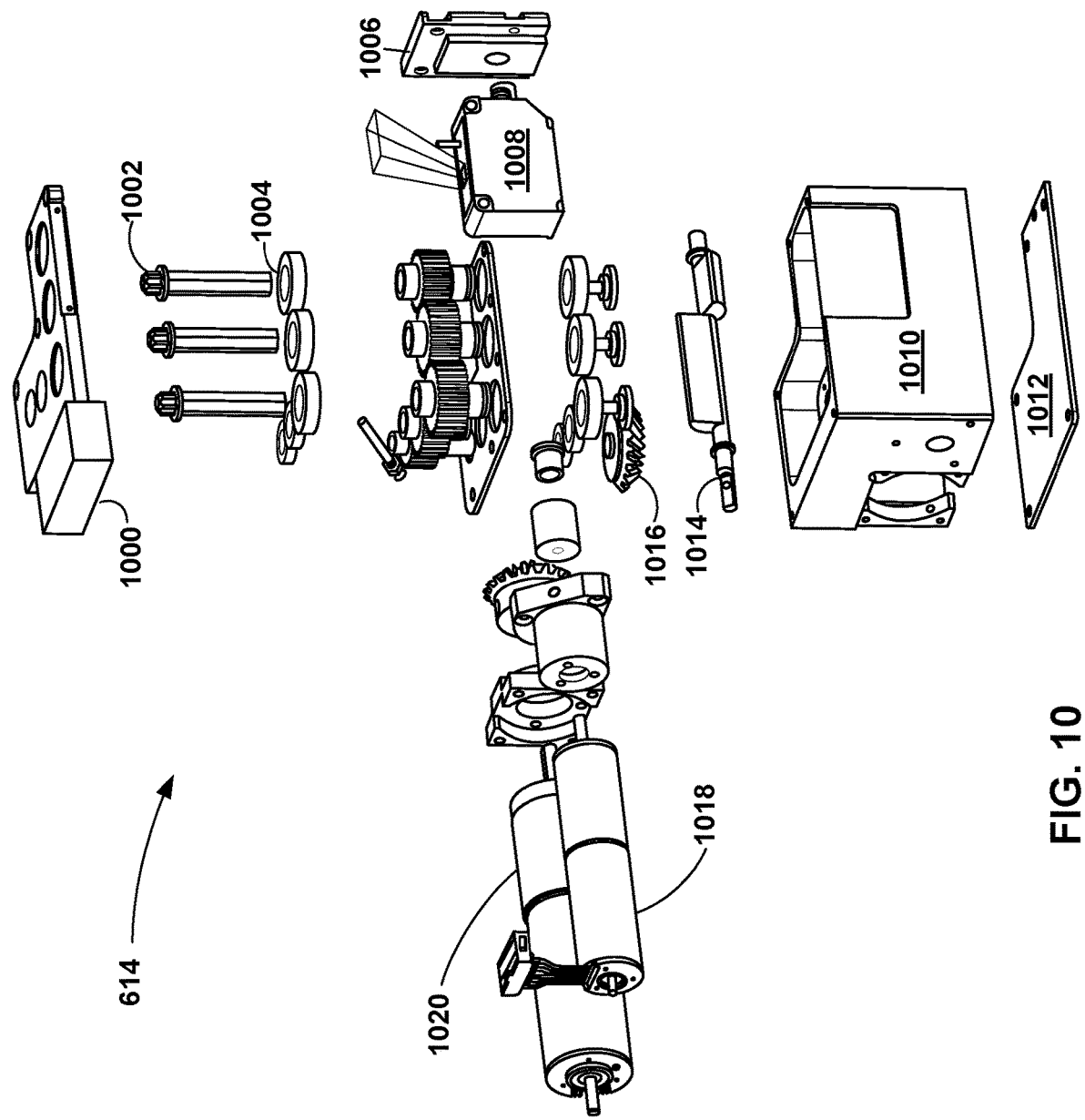
FIG. 10 is a diagram of an example screwdriver assembly of the cable-preparation device of FIG. 3, in accordance with various techniques of this disclosure.

FIG. 10 is an exploded view of an example of screwdriver assembly 614 of FIG. 6, in accordance with various techniques of this disclosure. In some examples, screwdriver assembly 614 may be responsible for the movement of all of rollers 714 (FIG. 7), the insulation and jacket blades (e.g., blade 804 of FIG. 8A), and insulation-screen knife 852 (FIG. 8B), through engagement of telescoping mechanism 720 and pitch-adjustment mechanism 722.

Screwdriver assembly 614 is configured to have a top seal plate 1000, screwdrivers 1002, bearings 1004, a cam shaft plate 1006, a laser distance sensor 1008 (e.g., utilizing a laser triangulation method), a motor-and-gear box 1010, a bottom seal plate 1012, a cam shaft 1014, a bevel gear 1016, a cam shaft motor 1018, and a screwdriver motor 1020. In operation, cam shaft engine 1018 engages and moves one or more selected screwdrivers 1002 in an upward direction to engage one or more of rollers key 702, telescoping mechanism 720, and/or pitch-adjustment mechanism 722. When screwdrivers 1002 are engaged within rollers key 702, telescoping mechanism 720, and/or pitch-adjustment mechanism 722, screwdriver engine 1020 engages and turns screwdrivers 1002 to rotate rollers key 702, telescoping mechanism 720, and/or pitch-adjustment mechanism 722 in a clockwise or counterclockwise direction.

In some examples, screwdriver motor 1020 may include a Maxon® EC-i series motor, available from maxon precision motors of Taunton, Massachusetts, e.g., having about a 30 mm diameter, a rated power of about 75 W, and having a rated torque of about 0.11 N-m. Screwdriver motor 1020 can be provided in combination with a gear ratio of about 103:1, which can deliver about 6 N-m of torque. However, any suitable type of motor could be utilized according to examples of this disclosure.

In some examples, cam shaft motor 1018 may include a Maxon® ECX series motor, available from maxon precision motors of Taunton, Massachusetts, e.g., having about a 19 mm diameter, a rated power of about 34 W, and a rated torque of about 7 mN-m. Cam shaft motor 1018 may be provided in combination with a gear ratio of about 111:1, which can deliver about 0.5 N-m of torque. However, any suitable type of motor could be utilized according to examples of this disclosure.

Figure 11A:
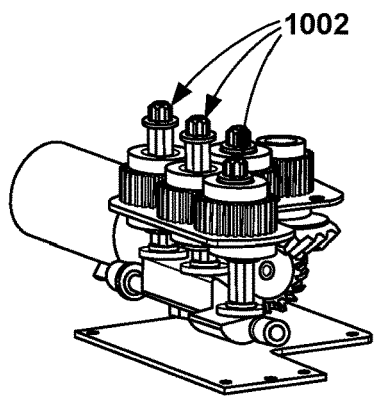
FIGS. 11A, 11D, and 11G are profile views of an example screwdriver-and-camshaft assembly of the cable-preparation device of FIG. 3, in accordance with various techniques of this disclosure.

FIGS. 11A-11I are diagrams of an example of screwdrivers assembly 614 of FIGS. 6 and 10, including screwdrivers 1002 and camshaft 1014, in accordance with various techniques of this disclosure. In the examples of FIGS. 11A-11, screwdrivers 1002 collectively include three individual screwdrivers 1100, 1102, and 1104.

Figure 11B:
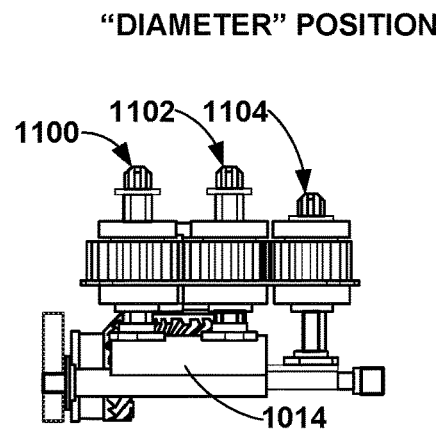
FIGS. 11B, 11E, and 11H are side views of an example screwdriver-and-camshaft assembly of the cable-preparation device of FIG. 3, in accordance with various techniques of this disclosure.
Figure 11C:
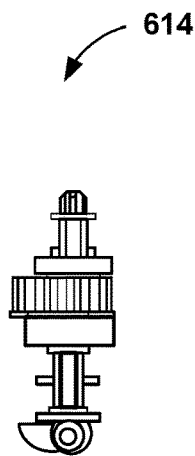
FIGS. 11C, 11F, and 11I are frontal views of an example screwdriver-and-camshaft assembly of the cable-preparation device of FIG. 3, in accordance with various techniques of this disclosure.

In FIGS. 11A, 11B, and 11C, screwdrivers 1100, 1102, and 1104 are set at a "diameter" position, meaning that two of the aft screwdrivers (e.g., screwdrivers 1100 and 1102) are in an "engaged" position and extended to engage rollers key 702 and telescoping mechanism 720 (FIG. 7). Cam shaft 1014 is shown in a "rotated" position in which cam shaft 1014 is pushing upward on screwdrivers 1100 and 1102 (as shown in FIG. 11B), causing them to engage rollers key 702 and telescoping mechanism 720. An operator may move roller chucks 708 toward cable 132 (FIG. 1B) located within MWM 350 (FIG. 3), by causing screwdriver engine 1020 to engage and rotate screwdriver 1100 in a clockwise or counterclockwise direction as desired.

Further, the operator may lower insulation blade 804 to contact cable 132 within MWM 350, by causing screwdriver engine 1020 to engage screwdriver 1102 to rotate, thereby causing telescoping mechanism 720 to rotate in a clockwise or counterclockwise direction.

Figure 11D:
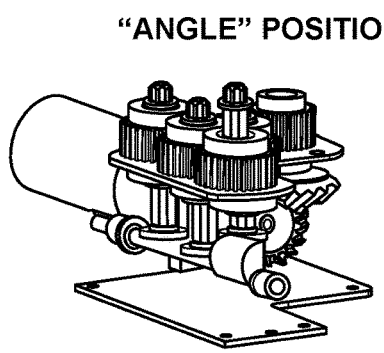
Figure 11E:
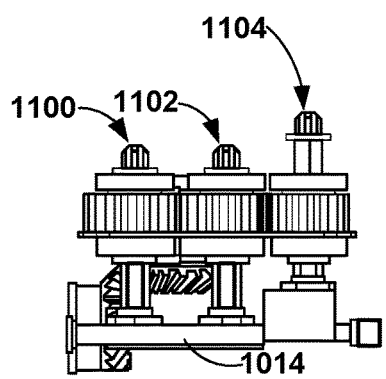
Figure 11F:
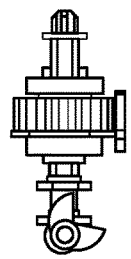
Figure 11G:
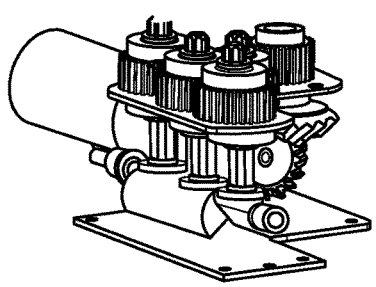
Figure 11H:
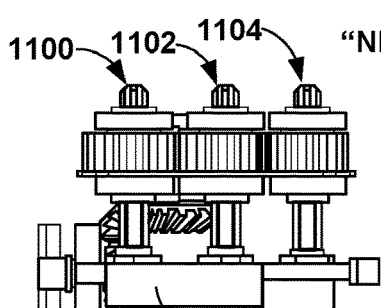
Figure 11I:
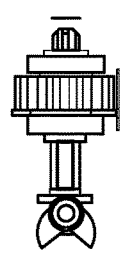

FIGS. 11D, 11E and 11F show screwdrivers 1002 in an "angle" position, meaning that screwdrivers 1100 and 1102 are in a "neutral" position and screwdriver 1104 is in an "engaged" position. Cam shaft 1014 has rotated and elevated screwdriver 1104. Screwdriver 1104 can engage pitch-adjustment mechanism 722 and can be rotated in a clockwise or counterclockwise direction by screwdriver engine 1020. In FIGS. 11G, 11H and 11I, all three screwdrivers 1100, 1102, and 1104 are in "neutral" positions, meaning that cam shaft 1014 is rotated to a position in which none of screwdrivers 1100, 1102, or 1104 is extending upward.

FIGS. 12A and 12B show a profile view and an exploded view, respectively, of an example of motor 600 (alternatively. "direct-drive mechanism 600" or "direct drive 600") of FIG. 6, in accordance with various techniques of this disclosure. Direct drive 600 is shown with rotating head assembly 606, spacers 1200, stator 1202, encoder ring 608, stator lock plate 1204, encoder reader 1206, rotor lock plate 1208, rotor 1210, chassis 620, bearings 1212 and bushing 1214.

Rotor 1210 is a cylindrical-shaped rotor and can be made of solid steel. In some examples, rotor 1210 includes a brushless DC ("BLDC") motor topology and contains permanent magnets. Rotor 1210, encoder ring 608, and other components are connected to the rotating head 606 and secured to frame 620 by bearings. Encoder ring 608 and encoder ring 1206 make up an electromechanical device configured to measure the angular position or motion of rotor 1210, and may output the measurements in the form of analog or digital output signals. Encoder ring 608 could be an absolute decoder or an incremental encoder.

Motor 600 is essentially a spinning electromotive device. Stator 1202 acts as a field magnet, interacting with the rotor 1210 to create circular motion. The circular motion essentially rotates the head body 606 around a cable 132. In some examples, motor 600 could be a Model QTR-A-133-34 linear motor, available from Tecnotion of Almelo, Netherlands, or virtually any type of motor providing rotational motion.

Figure 13:
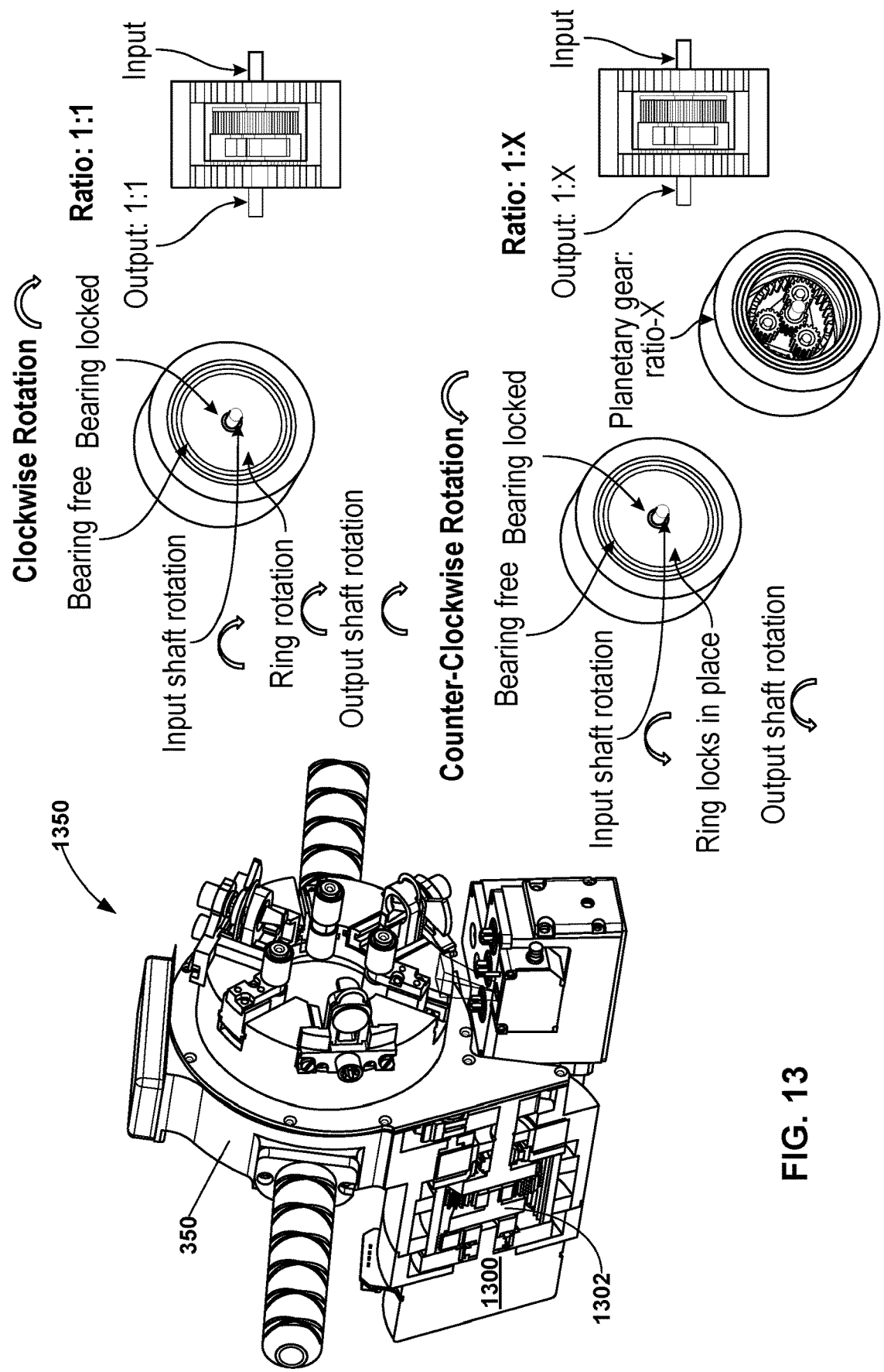
FIG. 13 is a diagram of an example bi-directional-gear-and-main-motor assembly of the cable-preparation device of FIG. 3, in accordance with various techniques of this disclosure.

FIG. 13 is an illustrative diagram of an alternative bi-directional gear and main-motor assembly 1350, in accordance with various techniques of this disclosure. Drive motor 1300 is shown coupled below MWM 350 and configured to drive bi-directional gear assembly 1302. Bi-directional gear assembly 1302 provides a gear system with a 1:1 ratio in one direction, and a 1:X ratio in the reverse direction, where X is a number within a range from about 0.1 to about 10. For example, gear assembly 1302 may include a sprag gear that, when operated in a first direction, disengages, thereby transferring a rotation in a 1:1 ratio to an output shaft, and, when operated in a second direction opposite the first direction, engages a planetary gear assembly which drives the output shaft at a different gear ratio of 1:X, where X is a number within a range from about 0.1 to about 10.

FIG. 14A is an illustrative diagram of an example of ICM 352 of FIG. 3 (e.g., computing device 152 of FIG. 1B), and FIG. 14B is an illustrative diagram of an example graphical user interface (GUI) 1400 that ICM 352 may generate and display on a screen of ICM 352, in accordance with various techniques of this disclosure. As shown in FIG. 14B, GUI 1400 includes a plurality of virtual input-output mechanisms 1402 (e.g., buttons, input boxes, sliders, text boxes, etc.) configured to enable an operator or other user to control cable-preparation device 350 (FIG. 3), via ICM 352, to prepare electrical cable 132 (FIG. 1B) for connection to an electrical power system 100A (FIG. 1A).

Figure 15A:
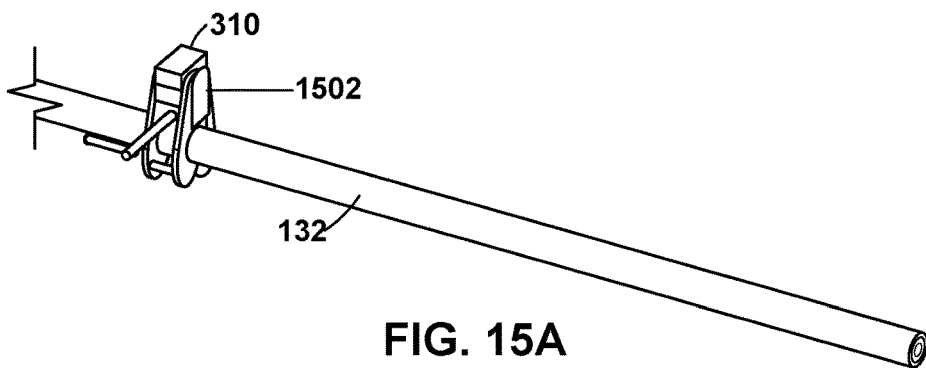
FIGS. 15A-15C are diagrams of an example of the cable-preparation system of FIG. 3, including a cable-preparation device and a cable clamp with a retroreflector, in accordance with various techniques of this disclosure.
Figure 15B:
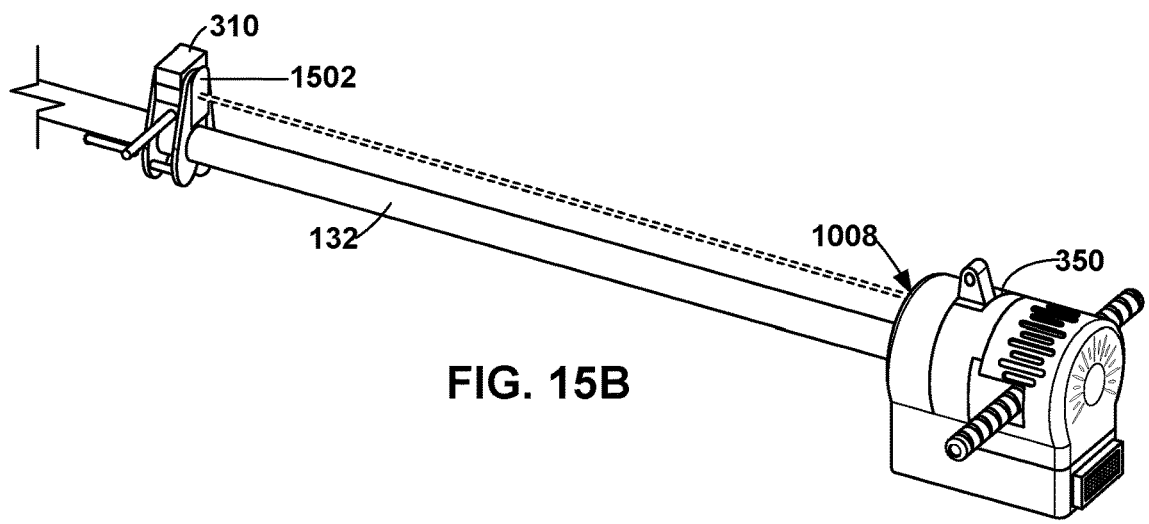
Figure 15C:
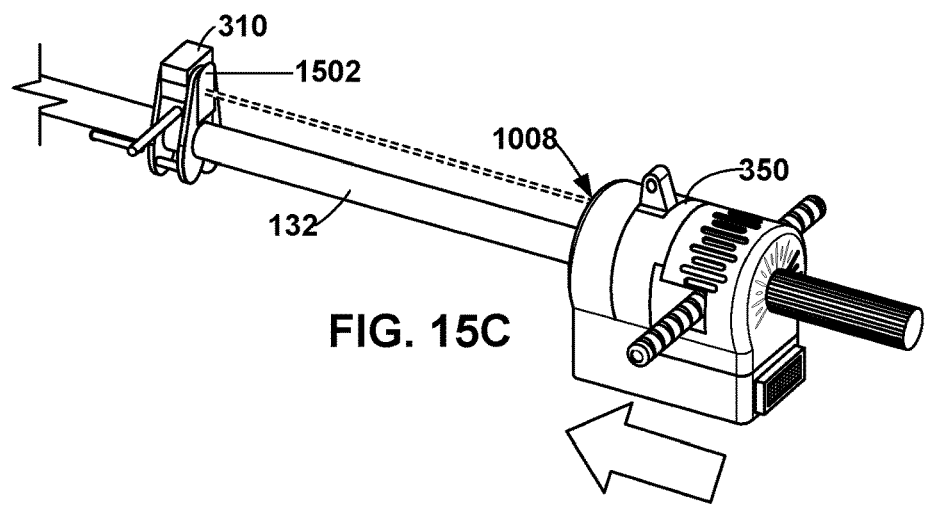

FIGS. 15A-15C are diagrams illustrating an example technique of using of MWM 350 with an example of clamp 310 of FIG. 3, in accordance with various techniques of this disclosure. As shown in FIG. 15A, an operator can install clamp 310 onto cable 132. Clamp 310, which is part of piston module 308 of FIG. 3, includes a retroreflector 1502. As shown in FIG. 15B, the operator can install MWM 350 onto cable 132. Retroreflector 1502 of clamp 310 is used, in conjunction with MWM 350, to measure a cutback distance while preparing cable 132. The cutback distance may be measured either manually, or alternatively, via an automatic closed feedback loop. For example, MWM 350 may stop its forward axial motion at a desired cutback location along cable 132 and performs a ring cut into one or more layers of cable 132.

Laser distance sensor 1008 of MWM 350 can be used to determine the distance from MWM 350 to clamp 310. With laser distance sensor 1008, the performance of MWM 350 can be significantly enhanced by accurately measuring the distance that MWM 350 moves while preparing or processing (e.g., cutting, shaving, etc.) cable 132. Retroreflector 1502 and laser distance sensor 1008 can overcome complications resulting from, as examples, a bent portion of cable 132 or a tilt of the rotating head assembly 606 (FIG. 6) relative to clamp 310. The precise target provided by retroreflector 1502 is also configured to help reduce or prevent false measurements due to the detection of stray laser reflections from along the cable 132, the environmental surroundings, or from other items.

In the example of FIGS. 15A-15C, laser distance sensor 1008 is located on MWM 350. During operation, distance sensor 1804 measures the distance to fixed clamp 310 on cable 132. As MWM 350 moves axially along cable 132, the operator (or alternatively, a computer processor under automatic control) may monitor the changing distance via this range measurement and compare the measured distance to a desired cutback distance, e.g., to a desired location on cable 132 where MWM 350 would initiate a square (e.g., "ring") cut to terminate the cut. In other examples, this range determination does not have to be performed with a laser, and instead, could be (visible) light-based or ultrasonic-based. Laser distance sensor 1008 could be a time-of-flight (ToF) optical sensor that works in conjunction with retroreflector 1502 in measuring the axial (cutback) motion when MWM 450 is used in a handheld mode of operation.

FIGS. 16A and 16B are diagrams depicting two alternative examples including MWM 350, clamp 310, and laser distance sensor 1008, in accordance with various techniques of this disclosure. In some examples, such as the example shown in FIG. 16A, laser distance sensor 1008 can be coupled to clamp 310, and can be configured to directly detect laser signal 1602. In other examples, such as the example shown in FIG. 16B, laser distance sensor 1008 can be located on MWM 350, and can be configured to detect a reflection of laser signal 1602 that reflects off of retroreflector 1502 of clamp 310. In either case, laser distance sensor 1008 can be integrated with wired or wireless communication capabilities to communicate with an interface and control module (ICM) 1600, which may be an example of computing device 152 of FIG. 1B and/or ICM 352 of FIG. 3. Laser distance sensor 1008 may further include or be in data communication with an indicator mechanism 1604, such as an indicator light as shown in FIGS. 16A and 16B, configured to indicate when MWM 350 has reached the desired cutback distance. ICM 1600 can be wired or wirelessly connected to laser distance sensor 1008. In some examples, ICM 1600 can be used to pre-program laser distance sensor 1008 (e.g., to determine and indicate the cutback distance), rather than require continuous connection between ICM 1600 and laser distance sensor 1008 during the cable-preparation operation.

Figure 17A:
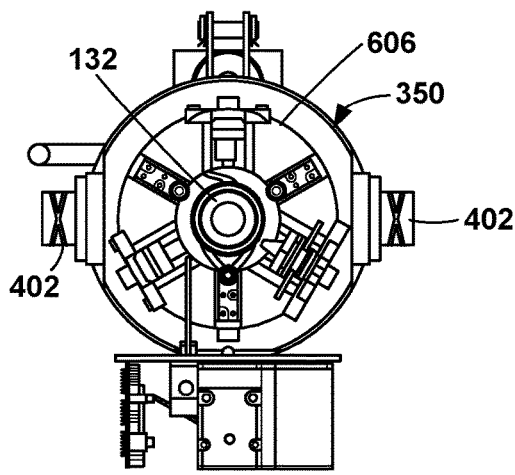
FIGS. 17A-17F are diagrams of an example of the cable-preparation device of FIG. 3 as utilized in a cable-jacket-removal process, in accordance with various techniques of this disclosure.
Figure 17B:
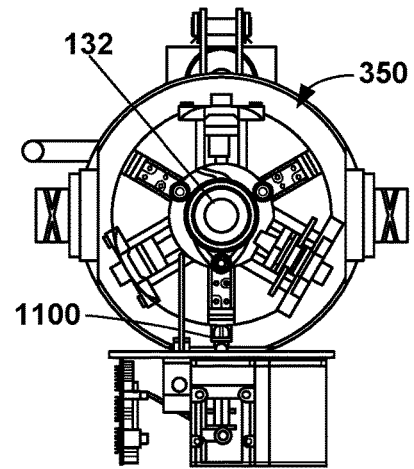
Figure 17C:
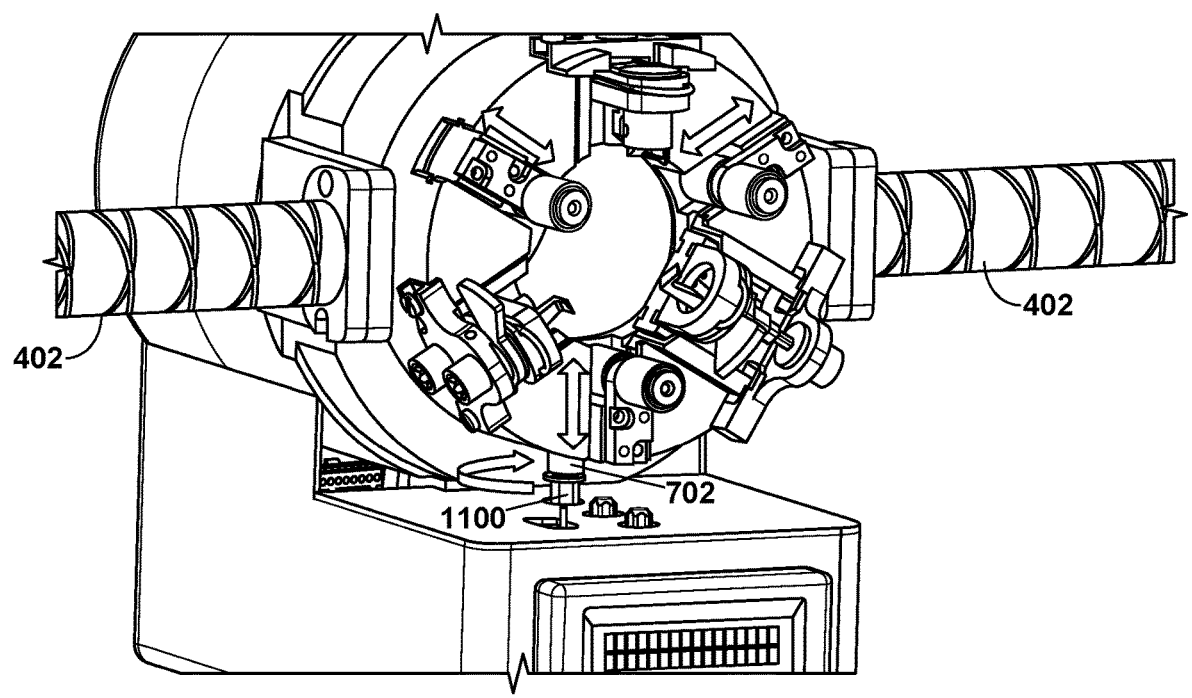
Figure 17E:
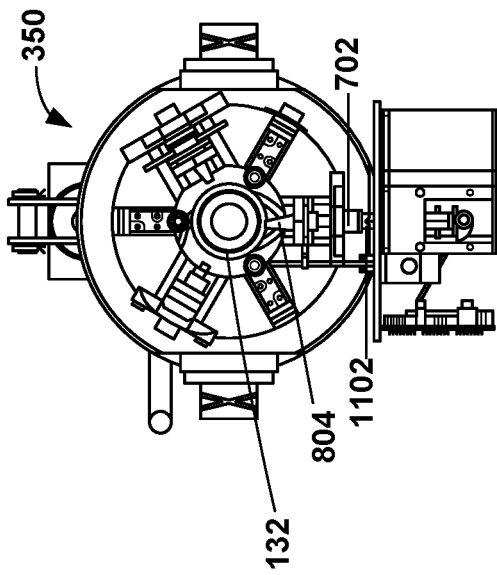
Figure 17F:
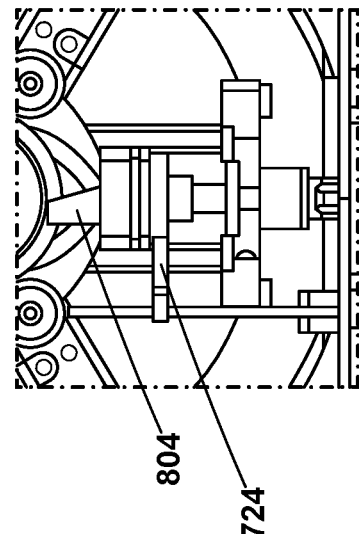

FIGS. 17A-17F are illustrative diagrams showing examples of MWM 350 engaged in a cable-jacket-removal process, in accordance with various techniques of this disclosure. The operator can activate MWM 350 by pushing action buttons 622 (FIG. 6) on handles 402 (FIG. 4). In FIG. 17A, motor 600 rotates rotating head assembly 606 to align rollers key 702 with screwdriver 1100 (FIGS. 17A and 17F). As discussed above, and as shown in FIG. 17B, screwdriver 1100 engages rollers key 702, screwdriver motor 1020 rotates rollers key 702, roller chucks 708 move radially inward toward cable 132, and rollers 714 grip on cable 132.

As shown in FIG. 17C, rollers 714 are adjusted in unison with one screwdriver 1100 engaged with rollers key 702. Screwdriver motor 1020 monitors torque and feeds this information back to ICM 1600. This feedback can be used to control the roller pressure to a desired level and can provide a working-diameter measure (e.g., by the laser distance sensor 1008 measuring the radial position of the roller after pressure is applied) of the in-process cable 132 (e.g., with all, some, or none of the layers of cable 132 removed).

Figure 17D:
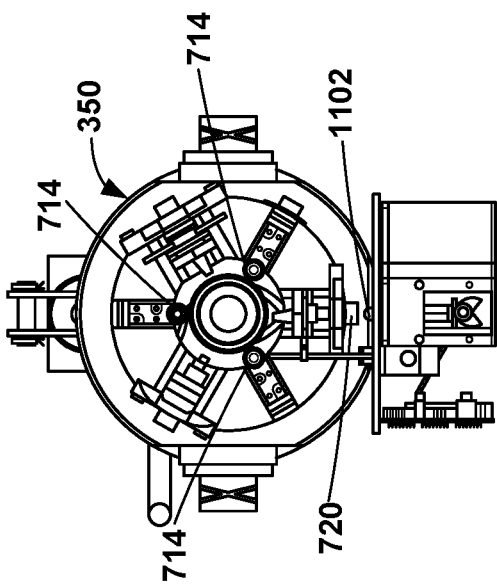

As shown in FIG. 17D, motor 600 then rotates head body 606 and aligns screwdriver 1102 with radial-depth-adjustment mechanism 720. As shown in FIG. 17E, cam motor 1018 then lifts screwdriver 1102 into connection with rollers key 702, and screwdriver motor 1020 rotates radial-depth-adjustment mechanism 720, and blade 804 (e.g., a jacket knife) is inserted into cable 132.

As shown in FIGS. 17E and 17F, cam motor 1018 then lowers screwdriver 1102 and raises screwdriver 1104 into the "angle" position and couples with pitch-adjustment mechanism 722. Screwdriver motor 1020 then rotates pitch-adjustment mechanism 722 and blade 804 is rotated to a desired angle.

Motor 600 then rotates rotating head assembly 606 until cable jacket cutback is achieved. As discussed above, blade 804 and rollers 714 are moved back to the "open" position shown in FIG. 17A, and MWM 350 is removed from cable 132. The operator can then manually remove shield 260 from cable 132.

Figure 18:
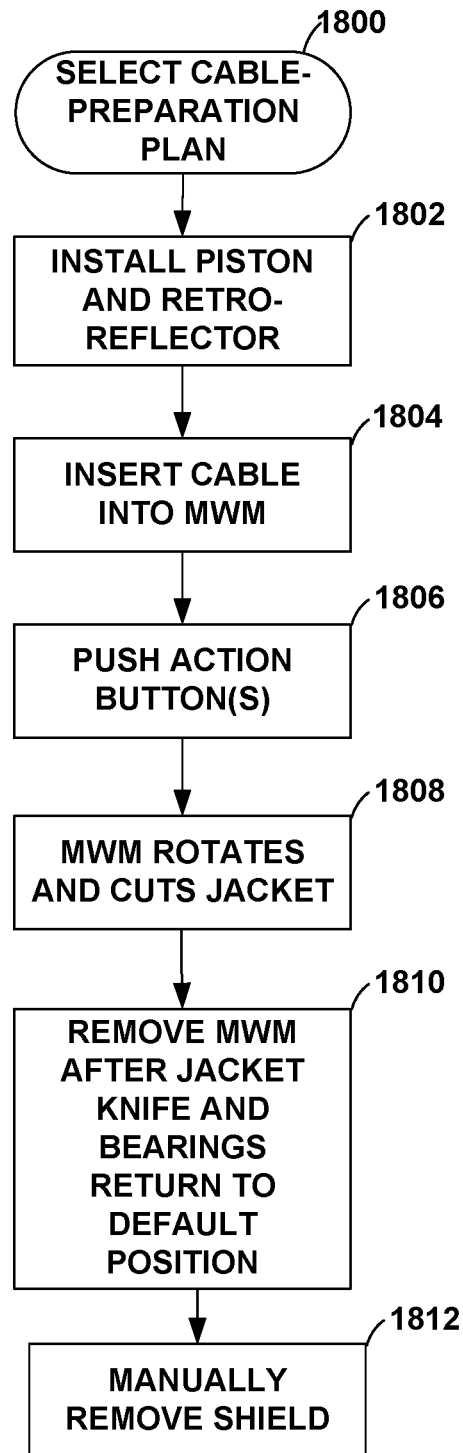
FIG. 18 is a flow diagram of an example process for electrical-cable preparation utilizing an example of the cable-preparation system of FIG. 3, in accordance with various techniques of this disclosure.

FIG. 18 is a flow diagram of a process for cable preparation utilizing a handheld module 350, in accordance with various techniques of this disclosure. More specifically, FIG. 18 depicts techniques for cutting and removing an outer jacket layer 262 and a shield layer 260 of an electrical cable 132. The techniques the process of FIG. 18 are primarily described with respect to the systems, devices, and techniques depicted in FIGS. 14A-17F.

An operator of cable-preparation system 300 (FIG. 3) can optionally select a particular cable preparation plan (1800). For example, the operator may use the plurality of I/O widgets 1402 of GUI 1400 (FIG. 14B) of ICM 350 of FIG. 14A, to select a plan from a plurality of plans, such as from a drop-down menu or the like. As shown in FIG. 15A, the operator can then install clamp 310, including retroreflector 1502, onto cable 132 (1802). The operator can then install MWM 350 onto cable 132 (1804), for example, as illustrated in FIG. 15B. The operator can activate MWM 350, such as by pushing action buttons 622 (FIG. 6) on handles 402 of MWM 350 (1806).

Motor 600 then rotates rotatable tool head 606 until cable jacket cutback is achieved (1808). As shown in FIG. 17A, jacket knife 804 and rollers 714 are moved back to the "open" position, such that MWM 350 may be removed from cable 132 (1810). Shield 260, being composed of a metal foil, metal film, or a plurality of individual metal wires, optionally, can be manually retracted and/or removed by the operator (1812).

Figure 19A:
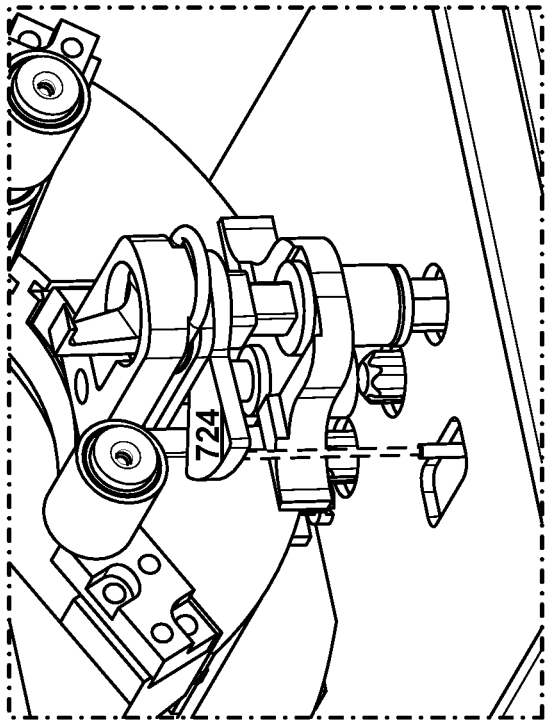
FIGS. 19A-19D are illustrative diagrams of an example of the cable-preparation device of FIG. 3 as utilized in an insulation-blade-adjustment-and-homing process, in accordance with various techniques of this disclosure.
Figure 19C:
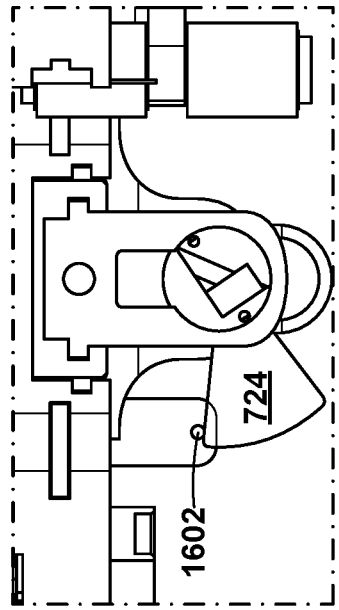
Figure 19B:
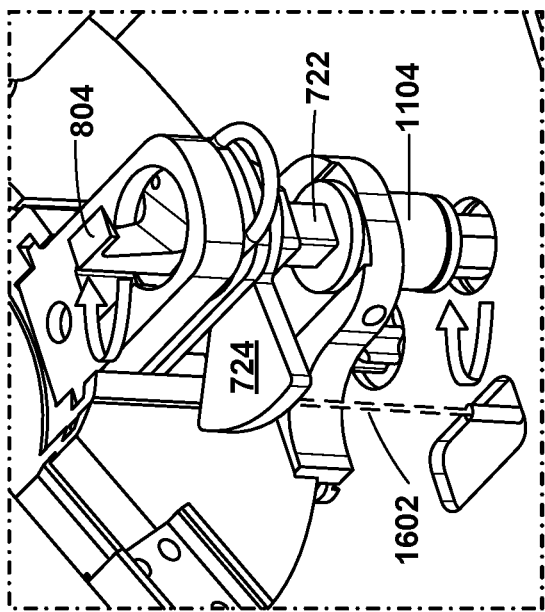
Figure 19D:
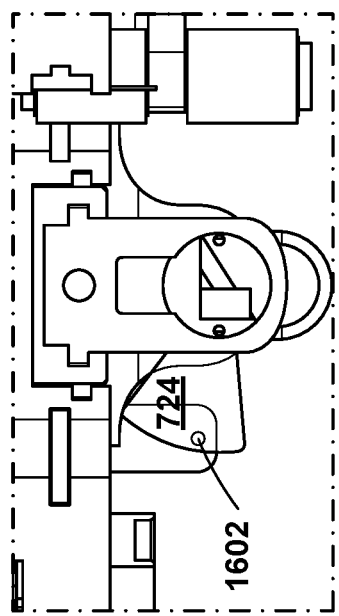

FIGS. 19A-19D are illustrative diagrams of MWM 350 engaged in an insulation-blade-adjustment-and-homing process, in accordance with various techniques of this disclosure. Measurement target 724 is shaped and positioned such that, at one position, laser 1602 does not reflect from target 724 (FIG. 19D), but with a slight rotation, target 724 does reflect laser 1602 (FIG. 19C). This is the "homing" position and serves to accurately position blade 804 at any desired angle with this position as a reference position. Laser distance sensor 1008 detects the front edge of reflection target 724.

While screwdrivers 1100, 1102, and/or 1104 are engaged and adjusting any of blades 804, 852 or rollers 714, the system continuously measures the torque experienced by screwdrivers 1100, 1102, and/or 1104, while the radial position is adjusted. This enables the rollers 714 or blades 804, 852 to achieve the desired radial force on the cable 350. Using this torque feedback with the closed-loop distance-monitoring feedback, the system can measure, for example, the roller position and thereby measure the in-process (none or some of the layers removed) diameter of cable 132, which can then be fed back into the system (e.g., into ICM 352 of FIG. 3) for evaluation, analysis, or setting of subsequent cutting operations.

FIGS. 20A-20E are diagrams depicting an example cable-preparation operation in which MWM 350 of FIG. 3 is engaged in a cable-insulation-removal process, in accordance with various techniques of this disclosure. For example, MWM 350 may be configured to perform a deep cut through insulation layer 256 (FIG. 2). In some examples, if insulation screen 258 is present (e.g., positioned radially outward from insulation 256), MWM 350 simultaneously cuts insulation screen 258. In some examples, but not all examples, MWM 350 may simultaneously cut conductor screen 254 (e.g., positioned radially inward from insulation 256), if present.

Figure 20A:
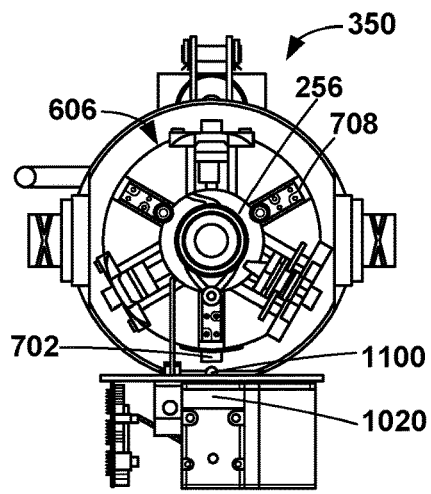
FIGS. 20A-20E are diagrams of an example of the cable-preparation device of FIG. 3 as utilized in a cable-insulation-removal process, in accordance with various techniques of this disclosure.
Figure 20B:
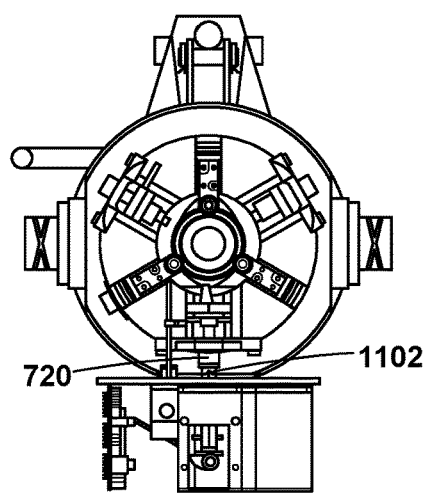
Figure 20C:
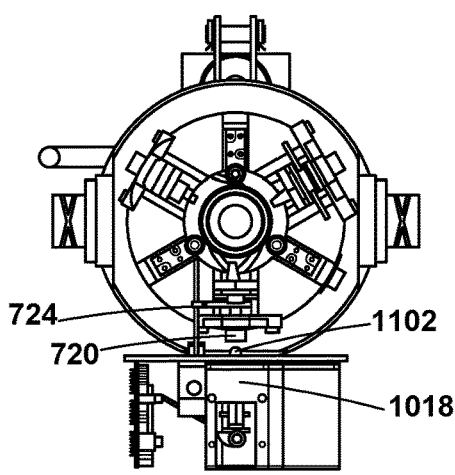
Figure 20D:
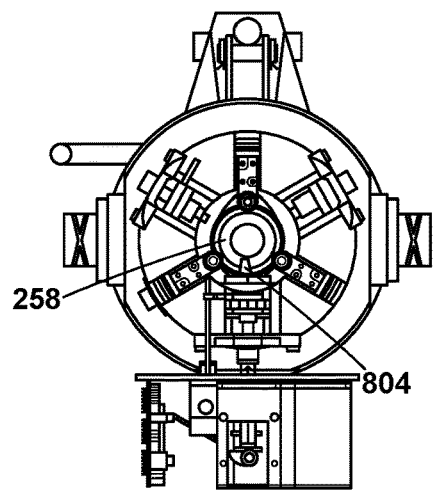
Figure 20E:
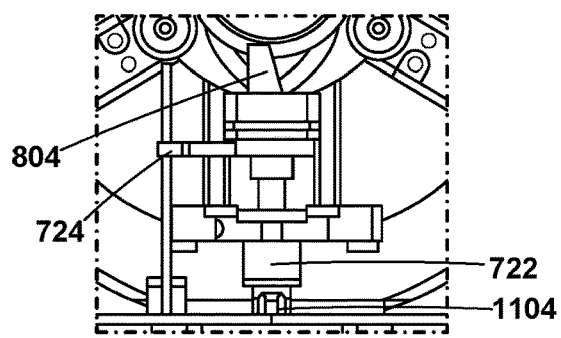

In FIG. 20A, motor 600 (FIG. 6) rotates head body 606 to align rollers key 702 with screwdriver 1100. Screwdriver 1100 engages rollers key 702, screwdriver motor 1020 then rotates rollers key 702, roller chucks 708 move radially inward toward insulation 256, and the bearings tighten on insulation 256. In FIG. 20B, motor 600 then rotates rotating head assembly 606 and aligns screwdriver 1102 with radial-depth adjustment mechanism 720. In FIGS. 20C-20E, cam motor 1018 then lifts screwdriver 1102 into connection with radial-depth adjustment mechanism 720, and screwdriver motor 1020 rotates radial-depth-adjustment mechanism 720, and blade 804 (e.g., an insulation knife) is inserted into insulation 256.

Cam motor 1018 then lowers screwdriver 1102 and raises screwdriver 1104 into the "angle" position and couples with pitch-adjustment mechanism 722. Laser-measurement target 724 is rotated with the blade 804. Screwdriver motor 1020 then rotates pitch-adjustment mechanism 722 and insulation knife 804 is moved to a desired angle. Motor 600 then rotates rotating head assembly 606 until insulation cutback is achieved.

Blade 804 and rollers 714 are moved back to the "default" diameter shown in FIG. 20A, and MWM 350 is removed from cable 132. In some examples, piston module 308 can then be installed and coupled with MWM 350 through piston-gripper eyelet 2100 of FIGS. 21A and 21B, as detailed further below. In other examples, MWM 350 may be installed on sledge module 304. In other examples, MWM 350 may be installed on gripper module 2600 (FIGS. 26A and 26B), as detailed further below.

FIGS. 21A and 21B are illustrative diagrams of piston module 308 coupled to MWM 350, in accordance with various techniques of this disclosure. As shown in FIGS. 21A and 21B, piston module 308 can be installed between clamp 310 and MWM 350 to provide axial-motion control for MWM 350 as needed. Piston module 308 can be configured to connect to clamp eyelet 2102 on clamp 310, such as via a cotter pin, snap fit, nut and bolt, or any other suitable attachment mechanism.

Linear drive 312 of piston module 308 is coupled to MWM 350 at the other end of piston module 308 when MWM 350 is reinstalled on cable 132, in order to cut and remove conductor screen 254, as detailed further below. Piston eyelet 2104 can couple with piston-gripper eyelet 2100 of MWM 350, such as via a cotter pin, snap fit, nut and bolt, or any other suitable attachment mechanism.

Figure 22:
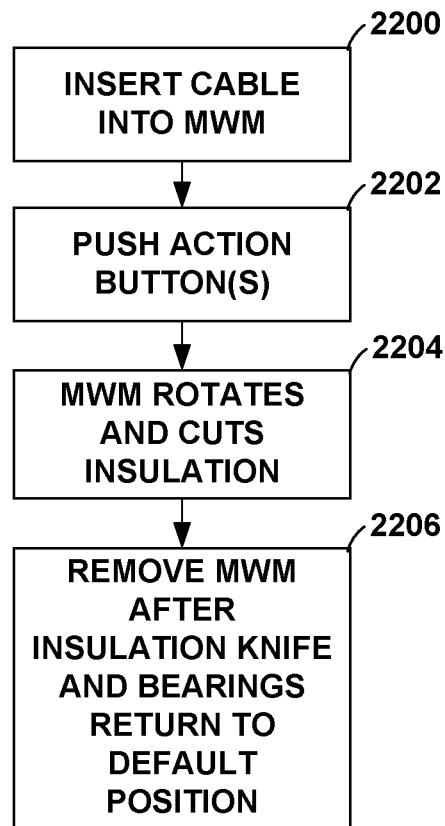
FIG. 22 is a flow diagram of an example process for electrical-cable preparation utilizing an example of the cable-preparation device of FIG. 3, in accordance with various techniques of this disclosure.

FIG. 22 is a flow diagram of a process for cable preparation utilizing a handheld main work module 350, in accordance with various techniques of this disclosure. More specifically, FIG. 22 depicts techniques for cutting and removing a portion of at least an insulation layer 256 of an electrical cable 132, and if present, an insulation screen layer 258 (e.g., radially outward of insulation 256) and a conductor screen layer 254 (e.g., radially inward of insulation 256). The techniques of the process of FIG. 22 are primarily described with respect to the systems, devices, and techniques depicted in FIGS. 19A-19D, FIGS. 20A-20E, and FIGS. 21A and 21B. Further, in some examples, but not all examples, the techniques of FIG. 22 may be performed after the techniques of FIG. 18, e.g., after outer jacket layer 262 and/or shield layer 260 have been removed from electrical cable 132.

An operator of a cable-preparation system 300 can install a MWM 250 over an outer-most layer, such as insulation screen layer 258, of cable 132 (2200). The operator can then activate MWM 350 by pushing action buttons 622 (FIG. 6) on handles 402 of MWM 350 (2202). As discussed above with respect to FIG. 21B, screwdriver 1100 engages rollers key 702 and rotates rollers key 702 such that roller chucks 708 move radially inward toward insulation screen 258, and the bearings tighten on insulation screen 258. As shown in FIG. 21B, motor 600 then rotates head body 606 and aligns screwdriver 1102 with radial-depth-adjustment mechanism 720. As shown in FIGS. 21C-E, cam motor 1018 then lifts screwdriver 1102 into connection with, and screwdriver motor 1020 rotates, radial-depth adjustment mechanism 720, and insulation knife 804 is inserted through insulation screen 258 and insulation 256 and, if present, conductor screen 254.

Motor 600 then rotates the rotatable tool head 606 of MWM 350 until insulation cutback is achieved (2204). At this stage, all of insulation screen 258, insulation 256, and conductor screen 254 may have been cut to a common axial length that is longer than jacket 262 (such that a portion of insulation screen 258 is exposed), and shorter than conductor 252, such that a portion of conductor 252 is exposed. Insulation knife 804 and rollers 714 are moved back to the "default" diameter shown in FIG. 20A, such that the operator may remove MWM 350 from cable 132 (2206).

At this stage, MWM 350 may optionally be coupled to an axial-drive mechanism configured to propel MWM 350 along cable 132, because the radial depth of the next cut into insulation screen 258 is not sufficiently deep to automatically propel MWM 350 along cable 132. For example, either piston module 308 (FIG. 3) or gripper module 2600 (FIGS. 26A and 26B) can then be installed onto MWM. For example, piston module 308 may be coupled with MWM 350 through piston-gripper eyelet 2100, in order to cut or score insulation screen 258, as detailed further below. In other examples, MWM 350 is installed on sledge module 304.

FIGS. 23A-23C are diagrams of various examples of piston module 308 coupled to MWM 350, ICM 352, and cross sectional-sensing module (CSSM) 306. In accordance with the techniques of this disclosure, piston module 308 includes a motor-driven leadscrew (or other similar linear driving means of this disclosure, such as a cable and winch 2612 described further below with respect to FIGS. 26A and 26B) that can move MWM 350 axially toward clamp 310 at a defined rate in concert with rotating head assembly 606 (FIG. 6) to provide a spiral cut or score. As shown in FIG. 23A, a data cable 2300 from MWM 350 or ICM 352 to piston module 308 can provide control and power for its actuation. The motion of piston 308 can define the cutback distance by stopping the forward motion of MWM 350 while rotating head 606 of MWM 350 continues rotating, thus creating a square cut (or equivalently, a "ring" cut or "circumferential" cut). A ring cut can be defined as a spiral-shaped cut, formed using both axial and rotational movement of MWM 350 to remove layer(s) of cable 132 (e.g., by shaving, scoring, and/or slicing the layer(s)). Each spiral cut can be finished or completed with a ring cut. Different layers are removed for a square cut to improve quality of interface with a splice, connector, etc. and prevent electric breakdown. In some examples, piston module 308 may be utilized for some scoring operations, such as if the operator is experienced. In some examples, the scoring may slightly pull MWM 350 axially forward. When MWM 350 reaches the end point, a braking mechanism could help stop the forward progress and indicate to the operator that cable 132 is ready for a ring cut.

In some examples, piston module 308 (or other axial-drive means in accordance with this disclosure) supports the axial movement of MWM 350 along cable 132 in examples in which the radial depth of the cut layer is not sufficient to automatically pull MWM 350 along the cable 132 (e.g., for scoring or shaving of insulation screen 258). Some of the cutting can be used to pull MWM 350 along the cable length (e.g., potentially jacket or insulation spiral-cutting), but piston module 308 may be required to control the axial motion in other cases.

As shown in FIGS. 23A-23C, various different data-communication connectivity options can be used between piston module 308 and ICM 352. For example, FIG. 23A shows cabled connections for CSSM 306, ICM 352, and piston module 308. In FIG. 23B, CSSM 306 is wirelessly connected to ICM 352 and has its own power source (e.g., a battery). In FIG. 23C, the battery 2302 from ICM 352 is relocated to MWM 350, and ICM 352 of FIG. 3 is replaced with ICM 1600 of FIG. 16, which may include a mobile computing device such as a tablet, smart phone, or other mobile device. In the example of FIG. 23C, ICM 1600 is wirelessly connected, but in other examples, ICM 1600 can optionally have a wired connection.

FIGS. 24A-24E illustrate an example of MWM 350 being utilized in a cable-insulation-screen-removal process, in accordance with various techniques of this disclosure. In the example depicted in FIGS. 24A-24E, jacket 262 and shield 260 have been cut back to a first axial length; insulation screen 258, insulation 256, and conductor shield 254 have been cut back to a second axial length (such that a portion of insulation screen 258 is exposed), and conductor 252 has not been cut from its original axial length, such that a portion of conductor 252 is exposed.

Figure 24A:
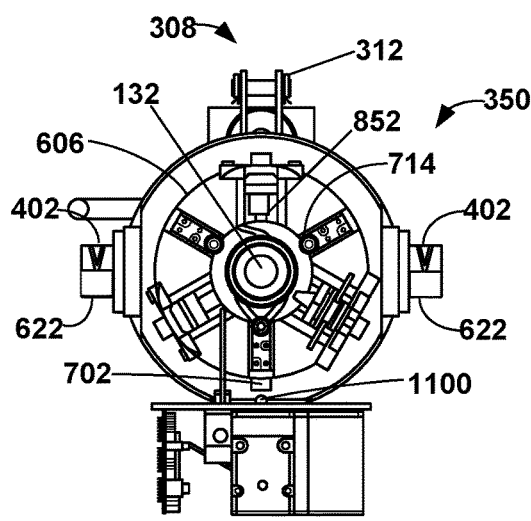
FIGS. 24A-24E are diagrams of an example of the cable-preparation device of FIG. 3 as utilized in a cable-conduction-screen-removal process, in accordance with various techniques of this disclosure.
Figure 24B:
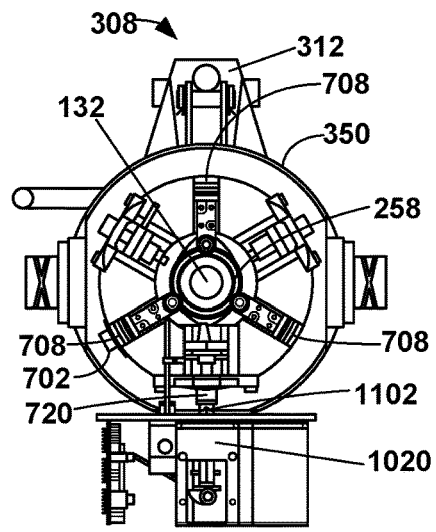
Figure 24C:
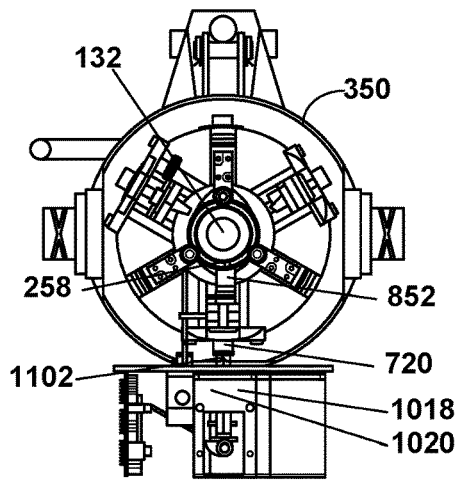
Figure 24D:
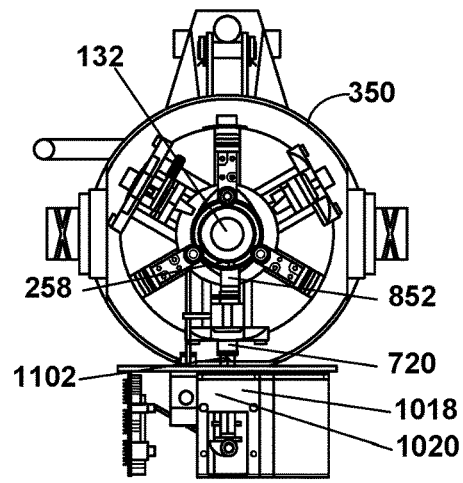
Figure 24E:
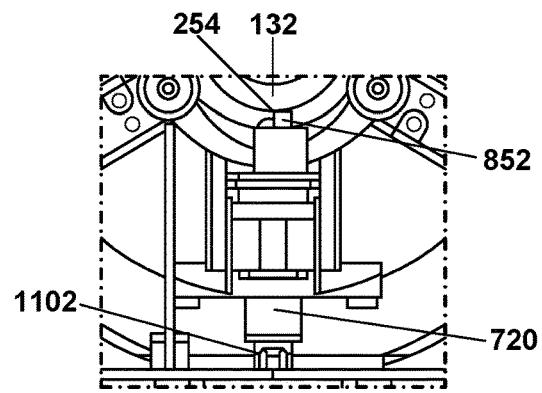
Figure 26A:
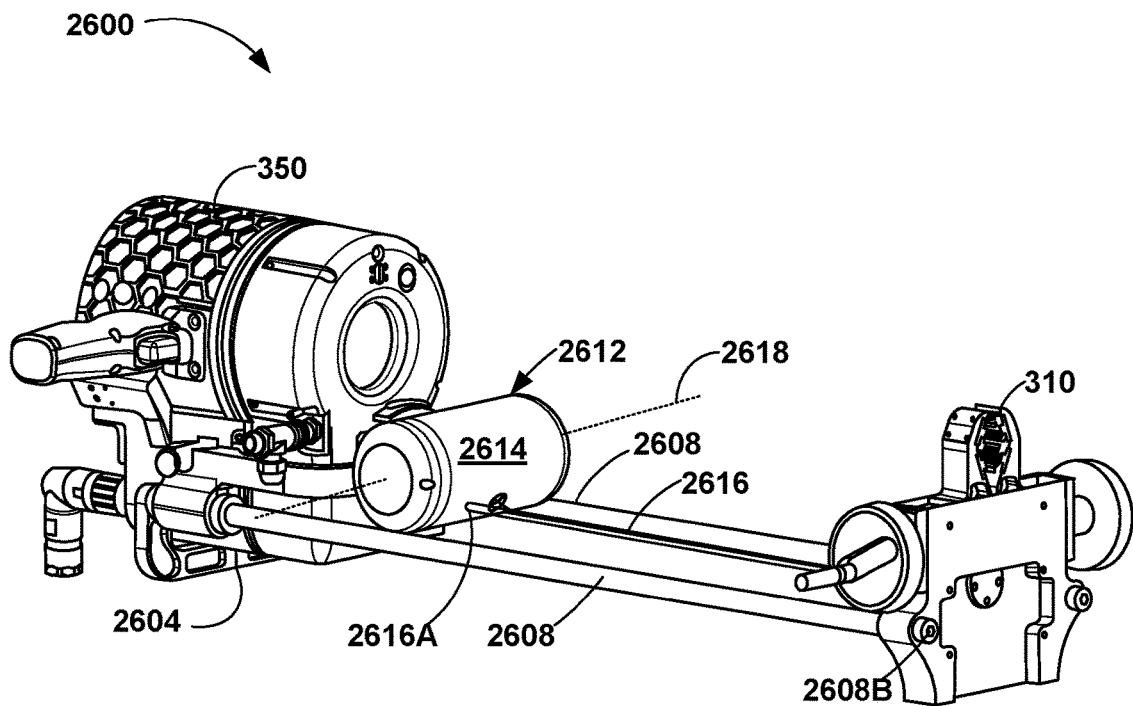
FIGS. 26A and 26B are perspective views of an example gripper module, which may be a modular component of cable-preparation system 300 of FIG. 3, in accordance with various techniques of this disclosure, in accordance with various techniques of this disclosure.
Figure 26B:
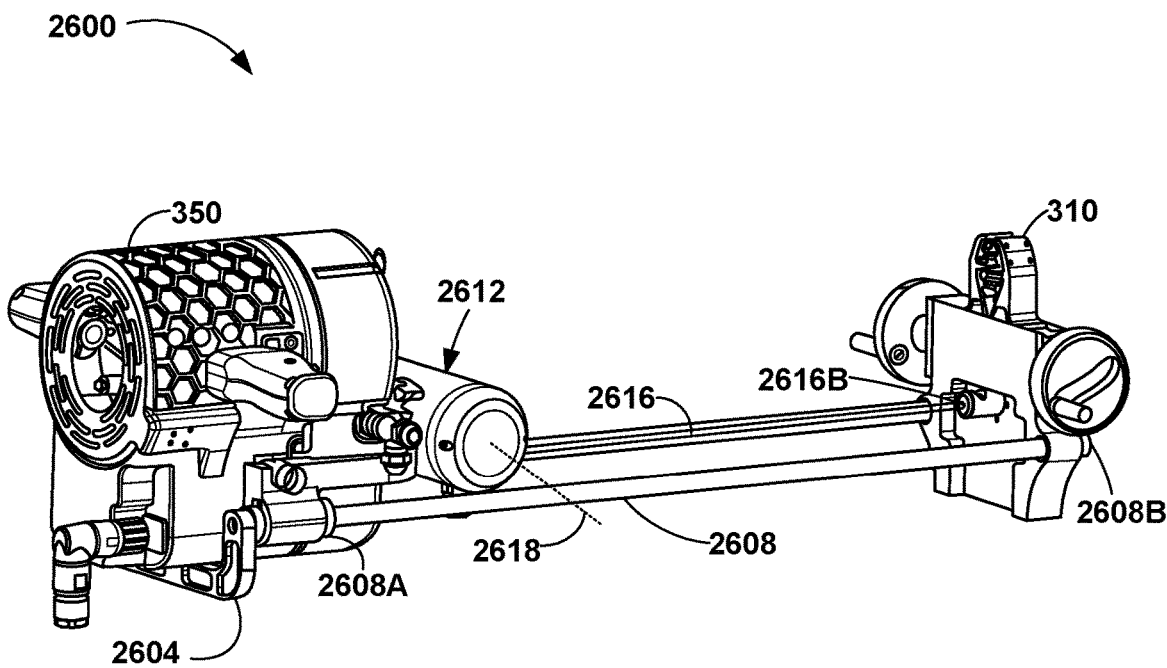

An operator reinserts cable 132 into MWM 350 and couples MWM 350 to linear drive 312 of piston 308 (or in other examples, to gripper module 2600 of FIGS. 26A and 26B, or to sledge module 304 of FIG. 3). The operator can then activate MWM 350 by pushing action buttons 622 on handles 402 of MWM 350. As shown in FIG. 24A, motor 600 (FIG. 6) rotates head body 606 to align rollers key 702 with screwdriver 1100. Screwdriver 1100 engages rollers key 702, screwdriver motor 1020 then rotates rollers key 702, roller chucks 708 move inward toward insulation screen 258, and the bearings tighten on insulation screen 258. As shown in FIG. 24B, motor 600 (FIG. 6) then rotates rotating head assembly 606 and aligns screwdriver 1102 with radial-depth-adjustment mechanism 720. As shown in FIG. 24C-24E, cam motor 1018 then lifts screwdriver 1102 into connection with radial-depth-adjustment mechanism 720 and screwdriver motor 1020 rotates radial-depth-adjustment mechanism 720 and insulation-screen knife 852 is inserted into insulation screen 258.

Motor 600 then rotates head body 606 is then rotated, scoring insulation screen 258, until insulation-screen cutback is achieved. Insulation screen knife 852 and rollers 714 are moved back to the "default" diameter shown in FIG. 24A, and MWM 350 is removed from cable 132. The operator manually strips insulation screen 258 and removes any shavings, such that the insulation layer 256 is exposed.

FIG. 25 is a flow diagram of a process for cable preparation utilizing a handheld MWM 350, in accordance with various techniques of this disclosure. More specifically, FIG. 25 depicts techniques for cutting and removing an insulation screen layer 258 (FIG. 2) of an electrical cable 132. The techniques of FIG. 25 are primarily described with respect to the systems, devices, and techniques depicted in FIGS. 21A and 21B, FIGS. 23A-23C, and FIGS. 24A-24E. Further, in some examples, but not all examples, the techniques of FIG. 25 may be performed after the techniques of FIG. 18 and/or after the techniques of FIG. 22, e.g., after outer jacket layer 262 and shield layer 260 have been cut back to a first axial length (FIG. 18); insulation screen layer 258, insulation layer 256, and conductor screen 254 have been cut back to a second axial length (FIG. 22), and conductor 252 extends axially outward at a third axial length.

An operator of a cable-preparation system 300 (FIG. 3) installs MWM 350 on cable 132 (2500), and then optionally couples linear drive 312 of piston module 308 (or other linear-or-axial-drive means of this disclosure) to MWM 350, because insulation screen 258 may not be radially thick enough to automatically propel MWM 350 along cable 132 during the cutting process. For example, piston eyelet 2104 (FIG. 21A) can couple with piston-gripper eyelet 2100 of MWM 350 via a cotter pin or other type of attachment.

The operator can then activate MWM 350 by pushing action buttons 622 of FIG. 6 on handles 402 of MWM 350 (2502). As shown in FIG. 24A, motor 600 rotates head body 606 to align rollers key 702 with screwdriver 1100. Screwdriver 1100 engages rollers key 702 and screwdriver motor 1020 then rotates rollers key 702 and roller chucks 708 move inward toward insulation screen 258 and the bearings tighten on insulation screen 258. As shown in FIG. 24B, motor 600 then rotates head body 606 and aligns screwdriver 1102 with radial-depth-adjustment mechanism 720. As shown in FIGS. 24C-24E, cam motor 1018 then lifts screwdriver 1102 into connection with radial-depth-adjustment mechanism 720, and screwdriver motor 1020 rotates radial-depth-adjustment mechanism 720 until insulation screen knife 852 is inserted into insulation screen 258.

Motor 600 then rotates rotating head assembly 606 of MWM 350, while piston module 308 drives MWM 350 along cable 132 (at coordinated rates of speed to produce a spiral score having the desired dimensions), performing a partial-depth cut (or "score") until insulation-screen cutback is achieved (2504). Insulation screen knife 852 and rollers 714 are then automatically moved back to a "default" diameter such that the operator may remove MWM 350 from cable 132, and manually strip any remaining portions of insulation screen 258 from cable 132 (2506) (e.g., remove any shavings), thereby exposing insulation layer 256 underneath.

As described above, in some examples of this disclosure, MWM 350 is configured to move or travel axially along electrical cable 132 to perform a cut (e.g., a spiral or longitudinal cut) into or through one or more layers of the cable. In some examples, MWM 350 includes handles 402 (FIG. 4) to enable an operator to manually push MWM 350 along cable 132.

In some examples, MWM 350 may be configured to drive or propel itself along cable 132 while performing the cut. For example, one or more cutting tools of the tool head may be oriented at an oblique angle with respect to a central longitudinal axis 2754 (FIGS. 27A-27E) of cable 132, such that, as the tool head rotates the cutting tool circumferentially around the cable, the interaction (e.g., friction) between the thickness or depth of the cut layer and the side of the cutting tool is sufficiently forceful to drive the entire tool head longitudinally forward along the cable, resulting in a spiral-type cut.

However, in other examples, the radial thickness or depth of the cut layer (e.g., insulation screen 258) may be too narrow or shallow to apply sufficient forward axial pressure onto the cutting tool to drive the rotatable cutting head forward. In some such examples, a cable-preparation system may include a gripper module configured to couple (e.g., clamp) to the electrical cable, wherein the gripper module includes an axial-drive module configured to push, pull, or otherwise drive MWM 350 axially forward along the cable. Piston module 308 (FIG. 3) is an example of such a drive module. In other examples in accordance with this disclosure, a gripper module includes a screw-drive or a winch configured to drive MWM 350 along cable 132. For example, FIGS. 26A and 26B are perspective views of an example gripper module 2600, which may be a modular component of cable-preparation system 300 of FIG. 3, in accordance with various techniques of this disclosure. Gripper module 2600 includes cable clamp 310, one or more guide rails 2508, and in some examples, but not all examples, MWM mount 2604 and drive module 2612 (also referred to herein as "winch 2612"). The various subcomponents of gripper module 2600 may be arranged and assembled into a plurality of different configurations according to the particular constraints and requirements of the cable-preparation task to be performed, as detailed further below. FIGS. 26A and 26B and FIGS. 27A-27E depict a first such arrangement or configuration of the components of gripper module 2600.

In some examples, one or more components of gripper module 2600 may be integrated with (e.g., rigidly coupled to) MWM 350. In other examples, one or more components of gripper module 2600 may be physically distinct from, but configured to removably couple to, MWM 350. For example, as shown in FIGS. 26A and 26B, gripper module 2600 may include MWM mount 2604 configured to removably couple MWM 350 to other components of gripper module 2600.

Cable clamp 310 is configured to removably couple to a portion of electrical cable 132 (FIGS. 27A-27E). Gripper module 2600 further includes one or more elongated guide rails 2608, each having a rail proximal end 2608A and a rail distal end 2608B. Guide rails 2608 are configured to guide (e.g., direct or control) an axial direction of the motion of MWM 350 along cable 132, e.g., to maintain a parallel orientation of MWM 350 relative to a central longitudinal axis of cable 2750 (FIGS. 27A-27E).

In some examples of the configuration shown in FIGS. 26A and 26B, in which MWM 350 is configured to be removable from other "accessory" components of gripper module 2600, each guide rail 2608 is configured to rigidly couple to MWM mount 2604 at rail proximal end 2608A and to rigidly couple to cable clamp 310 at rail distal end 2608B. In other examples of the configuration shown in FIGS. 26A and 26B, in which MWM 350 is directly (e.g., rigidly) integrated with additional components of gripper module 2600, each guide rail 2608 is configured to rigidly couple to MWM 350 at rail proximal end 2608A, and to rigidly couple to cable clamp 2606 at rail distal end 2608B.

Driving module 2612 includes driving means configured to drive, cause, enable, or otherwise control (as appropriate, according to the particular scenario) an axial movement (e.g., to control an axial speed of the axial movement) of MWM 350 along electrical cable 132 (FIGS. 27A-27E), e.g., along a central longitudinal axis 2754 (FIGS. 27A-27E) of electrical cable 132, in order to cut one or more layers of electrical cable 132. In some examples, driving module 2612 is an example of piston module 308 of FIG. 3 (e.g., linear drive 312 of piston module 308), except for the differences noted herein. For example, in accordance with the techniques of this disclosure (and as described above with respect to piston module 308), ICM 352 (FIG. 3) is configured to control both driving module 2612 and MWM 350 in order to coordinate the axial movement of MWM 350 with the rotational movement of rotating head assembly 606 of MWM 350 (FIG. 6) "in concert," in order to precisely control MWM 350 to produce a desired cut, e.g., a spiral cut or score having desired dimensions or proportions (e.g., as indicated by a user or operator or as retrieved from memory).

In some examples, driving module 2612 comprises a winch having an internal motor coupled to a rotational module (e.g., contained within an external housing 2614 of winch 2612) and an elongated wire 2616 having a wire proximal end 2616A, a wire proximal portion (not shown), and a wire distal end 2616B. In any configuration of components of gripper module 2600, wire proximal end 2616A is rigidly coupled to the rotational module of winch 2612, and the rotational module is configured to rotate about winch axis 2618 to wrap the proximal portion of wire 2616 around the rotational module, thereby shortening a length (e.g., a distal portion) of wire 2616 that is external to housing 2614.

In the example configuration of gripper module 2600 shown in FIGS. 26A-27E, external housing 2614 (containing the rotational module and the proximal wire portion) of winch 2612 is rigidly coupled to MWM mount 2604 and/or to the rail proximal end(s) 2608A. In other examples, housing 2614 of winch 2612 may be removably or rigidly coupled directly to MWM 350. Wire distal end 2616B is removably or rigidly coupled to cable clamp 310.

Figure 27A:
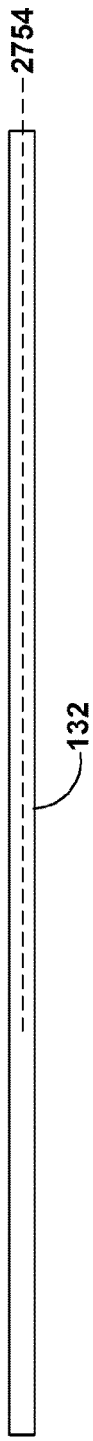
FIGS. 27A-27E are diagrams depicting an example process for electrical-cable preparation using the gripper module of FIGS. 26A and 26B, in accordance with various techniques of this disclosure.
Figure 27B:
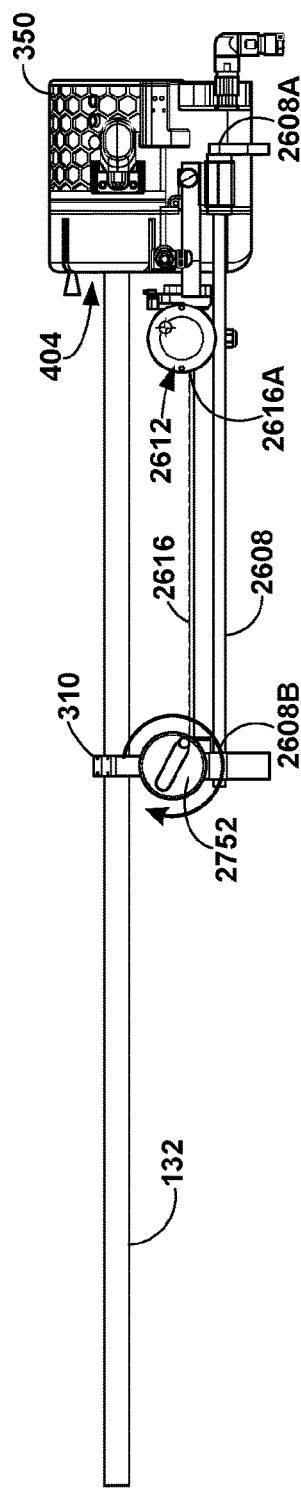

As shown in FIGS. 27A-27E, winch 2612 is configured to pull MWM 350 axially forward along cable 132 to cut one or more layers of cable 2650. For example, FIG. 27A is a side view of electrical cable 132. As shown in FIG. 27B, an operator may insert a proximal end of cable 132 into cable opening 404 of MWM 350. The operator also affixes cable clamp 310 to a more-distal portion of cable 132. For example, the operator may rotate clamp wheel 2752 (or other user-input mechanism) to secure clamp 310 onto the external surface of cable 132.

Figure 27C:
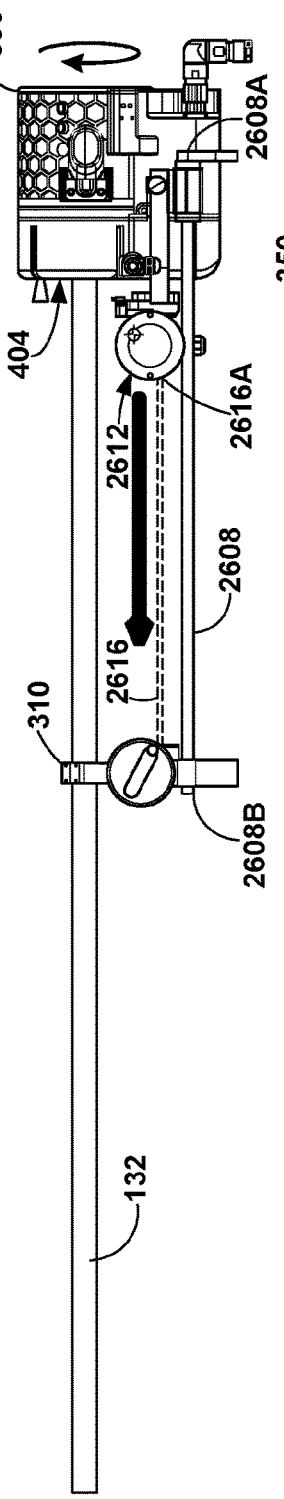
Figure 27D:
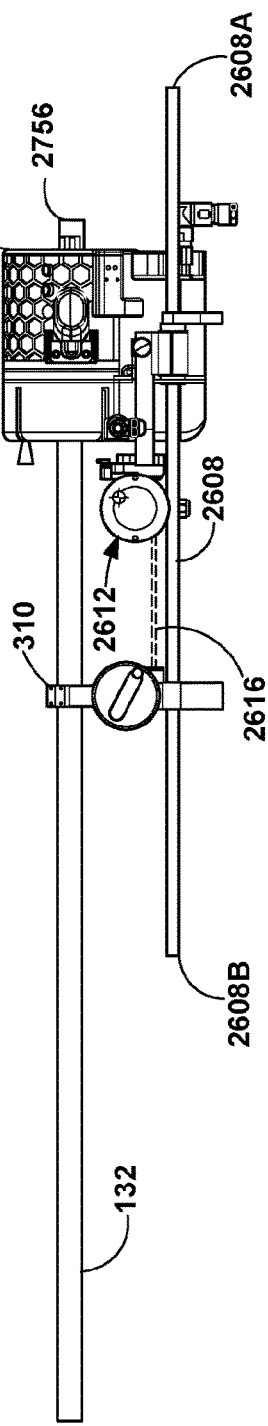

As shown in FIGS. 27C and 27D, the operator may activate the rotatable tool head 606 of MWM 350, which engages cable 132 in order to cut, score, or shave at least one radial layer of the cable while winch 2612 pulls MWM 350 axially along cable 132 to cut one or more layers of cable 132. The circumferential rotation and axial movement stop when MWM 350 achieves the desired cutback length and, if needed, the rotatable tool head completes the spiral cut with a terminal "square" cut, e.g., a cut that is perpendicular to cable longitudinal axis 2754. In some examples, the desired cutback length may be a predetermined (e.g., user-selected) point along the axial length of cable 132. In some such examples, the cable-preparation system may use laser distance sensor 1008 and the retroreflector on cable clamp 310, as described above, to determine when MWM 350 has reached the desired cutback length. In other examples, the user may select or indicate the desired cutback length by placing cable clamp 310 at the desired ending location.

Figure 27E:
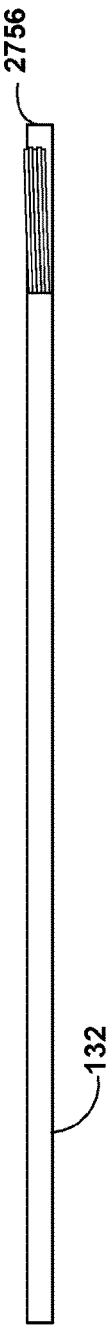

As shown in FIG. 27E, the cut layer may then be removed from cable 132 to produce a cut or stripped portion 2756 of cable 132, or in some examples, may remain attached to cable 132 for further preparation or other processing. For example, in some cases, the desired cutback length for cable 132 may be longer than either or both of guide rails 2608 and wire 2616. In some such examples, once MWM 350 has reached cable clamp 310 and has stopped moving forward, the operator may leave MWM 350 in place on cable 132, unlock the rotational module of winch 2612, and move cable clamp 310 (with the attached wire distal end 2616B) axially forward along cable 132 to a new desired cutback length, or to the full length of guide rails 2608, and repeat this process as many times as needed to reach the full desired cutback length.

In some examples in accordance with this disclosure, the operator may utilize guide rails 2608 of gripper module 2600 without utilizing winch 2612. For example, as described above, in some cases, the thickness of a radial layer of cable 132 is sufficiently thick or wide such that, as MWM 350 cuts through the layer, the layer pushes MWM 350 forward along the cable, rendering the pulling force of winch 2612 unnecessary. In some such examples, the operator may still utilize guide rail 2608 and cable clamp 310 as described herein to guide the axial motion, e.g., to rigidly maintain the direction of motion, of MWM 350.

Figure 28A:
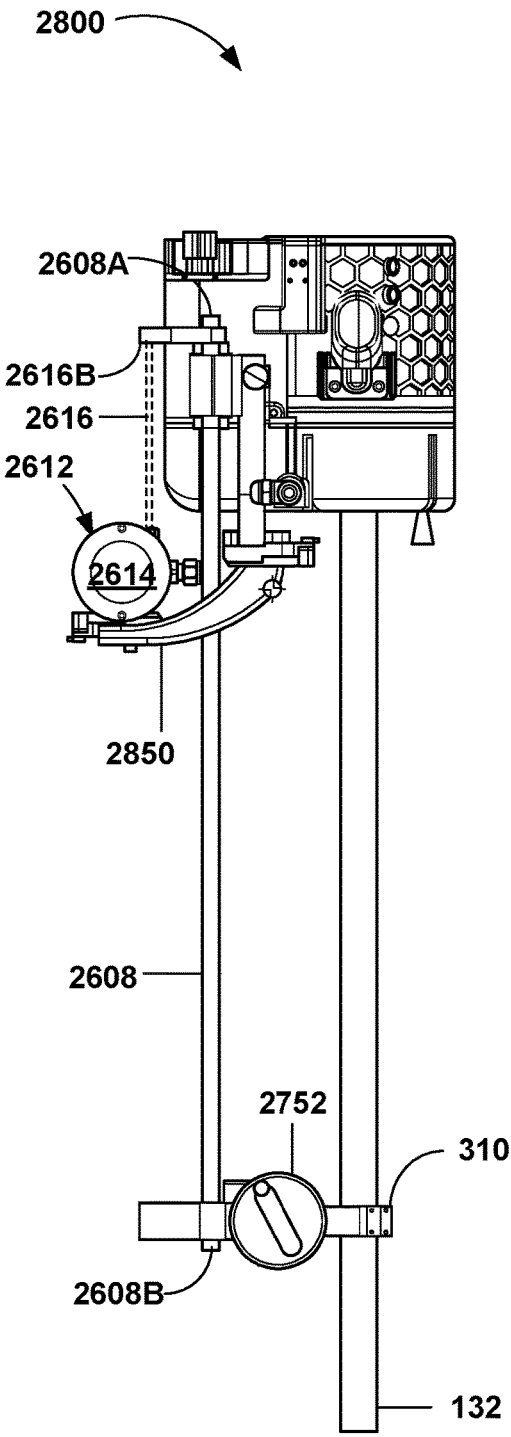
FIGS. 28A and 28B are diagrams depicting another example process for electrical-cable preparation using another example of the gripper module of FIGS. 26A and 26B, in accordance with various techniques of this disclosure.
Figure 28B:
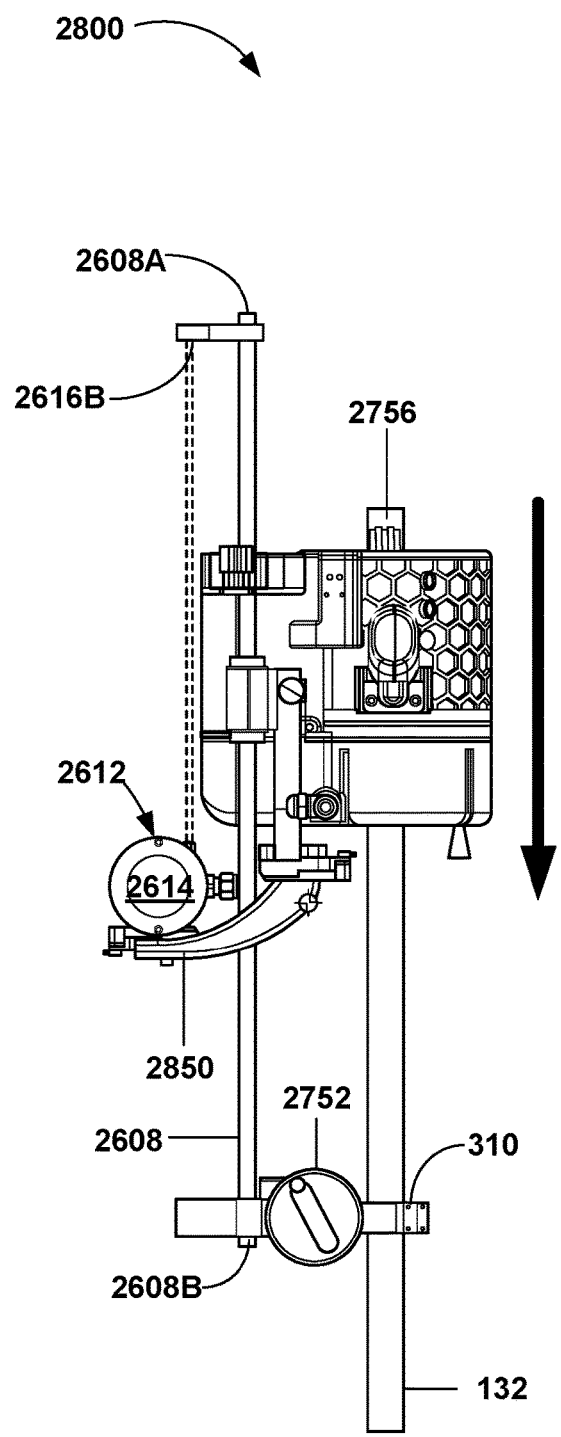

FIGS. 28A and 28B are illustrative diagrams depicting another example gripper module 2800, which is an example of gripper module 2600 of FIGS. 26A-27E, but with the one or more of the sub-components arranged and assembled in a different orientation with respect to each another. In the example arrangement shown in FIGS. 28A and 28B, electrical cable 132 is oriented vertically (e.g., within a threshold range of angles relative to gravity). In such examples in which cable 132 is oriented vertically, gripper module 2800 may be configured to utilize the force of gravity to cause MWM 350 to travel vertically downward along cable 132 to cut one or more layers of the cable. In some such examples, rather than using winch 2612 to propel MWM 350 along cable 132 (as in the example arrangement of FIGS. 26A and 26B), winch 2612 may be arranged and configured to at least partially slow or resist the natural downward movement of MWM 350 from gravity in order to control the axial speed of MWM 350. For example, gripper module 2800 may be configured to control the rotation of the rotational module of winch 2612 to control the release (e.g., unwrapping) of the proximal portion of wire 2616 from around the rotational module, in order to control the rate at which MWM 350 descends axially downward along cable 132.

As shown in FIG. 28A, external housing 2614 of winch 2612 is functionally coupled to MWM 350 via extension bracket 2850, which may be the same as, or different from, MWM mount 2604 of FIG. 26A. Distal end 2616B of wire 2616 is coupled to proximal end 2608A of guide rail 2608B. MWM 350 (including rotatable cutting-tool head 606 of FIG. 6) is mounted vertically above cable clamp 310 onto electrical cable 132. The rotational module of winch 2612 may then be actuated to rotate at a predetermined rotational speed (e.g., as measured in revolutions per minute (RPM)), causing wire 2616 to unwrap from around the winch's rotational module at a controlled rate of speed. As shown in FIG. 28B, MWM 350 descends downward along electrical cable 132 at a controlled rate of speed while suspended from proximal end 2608A of guide rail 2608. In this way, cable-preparation system 300, via computing device 352 and gripper module 2800, is able to precisely control the parameters of a cut made within one or more layers of electrical cable 132. As described above, by simultaneously controlling the axial speed of MWM 350 (e.g., via gripper module 2800) and the rotational speed of rotating tool head 606, computing device 352 can thereby control the ratio of axial motion to circumferential motion that generates a particular desired type of cut, such as a spiral cut, longitudinal cut, or other type of cut.

FIGS. 29A and 29B are illustrative diagrams depicting a third example gripper module 2900, which is another example of gripper module 2600 of FIGS. 26A and 26B, with the sub-components arranged and assembled in another orientation with respect to each another. In the example arrangement shown in FIGS. 29A and 29B, electrical cable 132 is shown being oriented generally horizontally (with respect to gravity), however, the arrangement of components of gripper module 2900 may be used in conjunction with an electrical cable oriented at virtually any alignment relative to gravity.

The arrangement of components in gripper module 2900 is substantially similar to the arrangement of components in gripper module 2600 of FIGS. 26A and 26B, except for the orientation of winch 2612, which is oriented substantially opposite to the corresponding orientation of winch 2612 shown in FIGS. 26A and 26B. In other words, as shown in FIG. 29A, housing 2614 of winch 2612 is functionally coupled to cable clamp 310 and/or distal end 2608B of guide rail 2608, rather than to MWM 350 (e.g., as shown in FIGS. 25A and 25B).

In some examples, housing 2614 of winch 2612 may be directly or rigidly coupled to cable clamp 310 and/or guide rail distal end 2608B. In other examples, such as the example shown in FIGS. 29A and 29B, housing 2614 of winch 2612 is flexibly coupled to cable clamp 310 via an intermediary cable sheath 2910. Cable sheath 2910 enables winch 2612 to be physically separate from the rest of gripper module 2900, which may enable gripper module 2900 to be used in a more-diverse set of environments, such as environments in which physical space is substantially constrained. Cable sheath 2910 defines an inner lumen configured to receive the proximal portion of wire 2616. Cable sheath 2910 may include any suitable material or polymer having a compressive strength sufficient to substantially resist compression when winch 2612 pulls MWM 350 along cable 132.

Similarly, as shown in FIGS. 29A and 29B, wire distal end 2616B is fixedly coupled to MWM 350, rather than to cable clamp 310 and/or guide rail distal end 2608B (e.g., as shown in FIGS. 26A and 26B). In such examples, as the rotational module within winch housing 2614 rotates, the proximal portion of wire 2616 wraps around the rotational module, causing winch 2612 to pull MWM 350 along cable 132 toward cable clamp 310. In this way, cable-preparation system 300, via computing device 352 and gripper module 2900, is able to precisely control the parameters of a cut made within one or more layers of electrical cable 132. As described above, by simultaneously controlling the axial speed of MWM 350 (e.g., via gripper module 2900) and the rotational speed of rotating tool head 606, computing device 352 can thereby control the ratio of axial motion to circumferential motion that generates a particular desired type of cut, such as a spiral cut, longitudinal cut, or other type of cut.

Figure 30A:
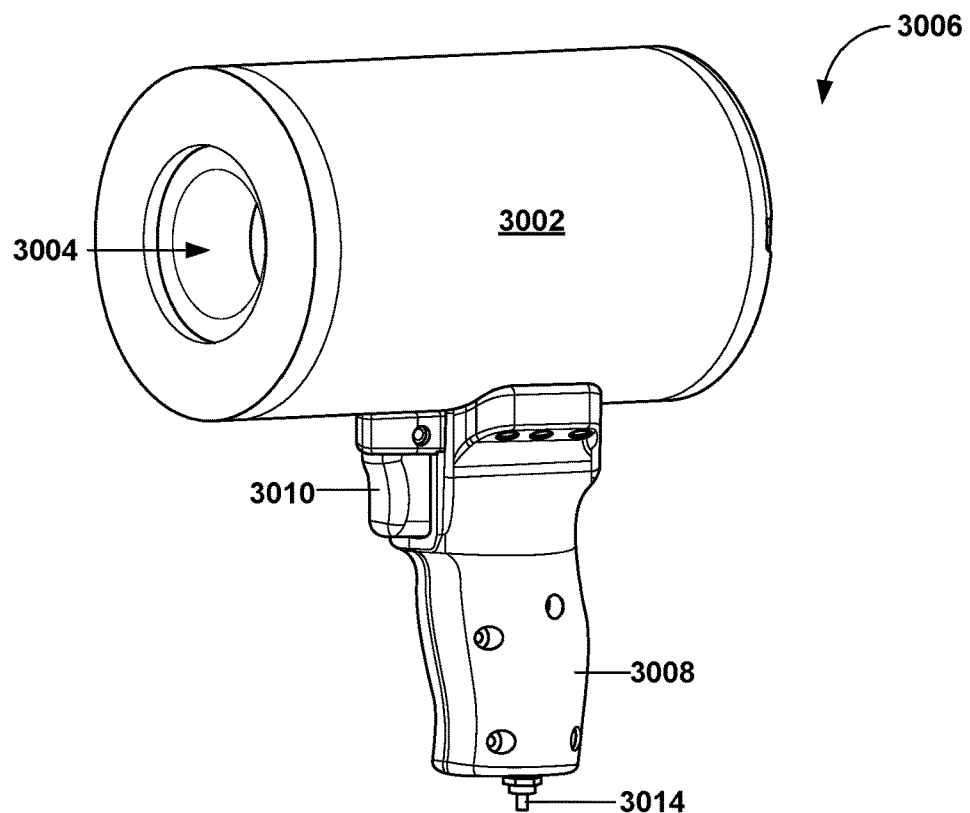
FIGS. 30A and 30B are perspective views of an example cable-imaging-and-measurement device for cable preparation, in accordance with various techniques of this disclosure.
Figure 30B:
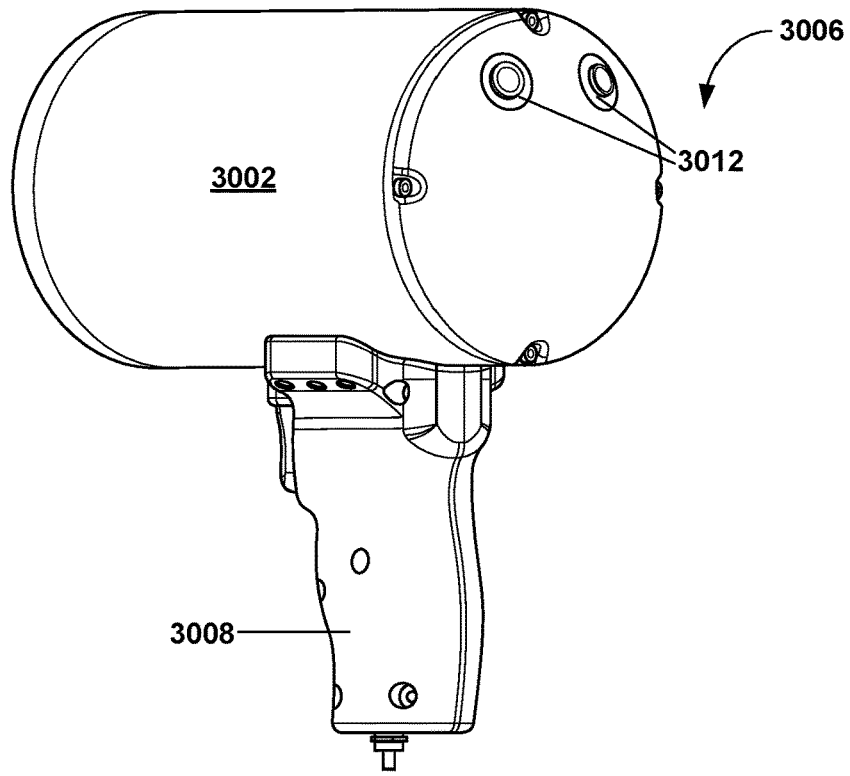
Figure 31:
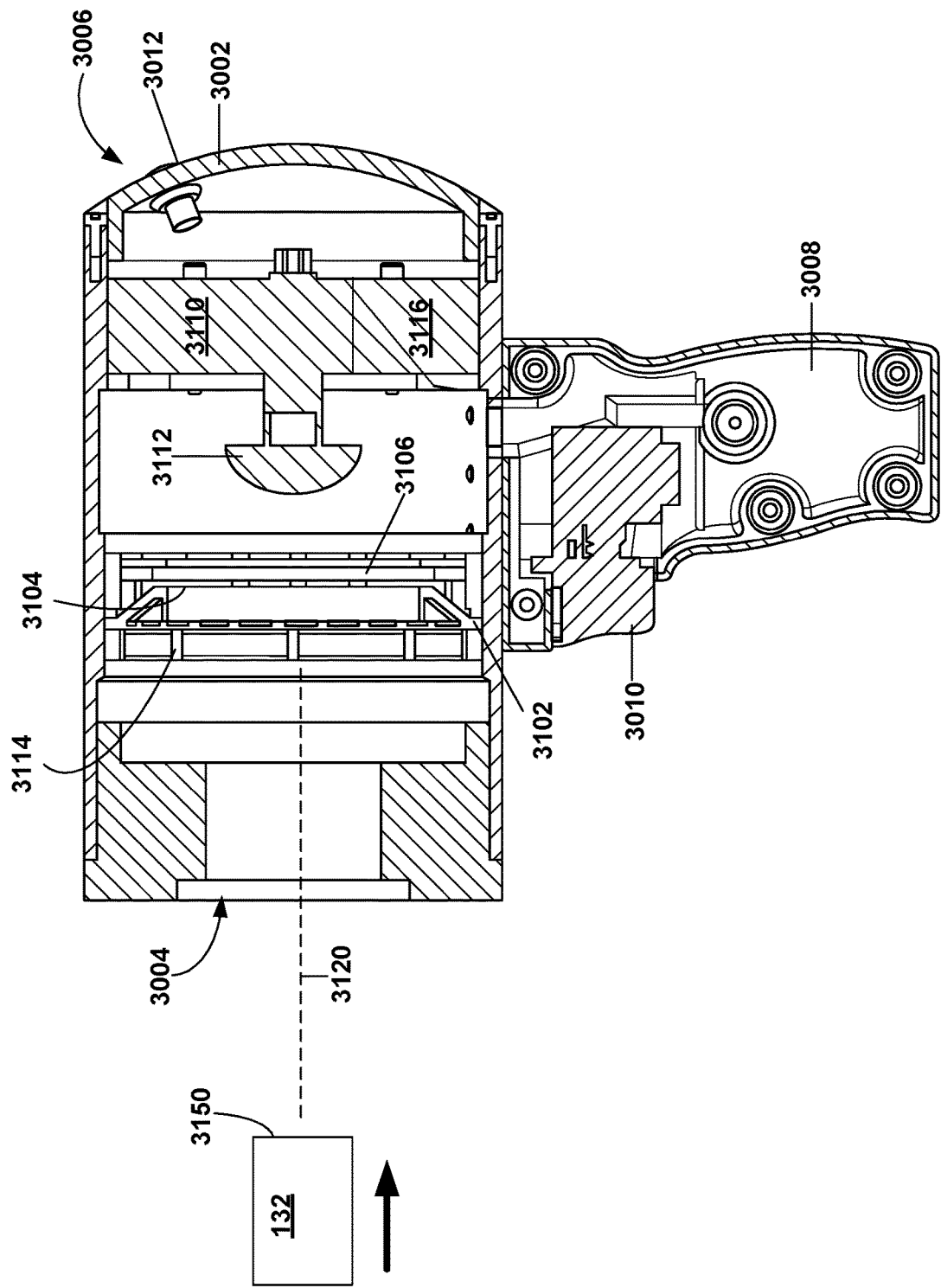
FIG. 31 is a cross-sectional view of the example handheld cable-imaging-and-measurement device of FIGS. 30A and 30B.

FIGS. 30A and 30B are perspective views, and FIG. 31 is a cross-sectional view, of an example handheld cross-section sensing module (CSSM) 3006, which is an example of modular CSSM 306 of FIG. 3 and FIGS. 23A-23C, except for the particular differences described herein. CSSM 3006 is configured to image an end-face 3150 of electrical cable 132. In accordance with the techniques of this disclosure, CSSM 3006 includes a telecentric lens 3106 configured to automatically correct for defects or other anomalies on an end-face 3150 of electrical cable 132 when imaging the end-face, thereby enabling significantly more-precise measurements of layers of cable 132 compared to imaging devices with different lens configurations, as described further below. CSSM 3006 as described herein is configured to provide virtually immediate cable-measurement results, such as within 30 seconds, often within 15 seconds, and usually within 10 seconds.

In FIGS. 30A and 30B. CSSM 3006 is depicted as a physically distinct, handheld module. In other examples, CSSM 3006 can be integrated into any of the other modules of system 300 of FIG. 3, including within MWM 350, within sledge module 304, or another module. As shown in FIGS. 30A and 30B, handheld CSSM 3006 includes housing 3002, cable entry port 3004, handle 3008, photo trigger 3010, indicator lights 3012, and in some examples, data/power cable 3014.

CSSM 3006 includes housing 3002 that encloses a volume including an image-capture device 3110, such as a camera, and defines cable entry port 3004 (also referred to herein as "opening 3004"). Housing 3002 may be made of any type of material appropriate for providing structural support for components within the enclosed volume. Housing 3002 may be opaque, for example, to block ambient light from entering the volume. In the example shown, housing 3002 includes opening 3004 opposite an enclosed end to which camera 3110 is attached within the housing. In the example shown, an end portion of cable 132, including end-face 3150, may be inserted into opening 3004. Camera 3110 is located within housing 3002 and oriented to face opening 3004 and cable end-face 3150. Camera 3110 has optical axis 3120, as illustrated in FIG. 31. Opening 3004 may be large enough to accept electrical cable 132, and may be larger than the diameter or largest cross-sectional dimension of electrical cable 132.

In some examples, CSSM 3006 includes indicators 3012, configured to output a signal or other indication to a user. For example, indicators 3012 may output a signal indicating one or more of "device powered on," "insert cable now," "cable is inserted to proper depth," "image captured," "image captured and cable-analysis complete," and/or any other message indicative of a functionality of CSSM 3006. In the example depicted in FIGS. 30A and 30B, indicators 3012 include a pair of indicator lights, wherein the lights are configured to indicate a message about the functionality of CSSM 3006 by powering on, blinking, or the like. As one non-limiting example, indicator lights 3012 may include a green LED indicating that the cable is imaged properly (e.g., by analyzing the sharpness and/or focus of the image), and a red LED indicating that a captured image is currently being processed (e.g., for a brief period of time after image-capture mechanism 3110 has been activated.

In some examples, cross-section sensing module 3006 includes internal computing device 3116. Computing device 3116 may be an example of computing device 152 of FIG. 1B and/or ICM 352 of FIG. 3, except for the differences noted herein. Computing device 3116 may control camera 3110 to capture images, store images, process images and other data or information, and transfer images via wired or wireless communications. Computing device 3110 may control and/or receive data and/or images from other components of CSSM 3006, for example, indicators 3012, camera 3110, and light source(s) 3102. In some examples, computing device 3116 may receive an image captured by camera 3110 and perform image-processing to determine (e.g., measure) various cable-construction parameters. For example, computing device 3116 may determine the number of conductor strands in an electrical cable, the arrangement of the conductor strands (e.g. stranding), the gauge of the conductor strands (e.g. the dimensions of the conductor strands), the number of shield wires, the shape of the shield wires (e.g. circular and/or flat), the gauge (e.g. dimensions) of the shield wires, the color and gray level of insulation, and the like.

Cross-section sensing module 3006 includes one or more light sources 3102. In some examples, light sources 3102 may be dome light sources. In other examples, light sources 3102 may be a ring of LEDs or a combination of a ring of LEDs and a diffuser between the LEDs and cable end-face 3150. In the example shown, light sources 3102 are configured to illuminate cable end-face 3150.

CSSM 3006 also may include one or more transparent protectors 3104. Transparent protectors 3104 may be configured to prevent electrical cable 132 from reaching or damaging camera 3110. Transparent protectors 3104 may have a flat shape, a conical shape, or an annular shape. In some examples, transparent protectors 3104 may diffusely transmit light. For example, transparent protectors 3104 may be placed between light sources 3102 and cable end-face 3150 and diffusely transmit, e.g. transmit and scatter, light from light sources 3102 so as to diffusely illuminate cable end-face 3150. In some examples, the diffuse illumination of cable end-face 3150 may reduce or eliminate undesired reflections such as specular reflections or glint. In some examples, light sources 3102 may be placed along an edge of transparent protectors 3104 and transparent protectors 3104 may be configured to diffuse and emit light that is injected into transparent protectors by light sources 3102 toward cable end-face 3150. For example, transparent protectors 3104 may be edge-light light guides and/or illuminators.

In some examples, CSSM 3006 may include a data cable 3014 for power and/or data input/output. In some examples, CSSM 3006 may be battery-powered and/or include wireless data-transfer capabilities to transfer and receive data with one or more other modules of system 300 (e.g., as shown in the various examples of FIGS. 23A-23C).

In some examples, CSSM 3006 includes a locking ring 3114 configured to removably secure cable 132 in place within housing 3002. e.g., to secure a relative position of end-face 3150 relative to camera 3110 and to orient the end-face 3150 of the electrical cable 132 within the field-of-view of telecentric lens 3106. For example, in accordance with the techniques of this disclosure, CSSM 3006 includes a telecentric lens 3106 oriented substantially transverse (e.g., perpendicular) to lens axis 3120 of camera lens 3112. As used throughout this disclosure, a "telecentric" lens is defined as an optical lens that has a constant, non-angular field-of-view. For example, at any distance from a telecentric lens, the lens will always have the same field-of-view, thereby eliminating an amount of parallax, for example, an amount of imaging distortion due to the effect of parallax, as otherwise experienced with conventional lenses. In other words, any two objects of the same size, when viewed through telecentric lens 3106, will still appear to be the same size, regardless of each object's distance from the lens.

Telecentric lens 3106 provides a number of benefits that are particularly advantageous for imaging cable end-face 3150 with CSSM 3006. For example, as depicted in FIGS. 32A-32C below, when imaged through telecentric lens 3106, all portions, areas, or regions of cable end-face 3150 of electrical cable 132 appear to be located at the same distance and aligned to the same orientation with respect to camera 3110, giving the appearance that cable end-face 3150 conforms to a substantially "ideal" planar cross-sectional surface, even when cable end-face 3150 in reality includes one or more imperfections, e.g., areas or regions departing from a perfect representation of a trans-axial cross-section of electrical cable 132. In effect, although an object, such as an outer or inner radial edge of a layer of electrical cable 132 may be observed to blur (e.g., reduce in resolution) as it gets farther away from telecentric lens 3106, since the object does not appear to change in size, the edge of the object remains in the same location within telecentric-based imagery, regardless of its distance from lens 3106. Accordingly, a radial position of the edge of the object may be highly precisely determined (e.g., located or measured) without having to account for any distortion otherwise based on magnification. Even further, telecentric lens 3106 does not cause "fish-eye" distortion near the outer edge of the field-of-view of the lens, as experienced with more-conventional lenses.

In some examples, a portion of cable end face 3150 may be observed to be incrementally less-resolved (e.g., may be blurrier) if it is farther from a point-of-best-focus of telecentric lens 3106 than another portion of cable end face 3150. However, in some such examples, this blurring effect may actually be used advantageously to more-precisely identify the outer or inner radial edge of a layer of electrical cable 132. For example, even a substantially in-focus image, containing a certain number of pixels, includes some minimal amount of blurring, which may be observed when the pixels are viewed at increased scales of magnification. In other words, a "blurred" region between two distinct objects (e.g., two objects of different colors) within a high-resolution image is merely confined to a smaller number of pixels. In effect, each pixel of the "narrower" blurred region is more likely to feature a substantially different color compared to a consecutive pixel on either side of itself.

However, a more-out-of-focus image (e.g., due to the imaged object's larger distance from a point-of-best-focus of telecentric lens 3106) effectively distributes the blurred intermediate region out over a greater number of pixels, such that each pixel of the blurred region is substantially similar in color to the pixel on either side of itself. In this way, the blurred region at least partially averages-out the effect of any color "noise" within the image, which may otherwise result from camera 3110 or from other sources.

Accordingly, in some examples, the exact center of the blurred region (e.g., the precise radial location between two consecutive layers of cable 132) may be more-easily and more-precisely determined (e.g., located, identified, and/or measured), by requiring relatively less sub-pixel color-interpolation and by accounting for less random color variation, as compared to more "in-focus" images, wherein the difference in color between two consecutive pixels may be substantially large and/or asymmetrically adjusted from their "true" color.

Accordingly, in accordance with the techniques of this disclosure, telecentric lens 3106 of CSSM 3006 enables more-precise imaging and measurement of end-face 3150 of cable 132, with an even-greater depth field, relative to a CSSM having only conventional optical lenses. Even further, certain types of telecentric lenses, such as certain Fresnel lenses, are designed to be relatively thin and lightweight, and may be formed from plastic rather than a solid piece of glass. Some such examples of lightweight lenses enable CSSM 3006 to be implemented in a relatively small, modular handheld device, as depicted in FIGS. 30A-31. Accordingly, in some such examples, handheld CSSM 3006 includes handle 3008 extending from housing 3002. In some examples, handle 3008 includes an image-capture user-input mechanism, such as photo trigger 3010, configured to enable a user to cause camera 3110 to capture imagery of the end-face of cable 132. In addition to being relatively thin and lightweight, thereby enabling CSSM 3006 to be compact and handheld, the use of a Fresnel lens for telecentric lens 3106 the Fresnel lens may be less expensive than typical, machine-vision telecentric lenses, despite having approximately the same aperture. Although these types of Fresnel lenses may cause a slightly reduced resolution in the image of the end-face 3150 of cable 132, the loss in resolution may be negligible on the scales of magnification required for highly accurate measurements of cable end-face 3150.

FIGS. 32A-32C are conceptual diagrams illustrating example functionality of CSSM 3006 of FIGS. 30A and 30B. For example, FIG. 32A depicts a first example electrical cable 132A having a theoretical "ideal" end-face 3150A, wherein end-face 3150A (at least substantially) conforms to a single planar surface, and wherein the planar surface of end face 3150A is (at least substantially) perpendicular to a central longitudinal axis 2754A of cable 132A. In such examples, a cross-section sensing module 3006 that includes a telecentric lens 3106 is substantially likely to capture an image 3202A that is visually similar to an image 3204A that is captured by a cross-section sensing module that does not include a telecentric lens. In other words, the two images 3202A and 3204A will be substantially similar, due primarily to the "ideal" surface of end-face 3150A.

However, FIG. 32B depicts a second example electrical cable 132B having a non-ideal end-face 3150B, wherein end-face 3150B (at least substantially) conforms to a single planar surface, but wherein the planar surface is not substantially perpendicular to a central longitudinal axis 2754B of cable 132B. For example, as shown in FIG. 32B, cable end face 3150B is oriented at an oblique angle with respect to central longitudinal axis 2754B. In such examples, a CSSM 3006 that includes a telecentric lens 3106 is configured to capture an image 3202B that is substantially different from an image 3204B that is captured by a CSSM that does not include a telecentric lens (e.g., that includes only conventional optical lenses). For example, as shown in FIG. 32B, a lower portion of end-face 3150B appears distorted in image 3204B, in that the lower portion that is slightly farther away from the camera 3110 of the CSSM is shrunken or reduced by an amount based on its distance from camera 3110. Accordingly, image 3204B would otherwise result in inaccurate measurements of the layers of cable 132B, e.g., measurements of the diameters, radii, radial thicknesses, arc-lengths, or other similar dimensions. These inaccurate measurements may result in inaccurate cutting or shaving of the one or more layers, as the respective cable-preparation system may determine a radial depth of its cutting tool at least in part on the inaccurate measurements. However, by incorporating telecentric lens 3106 into CSSM 3006, each portion of end-face 3150B is magnified by the same amount, regardless of its distance from lens 3106, resulting in image 3202B having the appearance that end-face 3150B is substantially "ideal." e.g., substantially planar and substantially perpendicular to cable axis 2754B.

Similarly, FIG. 32C depicts a third example electrical cable 132C having a non-ideal end-face 3150C, wherein end-face 3150C neither conforms to a single planar surface, nor wherein either (e.g., any) of the planar surfaces are oriented substantially perpendicularly to central longitudinal axis 2754C of cable 132C, e.g., are oriented at oblique angles with respect to central longitudinal axis 2654C. In such examples, a CSSM 3006 that includes a telecentric lens 3106 is configured to capture an image 3202C that substantially different from an image 3204C that is captured by a CSSM that does not include a telecentric lens. For example, as shown in FIG. 32C, both an upper portion and a lower portion of end-face 3150C appear distorted in image 3204C, in that the upper and lower edges are slightly farther away from the camera 3110 of CSSM 3006 than a middle portion, and accordingly, but the upper and lower portions are shrunken or reduced by an amount based on their respective distance from camera 3110. Accordingly, image 3204C would otherwise result in inaccurate measurements of the layers of cable 132C, e.g., measurements of the diameters, radii, radial thicknesses, arc-lengths, or other similar dimensions. These inaccurate measurements would similarly result in inaccurate cutting or shaving of the one or more layers, as the cable-preparation system would be basing a radial depth of the cutting tool at least in part on the measurements. However, by incorporating telecentric lens 3106 into CSSM 3006, the magnification of each portion of end-face 3150C is magnified by the same amount, regardless of its distance from camera 3110, resulting in image 3202C having the appearance that end-face 3150C is substantially ideal.

Figure 33:
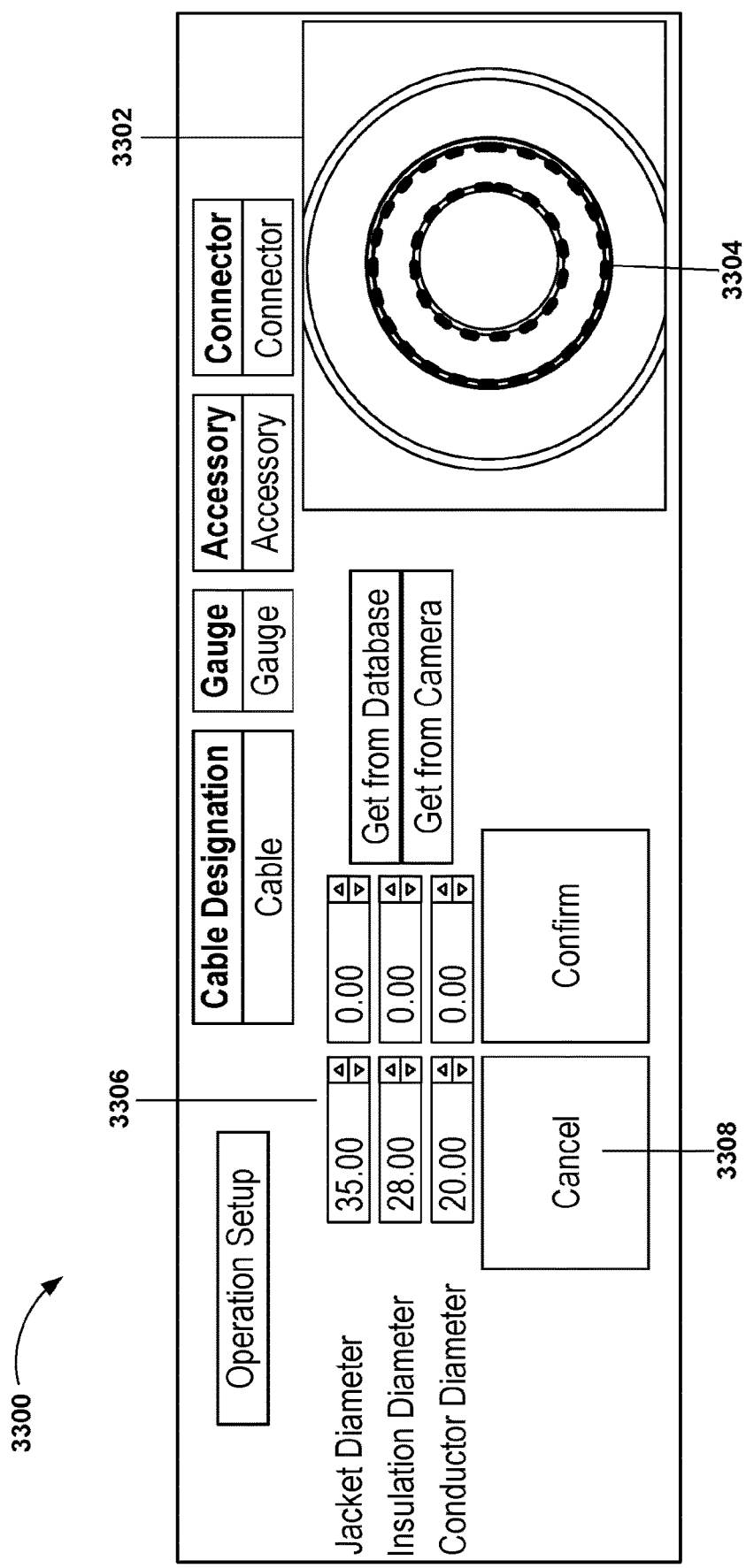
FIG. 33 is an illustrative diagram depicting an example graphical user interface (GUI) that may be generated by, or used in conjunction with, the cable-imaging-and-measurement device of FIGS. 30A and 30B.

FIG. 33 is an illustrative diagram depicting an example graphical user interface (GUI) 3300 that may be generated by, or in conjunction with, the handheld-cable measurement device of FIGS. 30A and 30B.

GUI 3300 includes an image 3302 of the end-face 3150 of the cable 132, as captured by CSSM 3006. In some examples, a computing device (e.g., computing device 3116 of CSSM 3006, or any other computing device of system 300 of FIG. 3) is configured to process image 3302 to identify or determine, based on image 3302, an approximate location of, or demarcation (e.g., distinction) between, the various layers of electrical cable 132 within image 3302. Accordingly, as shown in FIG. 33, image 3302 may include one or more geometric objects (e.g., rings, etc.) 3304 overlaying image 3302, and indicating the estimated demarcations between the layers of cable 132. GUI 3300 may further include estimations of various measurements and dimensions corresponding to the estimated locations of or demarcations between the various layers of the cable. In some examples, GUI 3300 further includes input devices 3306 enabling a user to either confirm or reject ("Cancel") the estimated measurements, as appropriate. Upon receiving a "Cancel" indication from the user, the system may automatically re-capture another image 3302 of the end-face 3150 of cable 132, and re-generate the measurements based on the new image. Upon receiving a "confirm" indication from the user, the system may transmit the measured dimensions to another computing device (e.g., from computing device 3116 of CSM 3006 to ICM 352 of system 300). Additionally or alternatively, in response to receiving a "confirm" indication from the user via GUI 3300, the respective computing system may be configured to automatically generate and execute corresponding program instructions to configure MWM 350 for preparing electrical cable 132 (e.g., adjusting an orientation and/or radial depth of one or more cutting blades), and/or to cause MWM 350 to begin cutting the one or more layers of cable 132.

In some examples in accordance with this disclosure, a computing system may be configured to determine and output, such as via GUI 3300, additional or differing indications to a user. For example, the computing systems of this disclosure (e.g., computing device 3116 and/or ICM 352) may be configured to determine, based on the measured dimensions within image 3302 of cable 132, whether the measured dimensions correspond to a type of electrical cable indicated by the user (e.g., via GUI 3300 or other user-input mechanism). For example, the computing system may be configured to determine whether the imaged electrical cable 132 includes an expected number of layers, expected types of layers, expected thicknesses of layers (e.g., within a threshold tolerance) conductor size and stranding, insulation thickness and voltage class, type of shielding, an overall cable diameter, or the like. In the event that the computing system determines that a cable parameter of this type is outside an expected value or range, the computing system may generate and output an alert, such as via GUI 3300, to inform the user that the cable is different from the type of cable previously indicated or described by the user, such that the user may determine whether the discrepancy was based on user error, or if CSSM 3006 may need to be re-calibrated.

In some examples in accordance with this disclosure, a computing system may be configured to determine, based on the measured dimensions within image 3302 of cable 132, that cable 132 is excessively deformed or otherwise out-of-specification, such that attempting to prepare the cable is not likely to be completed successfully, or alternatively, that the preparation procedure may be completed but may produce a prepared cable that is unsafe to use. For example, the computing system may be configured to determine (e.g., measure) an eccentricity (e.g., an "ovality") of the cross-section of cable 132, or an excessive or insufficient layer thickness, or any other similar parameter that is not within a safe or expected tolerance for the cable-preparation system. In some such examples, the computing system may generate and output an alert, such as via GUI 3300, that the cable should not be used with the cable-preparation system, and should likely be discarded.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the orientations depicted in the figures and described herein. For example, if an object depicted in the figures is turned over or flipped over, portions previously described as below, or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although several distinct modules have been described throughout this description, many of which perform unique functions, all the functions of all the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some respects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that can execute the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another. e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair. DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some respects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

What is claimed is:

1. A device comprising:
    a housing defining a cavity, wherein the housing is configured to position an end-face of an electrical cable within the cavity;
    a camera disclosed within the cavity of the housing, wherein the camera is configured to capture an image of the end-face of the electrical cable;
    a telecentric lens optically coupled to the camera, wherein the telecentric lens comprises a non-angular field of view configured to reduce, in the image, distortion from parallax associated with at least one portion of the end-face of the electrical cable that is oriented at an oblique angle relative to an optical axis of the telecentric lens; and
    at least one computing device configured to determine, based on the image, at least one of a diameter or a radial thickness of at least one layer of the electrical cable, and output the diameter or the radial thickness of the at least one layer to a cable-preparation device configured to, based on the diameter or the radial thickness, cut the at least one layer of the electrical cable.

2. The device of claim 1, wherein the telecentric lens comprises a Fresnel lens.

3. The device of claim 1, wherein the device comprises a handheld device, and wherein the device further comprises a handle extending from the housing.

4. The device of claim 3, wherein the handle comprises a trigger configured to cause the camera to capture the image of the end-face of the electrical cable.

5. The device of claim 1, further comprising a locking ring configured to orient the end-face of the electrical cable within the field of view of the telecentric lens.

6. The device of claim 1, wherein the housing comprises indicator lights configured to indicate to a user that the end-face of the electrical cable is oriented within the field of view of the telecentric lens.

7. The device of claim 1, wherein the computing device is further configured to:
    determine, based on the diameter or the thickness of the at least one layer, that the diameter or the thickness is outside an expected range; and
    output an alert indicating that the diameter or the thickness is outside the expected range.

8. The device of claim 1, wherein the telecentric lens is configured to enable the computing device to determine, based on colors of pixels within the image, an outer or an inner edge of the at least one layer by averaging-out random color distortion among the pixels.

9. The device of claim 1, wherein the telecentric lens is configured to enable the computing device to accurately determine, based on colors of pixels within the image, an outer or an inner edge of the at least one layer by reducing an amount of color-interpolation of the pixels.

10. The device of claim 1, wherein the telecentric lens is configured to enable the computing device to accurately determine, based on colors of pixels within the image, an outer or an inner edge of the at least one layer by causing the at least one portion of the end-face of the electrical that is oriented at an oblique angle relative to the optical axis of the telecentric lens to optically conform, within the image, to a common planar surface of the end-face of the cable that is oriented perpendicular to the optical axis of the telecentric lens.

11. The device of claim 1, further comprising at least one light source configured to illuminate the end-face of the electrical cable.

12. The device of claim 11, wherein the at least one light source includes a ring of light emitting diodes (LEDs).

13. The device of claim 1, further comprising a transparent protector configured to block the electrical cable from contacting the telecentric lens.

14. A system comprising:
a cross-section sensing module comprising:
  a housing defining a cavity, wherein the housing is configured to position an end-face of an electrical cable within the cavity;
  a camera disclosed within the cavity of the housing, wherein the camera is configured to capture an image of the end-face of the electrical cable; and
  a telecentric lens optically coupled to the camera, wherein the telecentric lens comprises a non-angular field of view configured to reduce, in the image, distortion from parallax associated with at least one portion of the end-face of the electrical cable that is oriented at an oblique angle relative to an optical axis of the telecentric lens;
a cable preparation device; and
a computing device configured to receive the image from the camera, determine, based on the image, at least one of a diameter or a radial thickness of at least one layer of the electrical cable, and output the diameter or the radial thickness of the at least one layer to the cable-preparation device configured to, based on the diameter or the radial thickness, cut the at least one layer of the electrical cable.

15. The system of claim 14, wherein the telecentric lens is configured to enable the computing device to accurately determine, based on colors of pixels within the image, an outer or an inner edge of the at least one layer by causing the at least one portion of the end-face of the electrical that is oriented at an oblique angle relative to the optical axis of the telecentric lens to optically conform, within the image, to a common planar surface of the end-face of the cable that is oriented perpendicular to the optical axis of the telecentric lens.

16. A method comprising:
capturing, by a camera communicatively coupled to a processor, an image of an end-face of an electrical cable, wherein a telecentric lens positioned in front of the camera removes, from the image, distortion from parallax, wherein the parallax is associated with at least one portion of the end-face of the electrical cable that is oriented at an oblique angle relative to an optical axis of the telecentric lens;
determining, by the processor, a diameter or a thickness of at least one layer of the electrical cable based on the image; and
outputting the diameter or the thickness of the at least one layer of the electrical cable to a computing device further configured to control a cable-preparation device to cut and remove the at least one layer from the electrical cable.

17. A device comprising:
a housing defining a cavity, wherein the housing is configured to position an end-face of an electrical cable within the cavity;
a camera disclosed within the cavity of the housing, wherein the camera is configured to capture an image of the end-face of the electrical cable; and
a telecentric lens optically coupled to the camera, wherein the telecentric lens comprises a non-angular field of view configured to reduce, in the image, distortion from parallax associated with at least one portion of the end-face of the electrical cable that is oriented at an oblique angle relative to an optical axis of the telecentric lens, wherein the device comprises a handheld device, and wherein the device further comprises a handle extending from the housing.

* * * * *